(12) United States Patent
Oku et al.

(10) Patent No.: US 8,218,033 B2
(45) Date of Patent: Jul. 10, 2012

(54) SOUND CORRECTOR, SOUND RECORDING DEVICE, SOUND REPRODUCING DEVICE, AND SOUND CORRECTING METHOD

(75) Inventors: Tomoki Oku, Osaka (JP); Masahiro Yoshida, Osaka (JP); Makoto Yamanaka, Kobe (JP); Haruhiko Murata, Ibaraki (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 913 days.

(21) Appl. No.: 12/202,855

(22) Filed: Sep. 2, 2008

(65) Prior Publication Data

US 2009/0066798 A1 Mar. 12, 2009

(30) Foreign Application Priority Data

Sep. 10, 2007 (JP) ................... 2007-233675
Dec. 25, 2007 (JP) ................... 2007-331428
May 28, 2008 (JP) ................... 2008-139647

(51) Int. Cl.
*H04N 5/262* (2006.01)
(52) U.S. Cl. ............... 348/240.99; 348/239; 348/207.99
(58) Field of Classification Search .. 348/240.99–240.3, 348/207.99, 239
See application file for complete search history.

(56) References Cited

U.S. PATENT DOCUMENTS

| | | | | |
|---|---|---|---|---|
| 5,737,491 A | * | 4/1998 | Allen et al. | 704/270 |
| 5,999,214 A | * | 12/1999 | Inagaki | 348/211.12 |
| 2006/0291816 A1 | | 12/2006 | Ozawa | |
| 2010/0138380 A1 | | 6/2010 | Campbell | |

FOREIGN PATENT DOCUMENTS

| | | |
|---|---|---|
| JP | 03-151772 | 6/1991 |
| JP | 03-274867 | 12/1991 |
| JP | H04-61571 A | 2/1992 |
| JP | H04-061571 A | 2/1992 |
| JP | 05-284411 | 10/1993 |
| JP | H05-300419 A | 11/1993 |
| JP | 2000-048211 | 2/2000 |
| JP | 2000-278581 | 10/2000 |
| JP | 2000-278581 A | 10/2000 |
| JP | 2000-354190 | 12/2000 |
| JP | 2001-169169 | 6/2001 |
| JP | 2002-034092 A | 1/2002 |
| JP | 2003-298916 A | 10/2003 |
| JP | 2004-056431 | 2/2004 |
| JP | 2005-244394 | 9/2005 |
| JP | 2007-013255 | 1/2007 |
| JP | 2007-013255 A | 1/2007 |
| JP | 2007-058615 A | 3/2007 |

OTHER PUBLICATIONS

Office Action issued on Mar. 27, 2012 in the corresponding Japanese Patent application No. 2007-233675.

(Continued)

*Primary Examiner* — Tuan Ho
(74) *Attorney, Agent, or Firm* — NDQ&M Watchstone LLP

(57) ABSTRACT

Sound correction processing is performed for a sound signal obtained from a sound collecting portion. In particular, sound correction processing is performed after determining what is performed as the sound correction processing based on an image signal paired with a sound signal, the image signal obtained from an imaging portion, the sound signal, control data of the imaging portion, and the like.

8 Claims, 32 Drawing Sheets

OTHER PUBLICATIONS

English language abstract for JP 2007-013255A published Jan. 18, 2007.
English language abstract for JP 2000-278581A published Oct. 6, 2000.
English language abstract for JP H04-061571A published Feb. 27, 1992.
Office Action issued on May 8, 2012 in the corresponding Japanese Patent application No. 2008-139647.
English language abstract for JP 2003-298916A published Oct. 17, 2003.
English language abstract for JP 2002-034092A published Jan. 31, 2002.
English language abstract for JP 2007-058615A published Mar. 8, 2007.

* cited by examiner

Fig.32
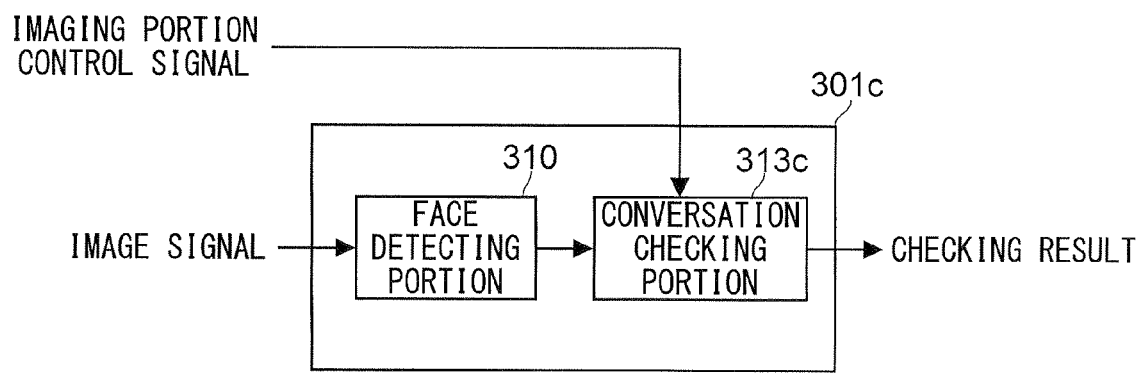
Fig.33A               Fig.33B
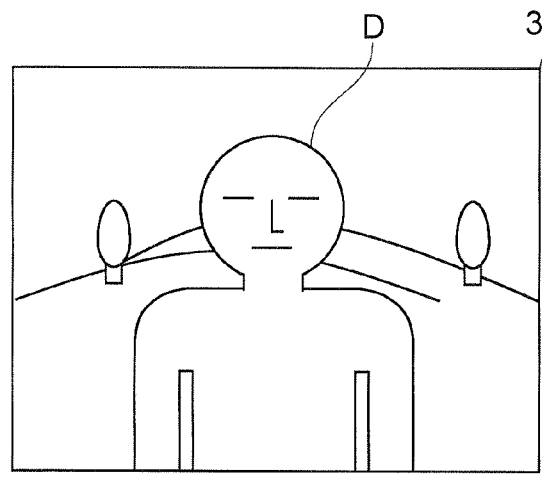 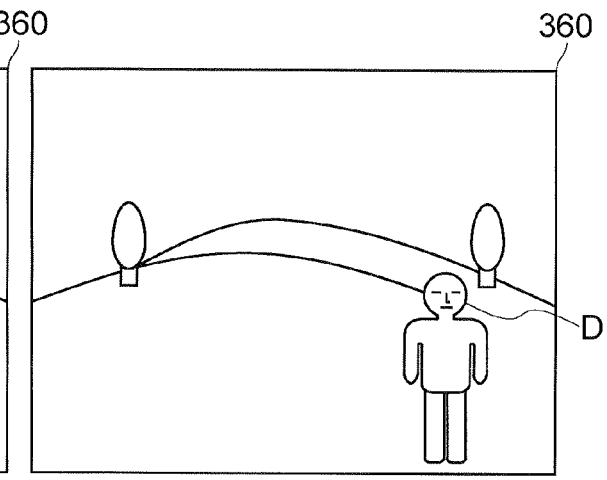

SOUND CORRECTOR, SOUND RECORDING DEVICE, SOUND REPRODUCING DEVICE, AND SOUND CORRECTING METHOD

This application is based on Japanese Patent Applications Nos. 2007-233675, 2007-331428, and 2008-139647 filed on Sep. 10, 2007, Dec. 25, 2007, and May 28, 2008 respectively, the contents of which are hereby incorporated by reference.

BACKGROUND OF THE INVENTION

1. Field of the Invention

The present invention relates to sound correctors that correct a sound paired with an image, to sound recording devices and sound reproducing devices provided with such sound correctors, and to a sound correcting method.

2. Description of Related Art

In recent years, imaging devices, such as video cameras, that can record a sound along with an image have been widespread. In particular, various types of imaging devices that can perform sound control have been proposed.

For example, an imaging device has been proposed that increases the degree of agreement between an image and a sound by correcting the volume or frequency characteristics of the sound collected by a microphone according to a change in the zoom factor of a lens.

However, controlling the sound by the above imaging device does not necessarily realize the device operator's intended sound control. For example, in a case where the face of a person occupies a wide area in the screen, it is considered that the device operator places importance on the target person. Therefore, it is preferable to perform voice band emphasis control on the collected sound. On the other hand, in a case where the size of a person's face is small relative to the screen, it is considered that the device operator is taking images with importance placed on the atmosphere of a place as well as the person. In this case, performing voice band emphasis control on the collected sound is not preferable, because this damages the atmosphere of the place. However, if the sound is controlled according to the zoom factor of a lens, the sound control is performed regardless of the size of a specific subject such as a person or the presence or absence thereof.

In addition, for example, an imaging device has been proposed that detects a human face, the movement of a mouth, or the orientation of a face from an image for use in sound control. Specifically, proposed is an imaging device that detects a previously registered specific subject and, only when that specific subject is detected, emphasizes the sound. Other proposed devices include an imaging device that takes an image of the movement of a speaker's lip with the imaging device and corrects the sound produced by the speaker based on the movement thus taken to keep it at a comfortable volume, and an imaging device that prepares different sound control modes for different scenes, just as in the case of taking images with a digital video camera or the like, such that a scene is selected for recording before the taking of images.

However, in a case where the sound is emphasized based on the face or mouth image detection information, there is a possibility that the sound becomes different from the user's intended sound. For example, even when a lot of people are located within the imaging angle of view in an occasion such as an athletic meet, the sound is based on a person rather than the overall atmosphere. On the other hand, in a case where different sound control modes are prepared for different scenes, there is a need to set a scene manually. Therefore, if one forgets to make the setting, unintended sound control is performed. In addition, even in the same scene, the device operator's purpose (the device operator's intended sound) may be different in a zoomed state and a non-zoomed state. Such a situation cannot be dealt with by a simple mode setting.

Moreover, for example, an imaging device has been proposed that records the user's intended sound by controlling a sound collection environment when taking images and collecting sounds by making the directional characteristics in a sound collecting direction controllable. In particular, the device operator is allowed to change the directional characteristics in a sound collecting direction by changing a switch or an imaging mode.

However, this imaging device requires the device operator to previously change a switch or an imaging mode by constantly predicting a change in circumstances, making the operation complicated. In addition, the device operator easily makes operating errors, such as forgetting to perform switching, or tends to slow in performing switching. This causes a problem, such as recording of unnatural sound as a result of part or all of sounds not being collected or recorded, or unnecessary sound, such as sound produced during interruption of operation, being recorded. Furthermore, this also causes a problem, such as recording of unnatural images as a result of the images being blurred due to the movement of the imaging device at the time of switching, the images being disconnected due to a temporary halt in taking of images for performing switching, or the scene of the device operator taking time in performing switching being recorded as images. Moreover, since this device only allows the device operator to control the directional characteristics in a sound collecting direction when taking images and collecting sounds, it is impossible to control the directional characteristics at the time of reproduction.

SUMMARY OF THE INVENTION

A sound recording device according to the invention is provided with:

an imaging portion obtaining an image including a subject via a lens portion;

a sound collecting portion obtaining a sound; and a particular part detecting portion detecting a particular part of the subject from the image, wherein, based on the size of the particular part in the image, the particular part being detected by the particular part detecting portion, sound processing is performed for the sound obtained by the sound collecting portion.

A sound reproducing device according to the invention is provided with:

a particular part detecting portion detecting, from an image including a subject, a particular part of the subject, wherein the image and a sound are able to be reproduced, wherein reproduction is performed after performing sound processing for the sound based on the size of the particular part in the image, the particular part being detected by the particular part detecting portion.

A sound reproducing device according to the invention is provided with:

a particular part detecting portion detecting, from an image including a subject, a particular part of the subject, wherein the image and a sound recorded by a sound recording device are able to be reproduced, wherein based on the size of the particular part in the image, the particular part being detected by the particular part detecting portion, and zoom factor information or the focus distance information of a lens portion, sound processing is performed for the sound to be reproduced, wherein the sound recording device is provided with:

an imaging portion obtaining the image including the subject via the lens portion that can change a zoom factor and a focus distance;

a sound collecting portion obtaining the sound; and a recording portion recording at least one of the zoom factor information and the focus distance information of the lens portion along with the image and the sound.

A sound corrector according to the invention, the sound corrector correcting a sound recorded or reproduced in a pair with an image, wherein information on the number of people detected within an imaging angle of view of a camera with which the image is taken is inputted, and sound correction processing is performed for the sound according to the information on the number of people detected within the imaging angle of view.

A sound recording device according to the invention is provided with:

an imaging portion taking an image;

an image processing portion detecting the number of people located within an imaging angle of view of the imaging portion; and the above described sound corrector receiving, from the image processing portion, information on the number of people detected with in the imaging angle of view, wherein the sound recording device includes a capability of taking moving images.

A sound correcting method according to the invention, the sound correcting method correcting a sound recorded or reproduced in a pair with an image, wherein information on the number of people detected within an imaging angle of view of a camera with which the image is taken is inputted, and sound correction processing is performed for the sound according to the information on the number of people detected within the imaging angle of view.

A sound recording device according to the invention is provided with:

an imaging portion taking an image;

a sound collecting portion obtaining a sound paired with the image taken by the imaging portion;

a relationship checking portion checking a relationship between a subject included in the image and a device operator using the sound recording device, and outputting a checking result thus obtained; and a sound controlling portion controlling the sound obtained by the sound collecting portion based on the checking result outputted from the relationship checking portion, wherein the sound is recorded.

A sound reproducing device according to the invention is provided with:

a relationship checking portion checking a relationship between a subject included in an image paired with a sound and a device operator having taken the image of the subject at the time of image taking, and outputting a checking result thus obtained; and a sound controlling portion controlling the sound based on the checking result outputted from the relationship checking portion, wherein the sound is reproduced.

BRIEF DESCRIPTION OF THE DRAWINGS

FIG. 32 is a block diagram showing Example 3 of the relationship checking portion;

FIG. 33A is a schematic diagram of an image illustrating an example of a checking method performed by the conversation checking portion provided in the relationship checking portion of Example 3;

FIG. 33B is a schematic diagram of an image illustrating an example of a checking method performed by the conversation checking portion provided in the relationship checking portion of Example 3;

DETAILED DESCRIPTION OF PREFERRED EMBODIMENTS

Hereinafter, with reference to accompanying drawings, an imaging device typified by a video camera or the like will be described as an example of a sound recording device and a sound reproducing device according to the present invention.

<<Sound Recording Device>>
<Basic Configuration of the Imaging Device>

Figure 1:
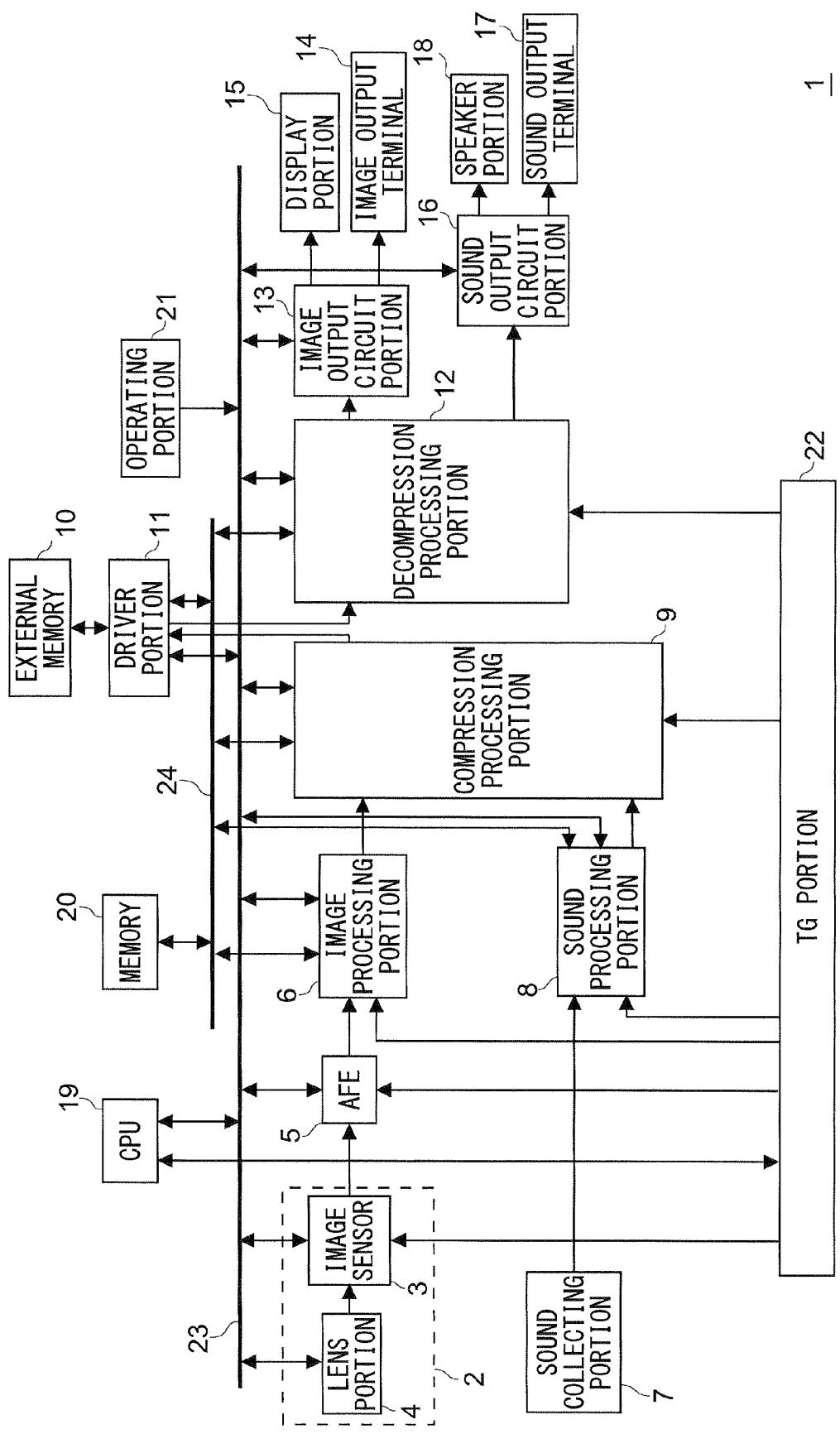
FIG. 1 is a block diagram showing the basic configuration of an imaging device in embodiments of the present invention.

First, the basic configuration of the imaging device, which is an example of the sound recording device, will be described by referring to FIG. 1. FIG. 1 is a block diagram showing the basic configuration of the imaging device of embodiments of the present invention.

As shown in FIG. 1, an imaging device 1 includes an imaging portion 2 that produces an image signal based on an inputted optical image. The imaging portion 2 includes an image sensor 3 built as a solid-state image sensing device such as a CCD (charge-coupled device) or CMOS (complementary metal-oxide-semiconductor) sensor that converts incident light into an electrical signal, and a lens portion 4 that forms an optical image on the image sensor 3 and adjusts the amount of light, the focus, and the like.

In addition, the imaging device 1 includes an AFE (analog front end) 5 that converts an analog image signal outputted from the image sensor 3 into a digital image signal, an image processing portion 6 that performs various types of image processing, such as gray level correction, on the digital image signal outputted from the AFE 5, a sound collecting portion 7 that converts inputted sound into an electrical signal, a sound processing portion 8 that converts an analog sound signal outputted from the sound collecting portion 7 into a digital sound signal and performs various types of processing thereon, a compression processing portion 9 that performs video compression coding, such as MPEG (Moving Picture Experts Group) compression schemes, on each of the image signal outputted from the image processing portion 6 and the sound signal outputted from the sound processing portion 8, an external memory 10 that records a compressed/encoded signal compressed/encoded by the compression processing portion 9, a driver portion 11 that records or reads the compressed/encoded signal into or from the external memory 10, and a decompression processing portion 12 that expands and decodes the compressed/encoded signal read from the external memory 10 by the driver portion 11.

In addition, the imaging device 1 includes an image output circuit portion 13 that converts the image signal obtained as a result of decoding performed by the decompression processing portion 12 back to an analog signal, an image output terminal 14 that outputs the image signal converted by the image output circuit portion 13, a display portion 15 built with an LCD and the like, the display portion 15 displaying an image based on the image signal outputted from the image output circuit portion 13, a sound output circuit portion 16 that converts the sound signal outputted from the decompression processing portion 12 back to an analog signal, a sound output terminal 17 that outputs the sound signal converted by the sound output circuit portion 16, and a speaker portion 18 that reproduces and outputs the sound based on the sound signal outputted from the sound output circuit portion 16.

Moreover, the imaging device 1 includes a CPU (central processing unit) 19 that controls the overall operation of the imaging device 1, a memory 20 that stores programs for performing different types of processing and temporarily stores data during program execution, an operating portion 21 built with an imaging start button, an imaging condition adjustment button, and the like, by which a user instruction is inputted, a timing generator (TG) portion 22 that outputs a timing control signal for controlling the timing with which the different parts operate, a bus line 23 that allows data to be exchanged between the CPU 19 and the different blocks, and a bus line 24 that allows data to be exchanged between the memory 20 and the different blocks.

Any type of external memory may be used as the external memory 10 as long as it can record a signal including an image or sound. For example, usable as the external memory 10 is a semiconductor memory such as an SD (Secure Digital) card, an optical disc such as a DVD (Digital Versatile Disc), or a magnetic disk such as a hard disk. It is also possible to make the external memory 10 removable from the imaging device 1.

The sound collecting portion 7 is so configured as to produce a sound signal including a plurality of channels. For example, the sound collecting portion 7 may be built as a stereo microphone that can produce a sound signal including right and left channels.

<Basic Operation of the Imaging Device>

Next, the basic operation of the imaging device 1 will be described by referring to FIG. 1. First, the imaging device 1 makes the image sensor 3 perform photoelectric conversion on the incident light from the lens portion 4, and thereby produces an image signal in the form of an electrical signal. The image sensor 3 outputs the image signals one after another to the AFE 5 with a predetermined frame period (for example, 1/60 second) in synchronism with the timing control signal inputted from the TG portion 22.

The image signal subjected to analog-to-digital conversion by the AFE 5 is inputted to the image processing portion 6. The image processing portion 6 converts the inputted image signal into an image signal composed of a brightness signal and a color-difference signal, and performs various types of image processing such as gray level correction or outline enhancement. The memory 20 operates as a frame memory, and temporarily stores the image signal when the image processing portion 6 performs processing.

At this point, in the lens portion 4, based on the image signal inputted to the image processing portion 6, the positions of different lenses are adjusted for focus adjustment or the degree of opening of an aperture is adjusted for exposure adjustment. The above focus or exposure adjustment is automatically performed based on a predetermined program, or performed by hand based on the user instruction, so as to achieve an optimum focus or exposure.

On the other hand, the sound collecting portion 7 converts the collected sound into an electrical signal, and thereby produces a sound signal. The sound signal thus produced is inputted to the sound processing portion 8, and is converted from an analog sound signal to a digital sound signal. In addition, various types of processing such as denoising and intensity control are performed. The sound processing portion 8 obtains the image signal outputted from the image processing portion 6 as needed.

The image signal outputted from the image processing portion 6 and the sound signal outputted from the sound processing portion 8 are inputted to the compression processing portion 9, and are compressed in the compression processing portion 9 by using a predetermined compression scheme. At this point, the image signal and the sound signal are correlated with each other in terms of time, such that the image is reproduced with synchronized sound. The compressed image signal and sound signal are recorded in the external memory 10 via the driver portion 11.

In a case where only sound is recorded, the sound signal is compressed in the compression processing portion 9 by using a predetermined compression scheme, and is recorded in the external memory 10.

While such an imaging operation is performed, the TG portion 22 feeds a timing control signal to the AFE 5, the image processing portion 6, the sound processing portion 8, the compression processing portion 9, and the decompression processing portion 12, such that these portions operate in synchronism with a frame-by-frame imaging operation performed by the image sensor 3.

When an instruction to reproduce the compressed/encoded signal recorded in the external memory 10 is given via the operating portion 21, the compressed/encoded signal recorded in the external memory 10 is read by the driver portion 11, and is fed to the decompression processing portion 12. In the decompression processing portion 12, the compressed/encoded signal is expanded and decoded by using an MPEG compression coding scheme, whereby the image signal and sound signal are obtained. The image signal is fed, via the image output circuit portion 13, to the display portion 15, in which the image is reproduced, and the sound signal is fed, via the sound output circuit portion 16, to the speaker portion 18, in which the sound is reproduced. Thus, the image and sound based on the compressed/encoded signal recorded in the external memory 10 are displayed and reproduced.

The sound processing portion 8 may be construed as a sound corrector according to the present invention, or a sound corrector according to the present invention may be construed as including part of the sound processing portion 8. From the viewpoint of miniaturization and cost reduction, it is preferable that the sound corrector according to the present invention be built as one LSI package.

In the case of a so-called preview mode that allows the user to check the image displayed by the display portion 15 or the like without recording the taken images, the image signal outputted from the image processing portion 6 may be outputted to the image output circuit portion 13 without being subjected to compression. At the time of recording of the image signal, the image signal may be outputted to the display portion 15 or the like via the image output circuit portion 13 while being compressed by the compression processing portion 9 and recorded in the external memory 10.

Figure 2:
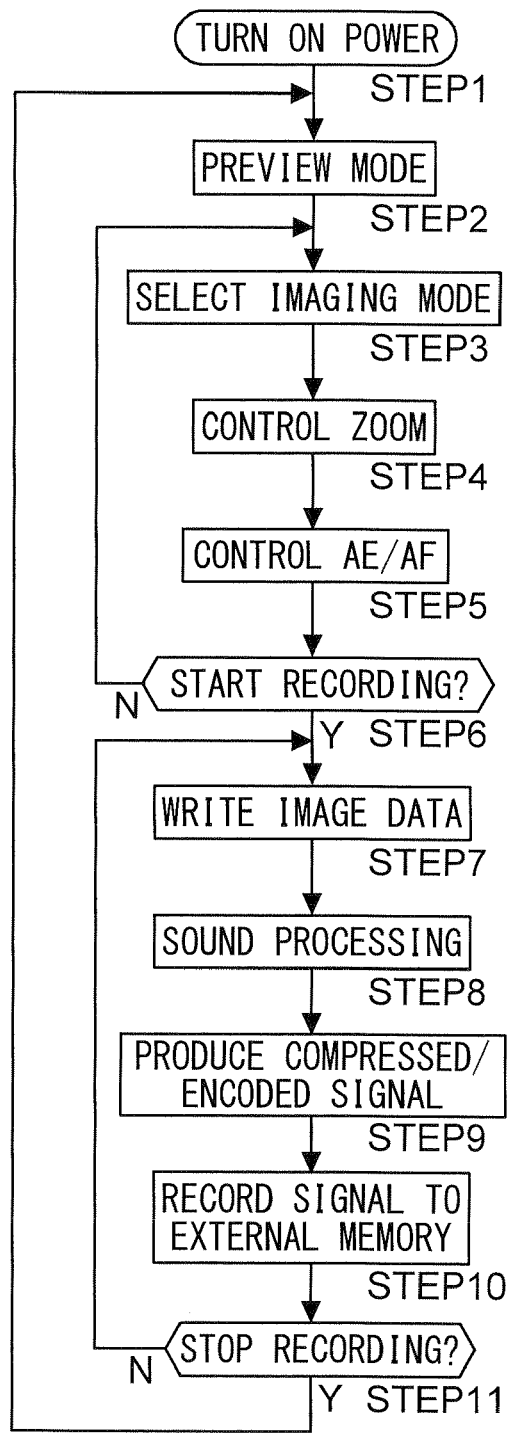
FIG. 2 is a flow chart showing an example of operation of the imaging device.

The imaging device 1 may be operated as shown in FIG. 2. FIG. 2 is a flow chart showing an example of operation of the imaging device. In particular, FIG. 2 is a flow chart showing an example of operation performed when moving images are taken.

First, when the user turns on the power (STEP 1) after operating the operating portion 21 to set the imaging device 1 to take moving images, the drive mode of the imaging device 1, that is, the drive mode of the image sensor 3, is set to a preview mode (STEP 2). Then, imaging mode input is waited for. If no imaging mode is inputted, it is assumed that a normal imaging mode is selected (STEP 3).

Subsequently, when the user operates the operating portion 21 so as to achieve an intended angle of view with respect to a subject to be taken, the optical zoom factor according to the operation is set (STEP 4). At this point, based on the image signal inputted to the image processing portion 6, the CPU 19 controls the lens portion 4 so that optimum exposure control (automatic exposure (AE)) and focusing control (auto focus (AF)) are performed (STEP 5).

When a recording start instruction is given (Y in STEP 6) by pressing the recording start button (which may double as a shutter button for still images) of the operating portion 21 all the way, recording operation is started, and an image signal, which is an analog signal obtained by photoelectric conversion performed by the image sensor 3, is outputted to the AFE 5. In the AFE 5, the image signal (raw data) in the form of an analog signal is converted into a digital signal, and is written to the memory 20 serving as a frame memory (STEP 7).

In the image processing portion 6, various types of image processing, such as signal conversion processing for producing a brightness signal and a color-difference signal, are performed. On the other hand, in the sound processing portion 8, A/D conversion is performed on a sound signal, which is an analog signal obtained as a result of the sound input to the signal collecting portion 7, and various types of sound processing are performed (STEP 8). The processed image signal and sound signal are inputted to the compression processing portion 9, are then subjected to compression coding, and are then each outputted as a compressed/encoded signal (STEP 9).

The compressed/encoded signal is fed to the driver portion 8, and is recorded in the external memory 10 (STEP 10). At this point, the compressed/encoded signal recorded in the external memory 10 is read by the driver portion 11 and is fed to the decompression processing portion 12, and is then expanded into an image signal. The image signal thus obtained is fed to the display portion 15, whereby the subject image that is currently taken via the image sensor 3 is displayed. When a recording stop instruction is given (Y in STEP 11) by pressing once again the recording start button of the operating portion 21 all the way, the step goes back to the preview mode (STEP 2).

<<Sound Processing Portion>>

First Embodiment

Hereinafter, a first embodiment of the sound processing portion will be described with reference to the drawings.

Example 1

Figure 3:
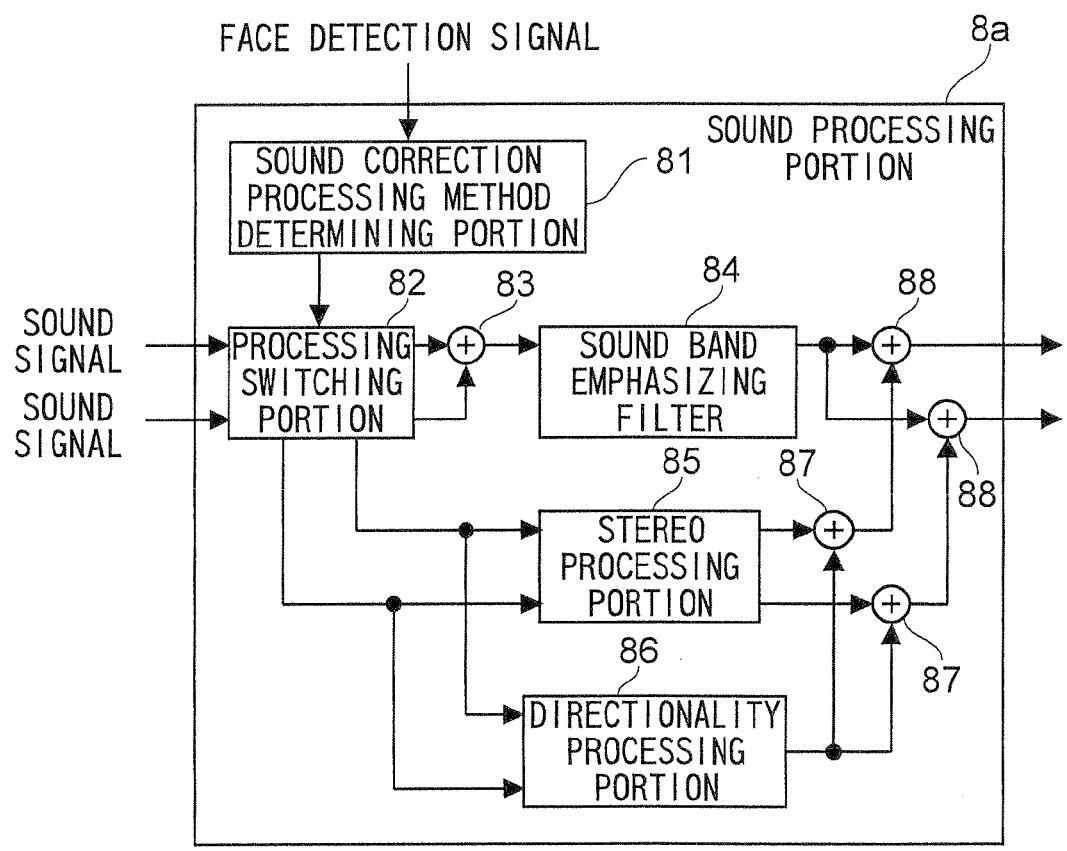
FIG. 3 is a block diagram showing the configuration of a principal portion of Example 1 of the sound processing portion of the first embodiment.
Figure 4:
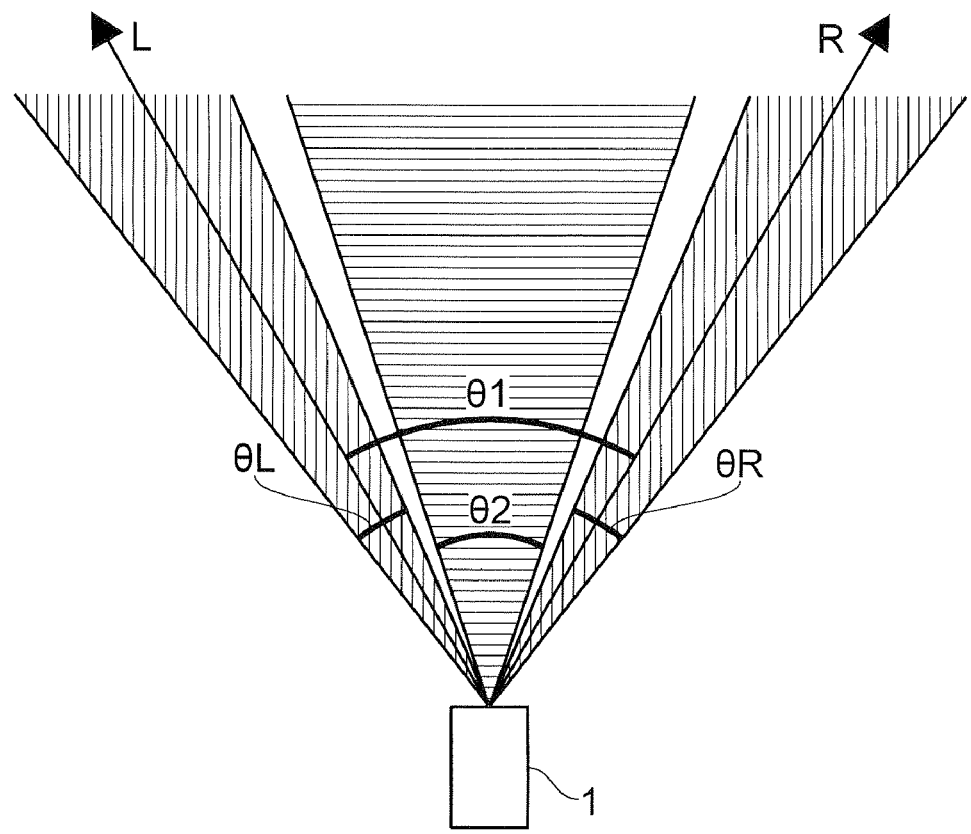
FIG. 4 is a schematic diagram of a stereo angle and a directional angle.

FIG. 3 is a block diagram showing the configuration of a principal portion of Example 1 of the sound processing portion of the first embodiment, and FIG. 4 is a schematic diagram of a stereo angle and a directional angle.

As shown in FIG. 3, the sound processing portion 8*a* includes: a sound correction processing method determining portion 81 that determines sound correction processing in response to a face detection signal from the image processing portion 6; a processing switching portion 82 that receives a sound correction processing signal outputted from the sound correction processing method determining portion 81, and switches a destination to which a plurality of sound signals outputted from the sound collecting portion 7 are outputted; a first adder 83 that performs the addition of the plurality of sound signals outputted from the processing switching portion 82 at a predetermined ratio to obtain a monaural signal; a sound band emphasizing filter 84 that emphasizes a specific band of the monaural sound signal obtained by the first adder 83; a stereo processing portion 85 that performs stereo processing on the plurality of sound signals outputted from the processing switching portion 82; a directionality processing portion 86 that performs directionality processing on the plurality of sound signals outputted from the processing switching portion 82; second adders 87 provided one for each of the sound signals for performing the addition of each of the plurality of sound signals subjected to the stereo processing by the stereo processing portion 85 and the sound signal subjected to directionality processing by the directionality processing portion 86 at a predetermined ratio; and third adders 88 provided one for each of the sound signals for performing, at a predetermined ratio, the addition of each of the sound signals obtained as a result of the addition by the second adders 87 and the monaural sound signal processed by the sound band emphasizing filter 84 so as to emphasize a specific band. The sound signals obtained as a result of the addition by the third adder 88 are outputted to the compression processing portion 9.

When sound correction processing is started, initialization is first performed such that the stereo angle is set to a maximum or minimum value in the directionality processing portion 86. This initialization is optional. In this embodiment, the stereo angle denotes an angle θ1 formed by a right-hand directional direction R and a left-hand directional direction L of three sound collecting directions shown in FIG. 4, the three sound collecting directions of the sound collecting portion 7 provided in the imaging device 1. As for a front direction of the sound collecting portion 7, it is possible to change a directional angle θ2 which is an angle indicating a principal sound collecting range. In the following description, the directional angle θ2 is also referred to as the "front directionality". FIG. 4 also shows right and left directional angles θR and θL. The stereo angle θ1 and the front directionality θ2 can be changed by the directionality processing portion 86 provided in the sound processing portion 8*a*.

Next, the image is read, and the image thus read is checked for the presence of a face of a person who is a specific subject. In this embodiment, descriptions will be given of a case where a specific subject is a person. However, the specific subject is not limited to a person, but may be an animal, for example, as long as it makes a sound.

(Face Detection Processing)

Here, face detection processing will be described. The face detection processing is performed for detecting a person's face from the inputted image signal. The face detection processing is performed by a face detector 50 shown in FIG. 5. The face detector 50 may be provided in the image processing portion 6, or may be provided in the sound processing portion 8.

Figure 5:
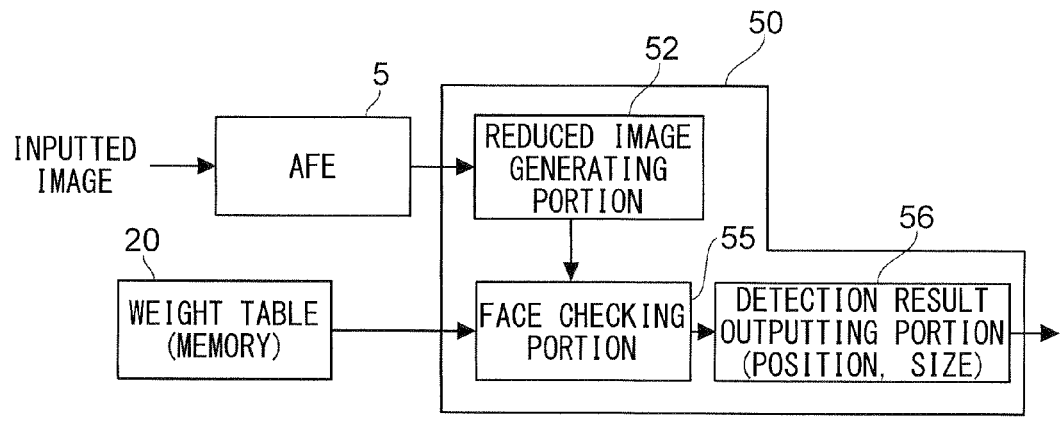
FIG. 5 is a block diagram showing the configuration of a face detector.

FIG. 5 is a block diagram showing the configuration of the face detector. The face detector 50 includes: a reduced image generating portion 52 that generates one or plurality of reduced images based on the image signal obtained from the AFE 5; a face checking portion 55 that checks for the presence of a face in an input image by using different-stage images consisting of the input image and the reduced image and a weight table for face detection stored in the memory 20; and a detection result outputting portion 56 that outputs a detection result of the face checking portion 55. If a face is detected, the detection result outputting portion 56 outputs the size and position of the detected face based on the input image and the distance to the face estimated from the size of the face.

The weight table stored in the memory 20 is obtained based on a large number of teacher samples (face and non-face sample images). Such a weight table can be created by using, for example, a known learning algorithm called Adaboost (Yoav Freund, Robert E. Schapire, "A decision-theoretic generalization of on-line learning and an application to boosting", European Conference on Computational Learning Theory, Sep. 20, 1995).

Adaboost is one of the adaptive boosting learning algorithms, which realizes a high-accuracy classifier by selecting a plurality of effective weak classifiers from among a plurality of candidate weak classifiers based on a large number of teacher samples, and assigning weight to the weak classifiers thus selected and integrating them. Here, the weak classifier denotes a classifier that, despite performing better than random classification, does not offer satisfactory level of accuracy. At the time of selection of the weak classifier, if there exists the selected weak classifier, learning is intensively performed on the teacher samples that would be erroneously classified by the selected weak classifier, and thereby selecting the most effective weak classifier from among the remaining candidate weak classifiers.

Figure 6:
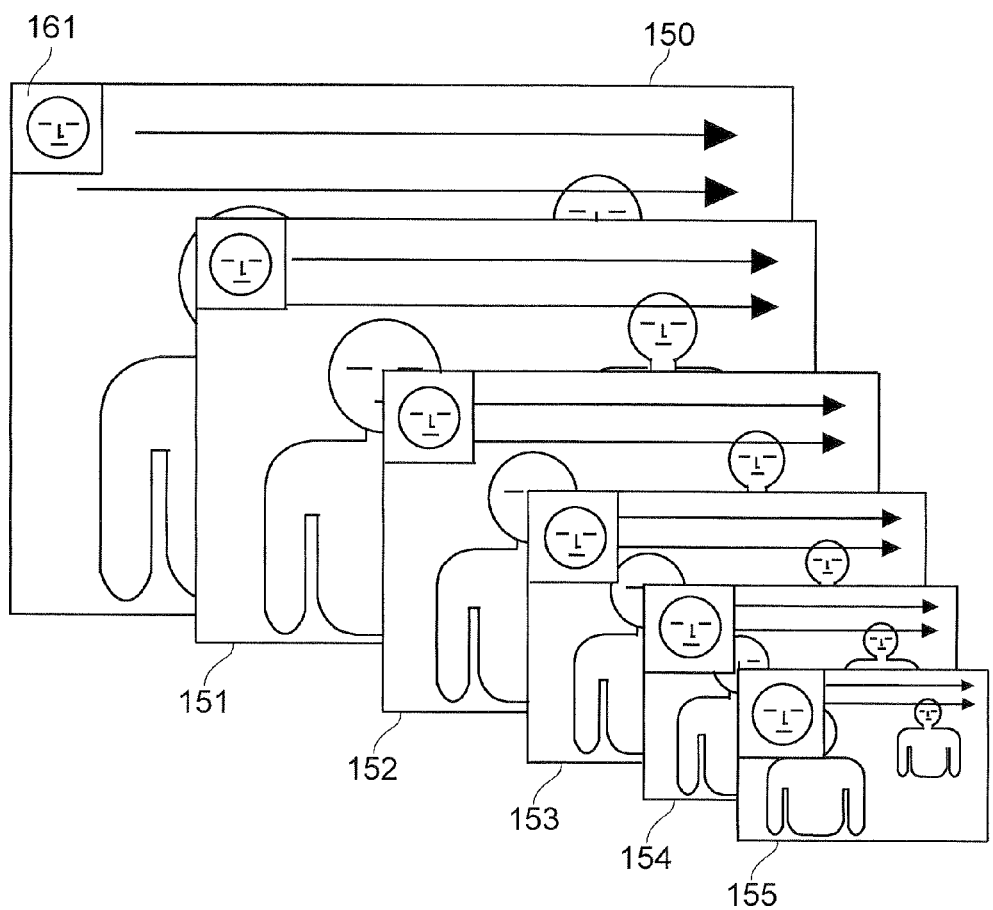
FIG. 6 is a schematic diagram showing an example of a different-stage image obtained by the reduced image generating portion 52.

FIG. 6 shows an example of the different-stage image obtained by the reduced image generating portion 52. This example shows a plurality of different-stage images that are generated at a reduction ratio of 0.8. In FIG. 6, 150 denotes an input image, 151 to 155 denote reduced images, and 161 denotes a determination region. In this example, the determination region is set to 24 pixel by 24 pixel region. The determination region of the same size is used for the input image and the reduced images. Also, in this example, as indicated by arrows, the determination region is slid from left to right on each different-stage image. By performing horizontal scanning from top to bottom, a face image that matches the determination region is detected. It is to be understood that the scanning sequence is not limited to this specific sequence. The reason that the plurality of reduced images 151 to 155 are generated in addition to the input image 150 is that it is thereby possible to detect faces having different sizes by using one type of weight table.

Figure 7:
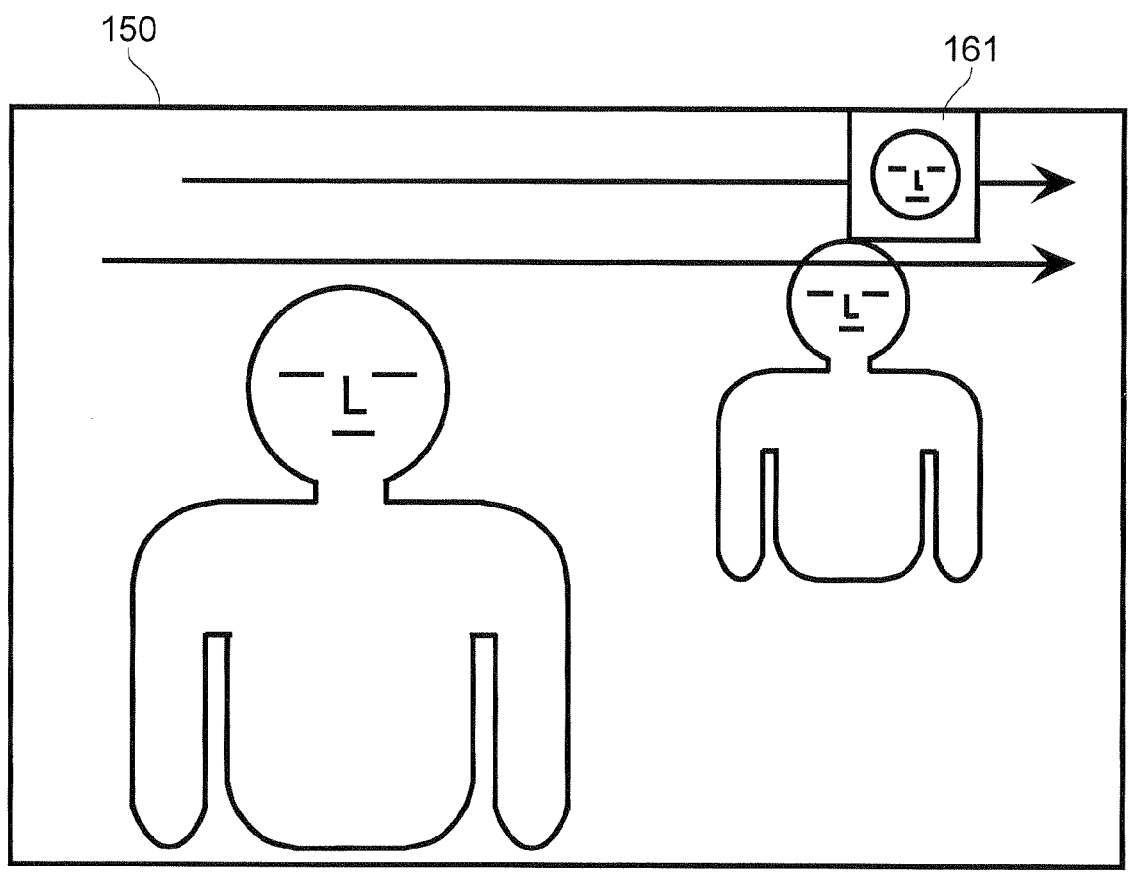
FIG. 7 is a diagram illustrating face detection processing.

FIG. 7 is a diagram illustrating the face detection processing. The face detection processing by the face checking portion 55 is performed on the different-stage images in the same manner. Therefore, in the following description, only face detection processing performed on the input image 150 is explained. In FIG. 7, the input image 150 and the determination region 161 set in the input image are shown.

The face detection processing performed on each different-stage image is performed by using an image corresponding to the determination region set in the different-stage image and the weight table. The face detection processing includes a plurality of determination steps, proceeding from rough to fine determination. If no face is detected in one determination step, the step does not proceed to the next determination step, and determination is made that there is no face in this determination region. Only when a face is detected in all the determination steps, determination is made that there is a face in this determination region. Then, the determination region is scanned, and the processing proceeds to determination in the next determination region. Based on which different-stage image is used when the face is detected, it is possible to estimate the size of the face based on the input image and the distance to the face. Then, the position and size of the detected face and the distance to a person having that face are outputted by the detection result outputting portion 56.

In a case where no face is detected in the read image in this face detection processing, the sound correction processing method determining portion 81 judges that an image with no person is being taken, and performs sound processing such that the ambient sound is recorded so as to make the scene alive. As an example of such sound processing, the directionality processing portion 86 makes larger the stereo angle θ1 (for example, 90°), and the stereo processing portion 85 converts the sound collected by the sound collecting portion 7 into stereo. In this embodiment, sound processing includes not only processing the sound signal, but also changing the stereo angle.

Figure 8:
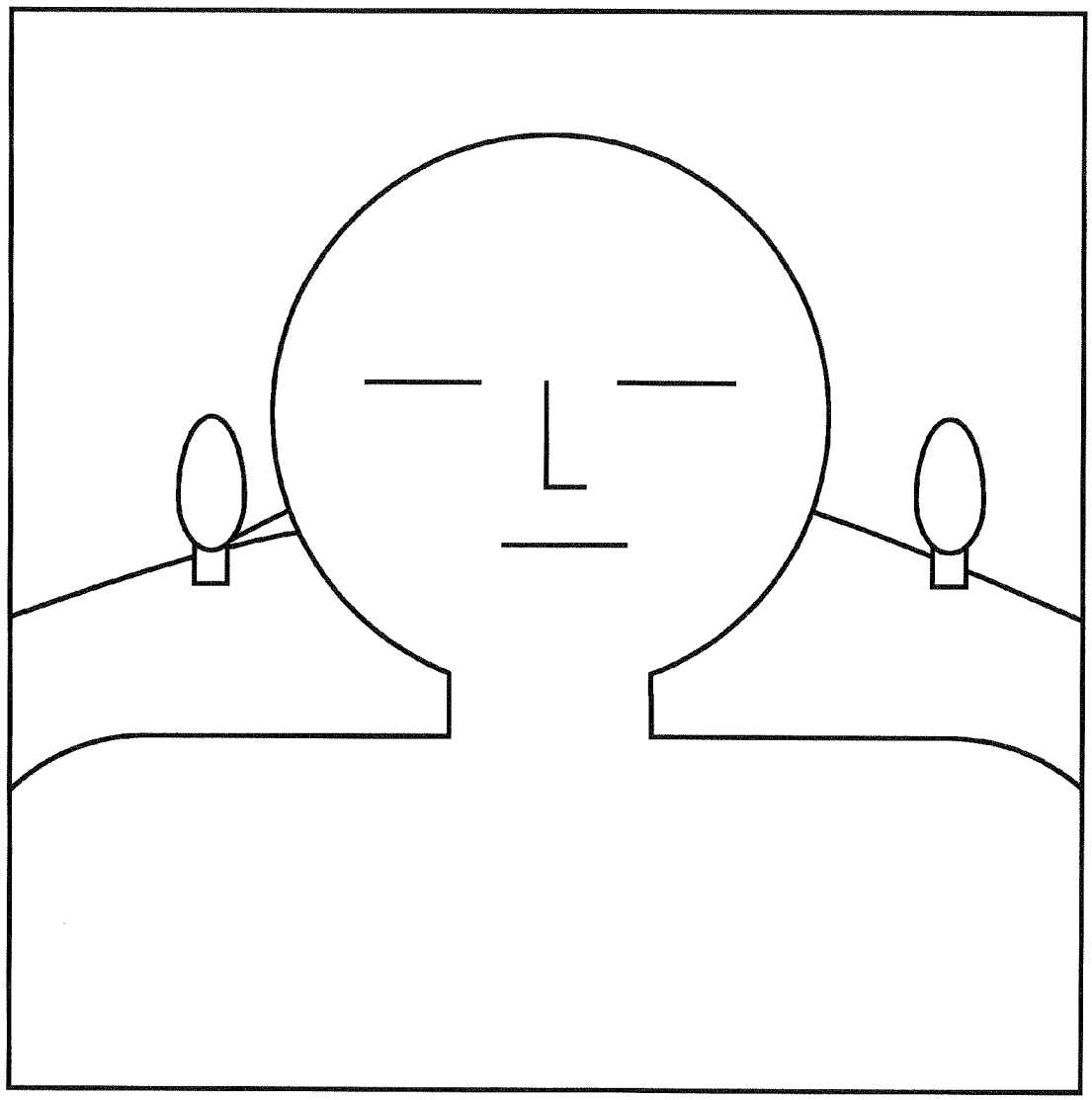
FIG. 8 shows an example of an image in which a person who is a specific subject occupies a large part thereof.
Figure 9:
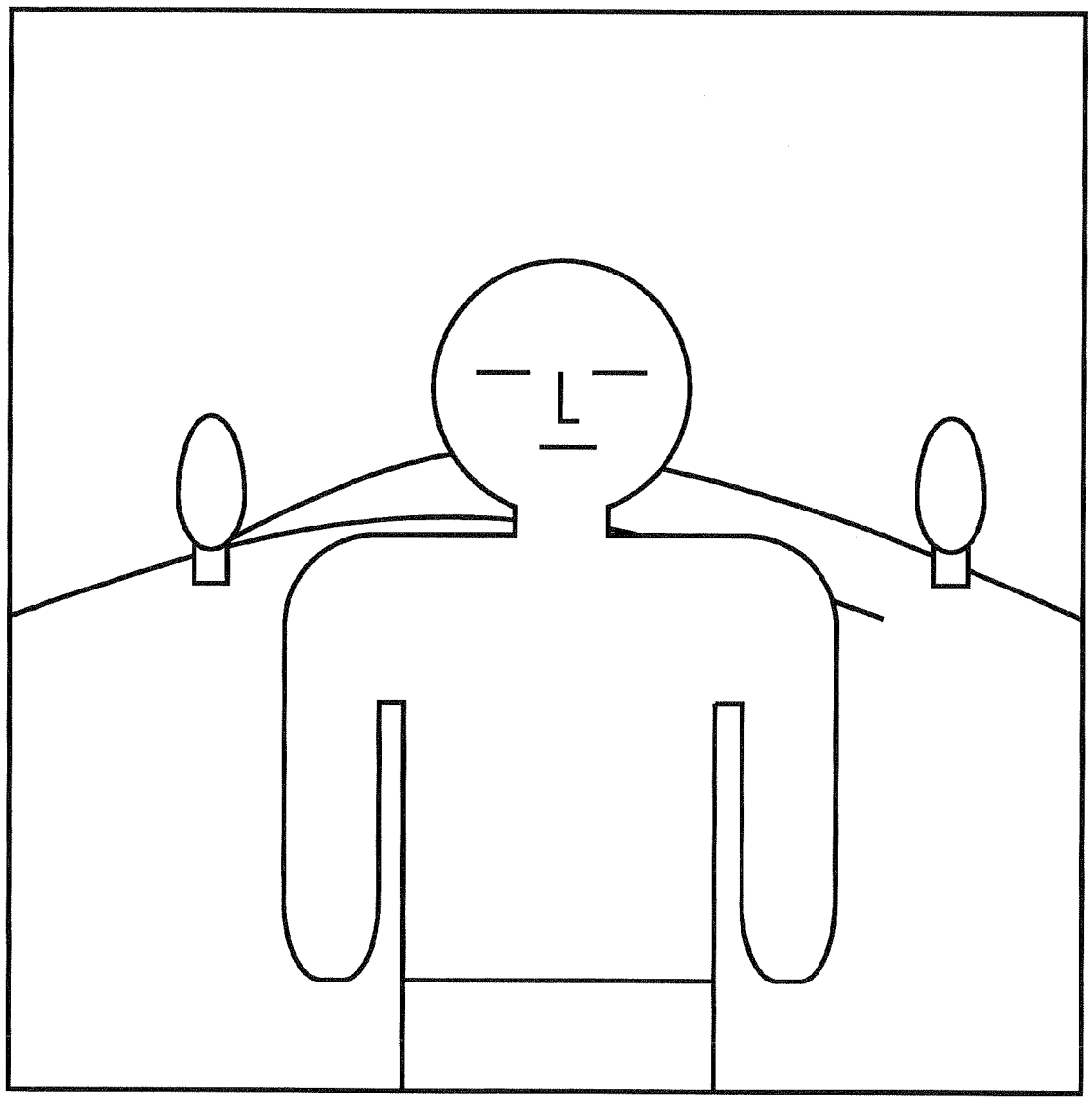
FIG. 9 shows an example of an image in which a person who is a specific subject occupies a small part thereof.

In a case where the size of a person is equal to or larger than a predetermined size (for example, in a case where the face covers 30 or 50% percent of the image area; in FIG. 8, 30%), it is considered that the device operator has taken the image with importance placed on the person. Thus, sound processing is performed such that the sound of the person in the image is made clearly audible. On the other hand, in a case where the size of the person is smaller than a predetermined size (in FIG. 9, 5%), it is considered that the device operator has taken the image with importance placed on the atmosphere of a place as well as the person. Thus, sound processing is performed such that the sound of the person in the image is emphasized and the ambient sound is recorded so as to make the scene alive. The percentage of the face in the image can be obtained based on in which different-stage image the face is detected by the face detector 50. Table 1 shows an example of sound processing in this embodiment.

TABLE 1

| Size of Person: Large | Converted into Monaural Emphasize Person's Sound |
| Size of Person: Small | Front directionality θ2: Small Converted into Stereo |

In a case where the size of the person is equal to or larger than a predetermined size, processing is performed such that the sound signal collected by the sound collecting portion 7 is converted into monaural with the first adder 83, and the monaural sound signal is processed by the sound band emphasizing filter 84 so as to emphasize a voice band (for example, 80 Hz to 1 kHz). Then, the second adders 87 and the third adders 88 perform the addition of the plurality of sound signals subjected to the stereo processing as appropriate by the stereo processing portion 85 and the sound signal subjected to the directionality processing as appropriate by the directionality processing portion 86 while adjusting the signal level as appropriate. Instead of emphasizing a specific band by converting the sound signal into monaural, it is possible to make larger the front directionality θ2 (for example, 90°) in the directionality processing portion 86. Moreover, the sound processing portion 8 may be so configured as to change the front directionality θ2 and convert the sound collected by the sound collecting portion 7 into monaural.

In a case where the size of the person is smaller than a predetermined size, processing is performed such that the directionality processing portion 86 makes smaller the front directionality θ2 (for example, 60° or 45°) of the sound signals collected by the sound collecting portion 7, the stereo processing portion 85 converts them into stereo, and the second adders 87 performs the addition of the resultant sound signals. In addition to that, the monaural sound signal obtained by processing performed as appropriate by the sound band emphasizing filter 84 so as to emphasize a specific band may be added thereto by the third adders 88. The configuration may be modified such that the sound processing portion 8a makes larger the stereo angle θ1 (for example, 120°) so as to record the ambient sound over a wide range and makes smaller the front directionality θ2 (for example, 60° or 45°) so as to emphasize the sound from the person, and adds up the ambient sound and the person's sound while appropriately adjusting the signal level.

In this way, by appropriately mixing the sound signals that have been processed according to the presence or absence of a person and the size of a person, it is possible to obtain the sound following a change in the image.

As described above, by performing sound processing according to the face size of a person, which is a predetermined subject, in the image, it is possible to record the device operator's intended sound along with the image according to the way the device operator is taking the image.

Example 2

Example 2 of this embodiment will be described with reference to the drawings. Example 2 differs from Example 1 in that sound correction processing is performed based not only on the size of a specific subject but also on the zoom factor of a lens. In other respects, Example 2 is the same as Example 1. Therefore, such blocks as are configured and operate in substantially the same manner as in Example 1 are identified with the same reference numerals.

Figure 10:
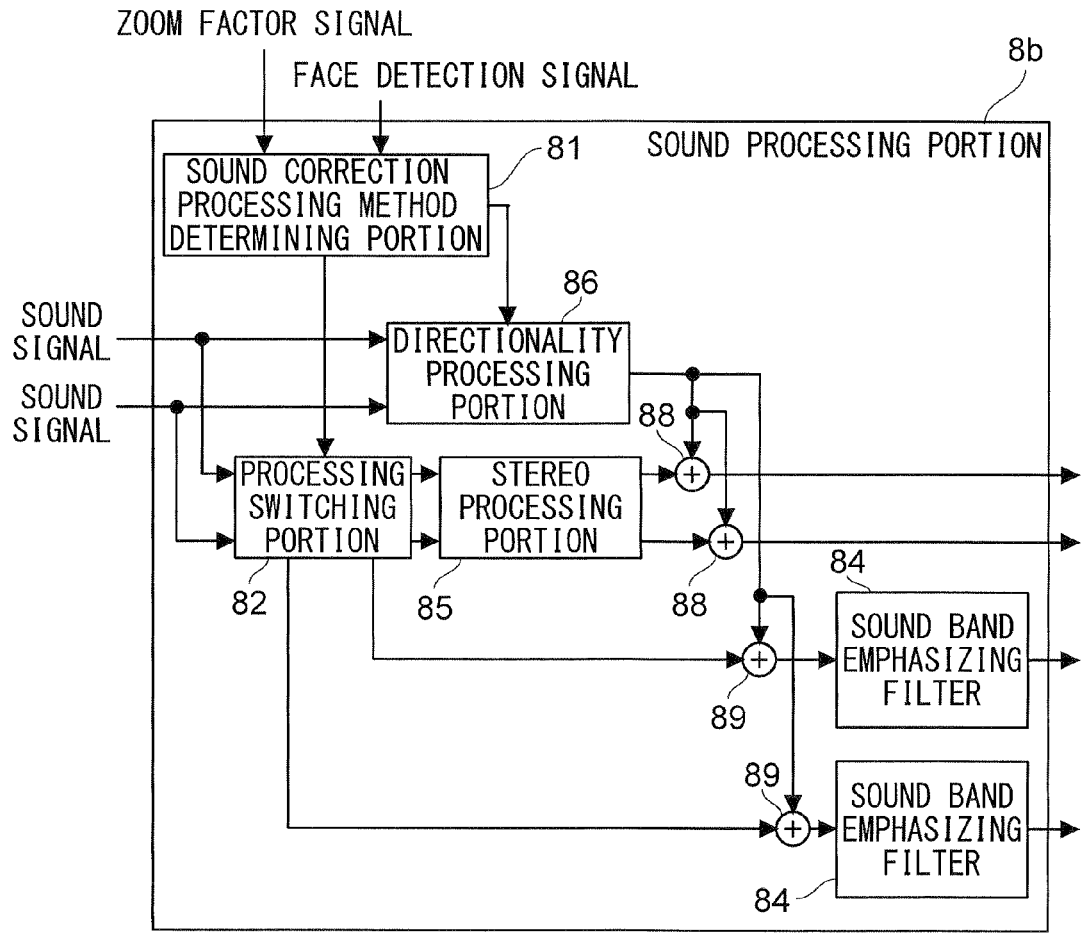
FIG. 10 is a block diagram showing the configuration of a principal portion of Example 2 of the sound processing portion of the first embodiment.

FIG. 10 is a block diagram showing the configuration of a principal portion of Example 2 of the sound processing portion of the first embodiment. A sound processing portion 8b of this embodiment includes: a sound correction processing method determining portion 81 that determines sound correction processing in response to zoom factor information from the lens portion 2 and a face detection signal from the image processing portion 6; a directionality processing portion 86 that receives a sound correction processing signal outputted from the sound correction processing method determining portion 81, and performs directionality processing on a plurality of sound signals outputted from a processing switching portion 82; a processing switching portion 82 that receives the sound correction processing signal outputted from the sound correction processing method determining portion 81, and switches a destination to which a plurality of sound signals outputted from the sound collecting portion 7 are outputted; a stereo processing portion 85 that performs stereo processing on the plurality of sound signals outputted from the processing switching portion 82; third adders 88 provided one for each of the sound signals for performing the addition of each of the plurality of sound signals subjected to the stereo processing by the stereo processing portion 85 and the sound signal subjected to directionality processing portion 86 at a predetermined ratio; fourth adders 89 provided one for each of the sound signals for performing the addition of each of the sound signals outputted from the processing switching portion 82 and the sound signal subjected to directionality processing by the directionality processing portion 86 at a predetermined ration; an sound band emphasizing filters 84 provided for one of each of the sound signals for emphasizing specific band of the sound signal obtained by the addition performed by a corresponding one of the fourth adders 89. The sound signals obtained by the addition performed by the third adders 88 and the sound signals processed by the sound band emphasizing filters 84 are outputted to the compression processing portion 9.

When sound correction processing is started, initialization is first performed such that the stereo angle is set to a maximum or minimum value in the directionality processing portion 86. This initialization is optional. Next, the image is read, and the image thus read is checked for the presence of a face of a person.

If no face is detected in the read image, the sound correction processing method determining portion 81 judges that an image with no person is being taken, and performs sound processing, as in Example 1, such that the ambient sound is recorded so as to make the scene alive.

On the other hand, if a face of a person is detected, sound processing according to the size of the person in the image and the zoom factor of the lens portion 4 is performed.

In a case where the size of the person is equal to or larger than a predetermined size, it is considered that the device operator has taken the image with importance placed on the person. Moreover, even when the sizes of the person are of the same in images, the person is at different distances from the imaging device depending on the zoom factor. Thus, the images are taken with different volume ratios of the person's sound to the background sound and at different appropriate stereo angles θ1 and front directivities θ2.

Figure 11:
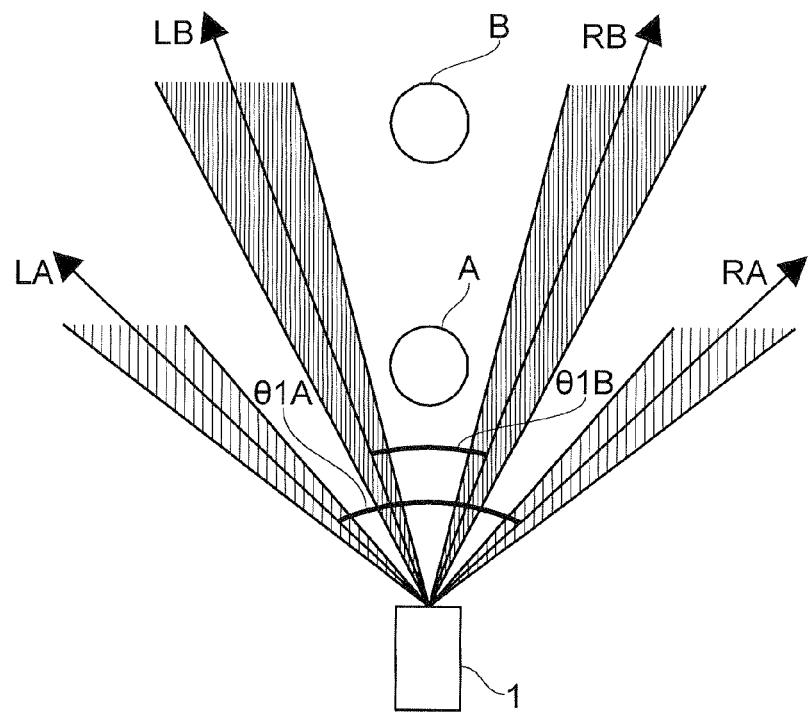
FIG. 11 is a schematic diagram showing a relationship between the distance from the imaging device to a person and an appropriate stereo angle.

First, the distance from the imaging device to a person and an appropriate stereo angle θ1 will be explained. FIG. 11 is a schematic diagram showing a relationship between the distance from the imaging device to the person and an appropriate stereo angle. In FIG. 11, a comparison of the case where the person is in a position A with the case where the person is in a position B that is farther away from the imaging device 1 than the position A reveals that, in the position A, an appropriate stereo angle θ1 at which the person in that position is captured with the ambient sound recorded so as to make the scene alive is θ1A; in the position B, it is θ1B. Thus, an appropriate stereo angle θ1 is larger in the position A. That is, the closer the target subject (in this case, the person), the larger an appropriate stereo angle θ1. Here, among three sound collecting directions of the stereo microphone 4 of the imaging device 1, a right-hand directional direction R and a left-hand directional direction L are denoted as RA and LA with respect to the stereo angle θ1A, and are denoted as RB and LB with respect to the stereo angle θ1B. If the sizes of the target subject are of the same in images, the smaller the zoom factor, the larger an the appropriate stereo angle θ1.

Figure 12:
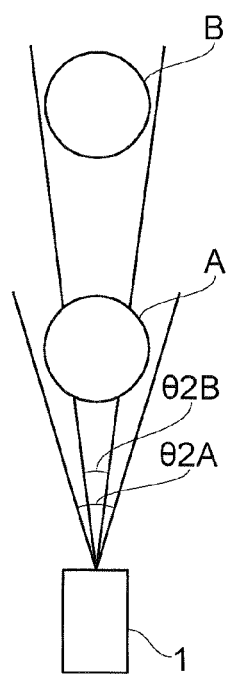
FIG. 12 is a schematic diagram showing a relationship between the distance from the imaging device to a person and an appropriate front directionality.

Next, the distance from the imaging device 1 to a person and an appropriate front directionality θ2 will be explained. FIG. 12 is a schematic diagram showing a relationship between the distance from the imaging device to the person and an appropriate front directionality. In FIG. 12, a comparison of the case where the person is in a position A with the case where the person is in a position B that is farther away from the imaging device 1 than the position A reveals that, in the position A, an appropriate front directionality θ2 at which the person is captured in its entirety is θ2A; in the position B, it is θ2B. Thus, an appropriate front directionality θ2 is larger in the position A. That is, the closer to the target subject (in this case, the person), the larger an appropriate front directionality θ2.

In a case where the size of the person is equal to or larger than a predetermined size, it is considered that the device operator has taken the image with importance placed on the person. Therefore, sound processing is performed such that the sound of the person in the image is made clearly audible. On the other hand, in a case where the size of the person is smaller than a predetermined size, it is considered that the image is taken with consideration given to the scenery and the atmosphere of a place as well as to the person. Therefore, sound processing is performed such that the sound of the person is emphasized and the ambient sound is recorded so as to make the scene alive. Usable as the reference to check the size of the person is the area of the image occupied by the face.

Table 2 shows an example of sound processing in Example 2.

TABLE 2

|  | Zoom Factor: Large | Zoom Factor: Small |
| --- | --- | --- |
| Size of Person: Large | Front directionality θ2: Normal Emphasize Person's Sound | Front directionality θ2: Large Emphasize Person's Sound |
| Size of Person: Small | Front directionality θ2: Small Stereo Angle θ1: Small | Front directionality θ2: Small Stereo Angle θ1: Large |

In a case where the size of the person is equal to or larger than a predetermined size, processing is performed such that a sound signal is processed by the sound band emphasizing filter 84 so as to emphasize a voice band (for example, 80 Hz to 1 kHz), the sound signal as obtained by the addition performed by the fourth adder 89 on a sound signal whose output destination is switched by the processing switching portion 82, the sound signal being in a state as collected by the sound collecting portion 7, and a sound signal processed by the directionality processing portion 86, and the resultant signal is outputted to the compression processing portion 9. At this point, the front directionality θ2 is made larger as the zoom factor becomes smaller, because the smaller the zoom factor, the closer the person. Instead, it is also possible to encode a voice band in the sound signal with a high sound quality. Moreover, the smaller the zoom factor, the closer the person is to the imaging device. With consideration given to this fact, in order to make the sound of the person have an appropriate loudness, the voice band in the sound signal may be processed such that the smaller the zoom factor, the greater the amount of volume attenuation; the greater the zoom factor, the greater the amount of volume amplification.

In a case where the size of the person is smaller than a predetermined size, a sound signal obtained by the addition performed by the third adder 88 on a sound signal subjected to the stereo processing by the stereo processing portion 85 and a sound signal subjected to the directionality processing by the directionality processing portion 86 is outputted to the compression processing portion 9. At this point, the front directionality θ2 is made smaller than that observed when the size of the person is equal to or larger than a predetermined size. In addition, if the zoom factor is large, the angle of view is narrow, and a main imaging target is considered to be distant scenery. On the other hand, if the zoom factor is small, the angle of view is wide, and a main imaging target is considered to be scenery around the imaging device including the atmosphere of the place. Therefore, as described above, the stereo angle θ1 is made larger as the zoom factor becomes smaller. It is also possible to encode a sound signal in a wider band. Moreover, the smaller the zoom factor, the closer the person is to the imaging device. With consideration given to this fact, in order to make the sound of the person have an appropriate loudness, the voice band in the sound signal may be processed such that the smaller the zoom factor, the greater the amount of volume attenuation; the greater the zoom factor, the greater the amount of volume amplification.

In Example 2, sound may be processed based on, instead of the zoom factor information from the lens portion 4, whether the focus distance obtained by the optimization of AF is equal to or greater than a predetermined distance or smaller than the predetermined distance. Also in this case, focus distance information may be recorded as an index. Instead, sound may be processed based on both the zoom factor information from the lens portion 4 and the focus distance obtained by the optimization of AF.

Figure 13:
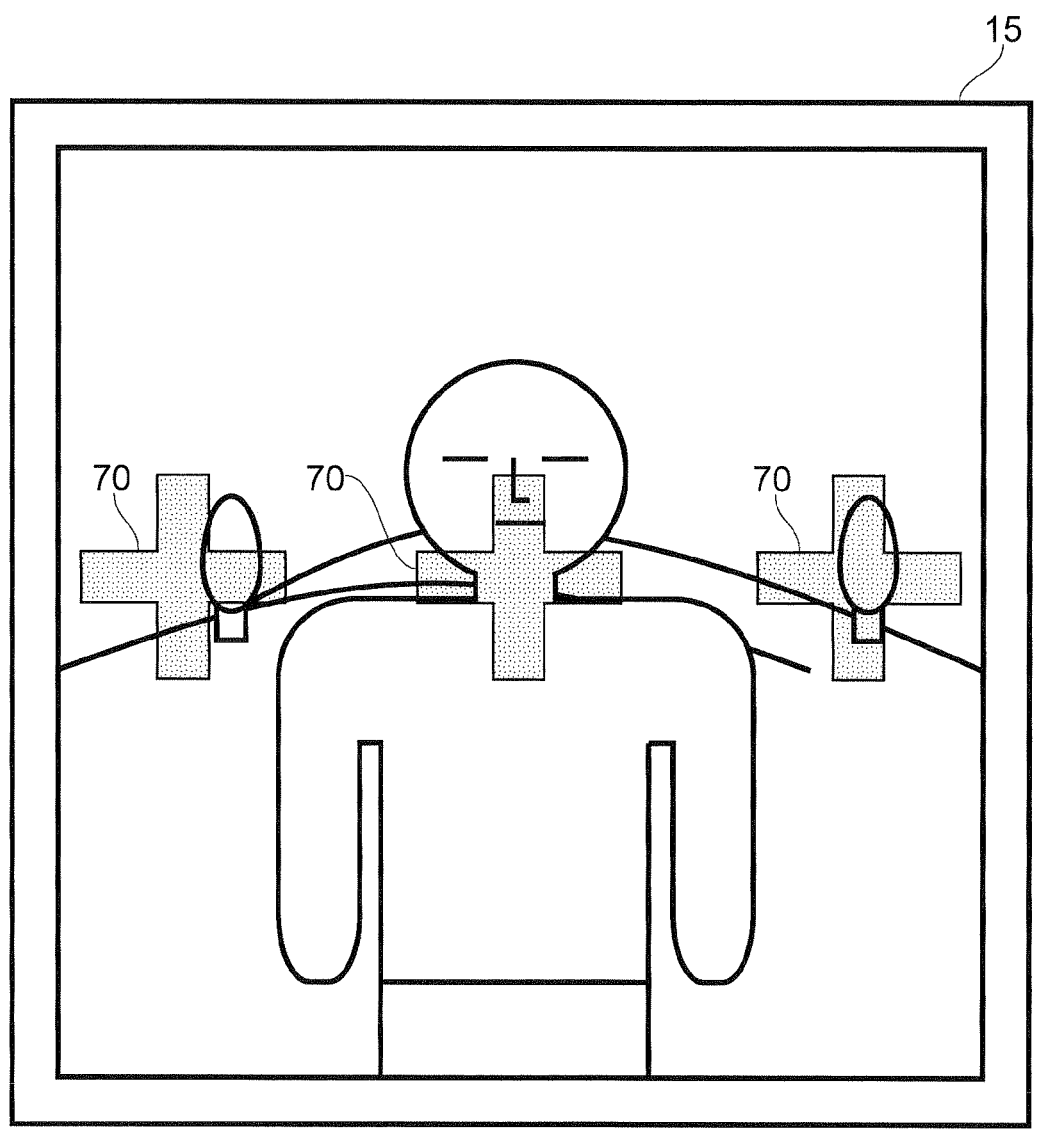
FIG. 13 shows an example of an image in which a sound emphasis mark is displayed.

In Examples 1 and 2, in a case where the stereo angle θ1 or the front directionality θ2 is controlled or the sound of a person is emphasized, it is possible to show a sound emphasis mark indicating the direction in which the sound is emphasized or the direction in which the stereo angle is measured in the image displayed by the display portion 15. For example, when the front directionality θ2 is controlled or the sound of a person is emphasized, a cross-shaped sound emphasis mark 70 shown in FIG. 13 is displayed at the center of the screen of the display portion 15; when the stereo angle θ1 is controlled, the sound emphasis marks 70 are displayed in the direction in which the stereo angle is measured, that is, on the right and left parts of the screen. This makes it possible to inform the device operator how the sound is emphasized, providing the device operator with a sense of ease. It is also possible to allow the device operator to control the stereo angle θ1 or the front directionality θ2 or to emphasize the sound of a person by operating the operating portion 21 while viewing the sound emphasis mark 70 displayed on the display portion 15.

In Examples 1 and 2, in a case where the target subject is found to be at a predetermined distance or more away from the imaging device based on the size of the target subject in the image or the zoom factor, the level of a sound signal to be recorded may be reduced if a sound signal that is equal to or higher than a predetermined level is detected. This makes it possible to keep the device operator's voice low in a case where, for example, the device operator says something while taking images of a person as a target subject, making it possible to clearly record the necessary voice of that person.

(Regarding Stereo Processing)

Figure 14:
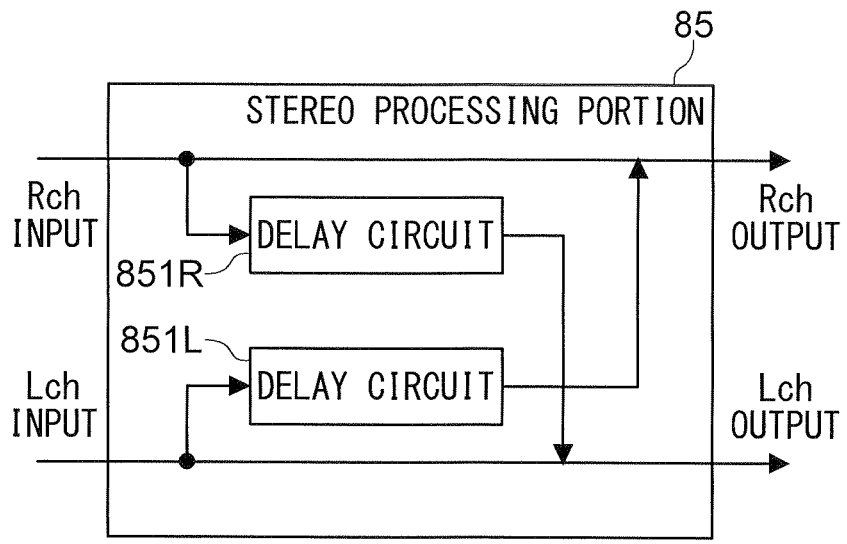
FIG. 14 is an example of a block diagram of the stereo processing portion.

An example of stereo processing in Examples 1 and 2 will be described. Here, as an example of stereo processing, a description will be given of a case where sounds coming from right- and left-hand directions are emphasized by using addition-type directionality control. FIG. 14 is a block diagram showing the stereo processing portion 85 used in such a case. The stereo processing portion 85 includes a delay circuit 851R that delays a right channel (Rch) sound signal and a delay circuit 851L that delays a left channel (Lch) sound signal. The stereo processing portion 85 combines the right channel sound signal in a state as inputted thereto and the left channel sound signal delayed by the delay circuit 851L, and outputs the resultant signal as a right channel sound signal, and combines the left channel sound signal in a state as inputted thereto and the right channel sound signal delayed by the delay circuit 851R, and outputs the resultant signal as a left channel sound signal.

Figure 15:
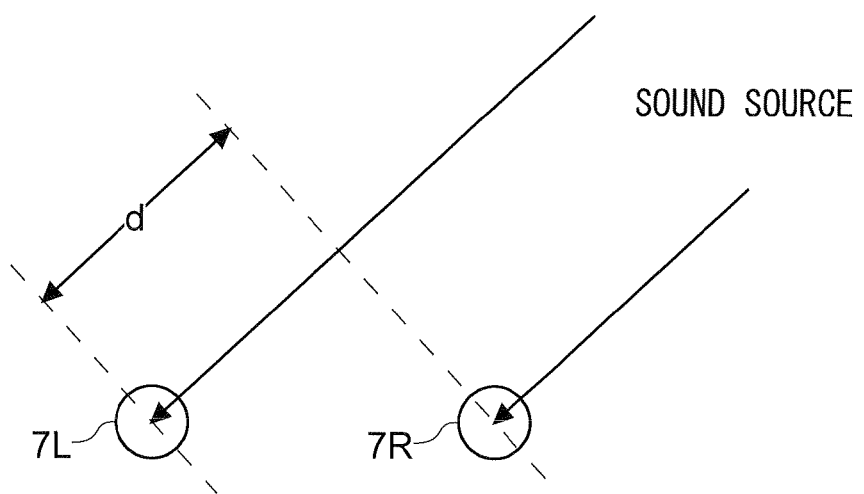
FIG. 15 is a schematic diagram illustrating a positional relationship between a microphone and a sound source.

As shown in FIG. 15, in a case where a sound comes from a particular direction toward two microphones 7R and 7L provided in the sound collecting portion 7, the sound reaches them with a delay corresponding to a path difference d between a path from the sound source to the microphone 7R and a path from the sound source to the microphone 7L. In this case, by introducing a delay corresponding to the path difference d into the right channel sound signal detected by the microphone 7R that is closer to the sound source with the delay circuit 851R, and adding the resultant signal to the left channel sound signal detected by the microphone 7L that is farther away from the sound source, synchronous addition is performed on the sound coming from the sound source. Thus, the sound coming from the right or left side is properly emphasized. By contrast, by introducing a delay into the sound signal detected by the microphone 7L in a similar manner with the delay circuit 851L and adding the resultant signal to the sound signal detected by the microphone 7R, the sound coming from the opposite direction is emphasized.

(Regarding Directionality Control)

Next, an example of directionality control in Examples 1 and 2 will be described. For directionality control, various methods have been proposed. One of those is a method using simple delay and addition processing, such as an addition-type, which has been explained in the above description of stereo processing, or a subtraction-type. Other examples are beam forming, a two-dimensional fan filter, and the like, which use a microphone array. Here, a method for emphasizing a sound coming from a particular direction based on phase information between the sound signals detected by two microphones will be described.

Figure 16:
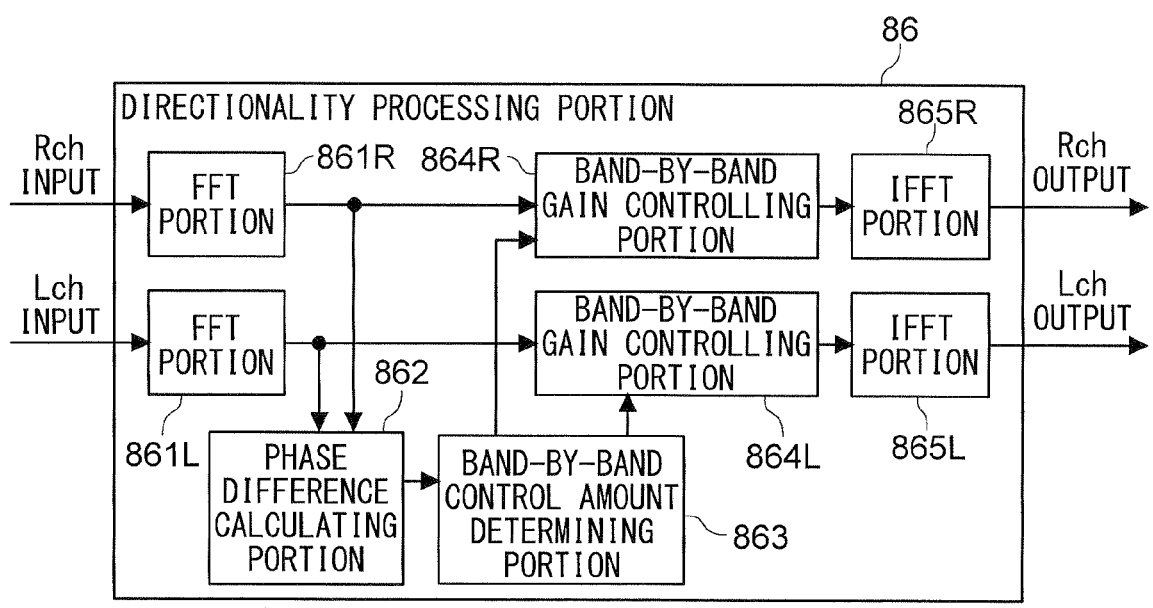
FIG. 16 is an example of a block diagram of the directionality processing portion.

FIG. 16 is a block diagram of the directionality processing portion 86 that can be used in the method. A shown in FIG. 16, the directionality processing portion 86 includes: two FFT portions 861R and 861L that independently perform the fast Fourier transform (FFT) on the right channel sound signal and the left channel sound signal respectively; a phase differences detecting portion 862 that detects the phase difference between the right channel sound signal subjected to the FFT by the FFT portion 861R and the left channel sound signal subjected to the FFT by the FFT portion 861L; a band-by-band control amount determining portion 863 that determines the amount of control of the directional characteristics on a band-by-band basis based on the phase difference information detected by the phase difference detecting portion 862; two band-by-band gain controlling portions 864R and 864L that independently perform gain control on a band-by-band basis on the right channel sound signal and the left channel sound signal, both of which have been subjected to the FFT, respectively, based on the amount of control determined by the band-by-band control amount determining portion 863; and IFFT portions 865R and 865L that respectively perform the inverse fast Fourier transform (IFFT) on the right channel sound signal and the left channel sound signal subjected to the gain control by the band-by-band gain controlling portions 864R and 864L.

When the right channel sound signal and the left channel sound signal are inputted, the FFT portions 861R and 861L perform the FFT on them, and calculate the phase information on a frequency band-by-frequency band basis. The phase difference detecting portion 862 calculates the phase difference based on the phase information of the right channel sound signal and the left channel sound signal, and, based on the phase difference thus calculated and the frequency thereof, calculates the direction from which the sound has come. The band-by-band control amount determining portion 863 checks whether or not the direction from which the sound component has come, the direction as calculated by the phase difference detecting portion 862, is a target direction, for example, a direction in which a predetermined subject lies in the image. If the band-by-band control amount determining portion 863 finds that the sound component have come from a direction other than the target direction, the spectrum coefficient obtained as a result of the FFT is reduced by the band-by-band gain controlling portions 864R and 864L; if the band-by-band control amount determining portion 863 finds that the sound component have come from the target direction, the spectrum coefficient is increased. Thereafter, the resultant spectrum coefficient is subjected to the IFFT by the IFFT portions 865R and 865L, is re-converted into the time signal, and is then outputted.

In this method, by setting a frequency at which the spacing between the two microphones is one-half wavelength long as an upper limit frequency for directionality control, it is possible to calculate an accurate direction from which the sound component has come, that is, a sound source direction, based on the phase difference. This makes it possible to finely adjust the directional angle.

(Regarding Index)

The index in which the zoom factor information is recorded is created once a frame, which is a unit of processing, at the time of compression and recording of the sound signal. For example, in a case where the sound signal is recorded as a 48-kHz sampling signal by using MPEG-AAC, one frame, a unit of processing, consists of 1024 samples, which corresponds to approximately 21.3 $(1024 \div (48 \times 10^3) \approx 2.13 \times 10^{-2})$ msec. Thus, it is necessary simply to record the zoom factor information of an image once every 21.3 msec in synchronism with the start of recording. In the case of Dolby Digital, one frame consists of 1536 samples, and, in a case where the sound signal is recorded as a 48-kHz sampling signal, it is necessary simply to record the zoom factor information of an image once every 32 $(1536 \div (48 \times 10^3) = 3.2 \times 10^{-2})$ msec.

Second Embodiment

Next, with reference to the drawings, a description will be given below of a second embodiment of the sound processing portion.

Figure 17:
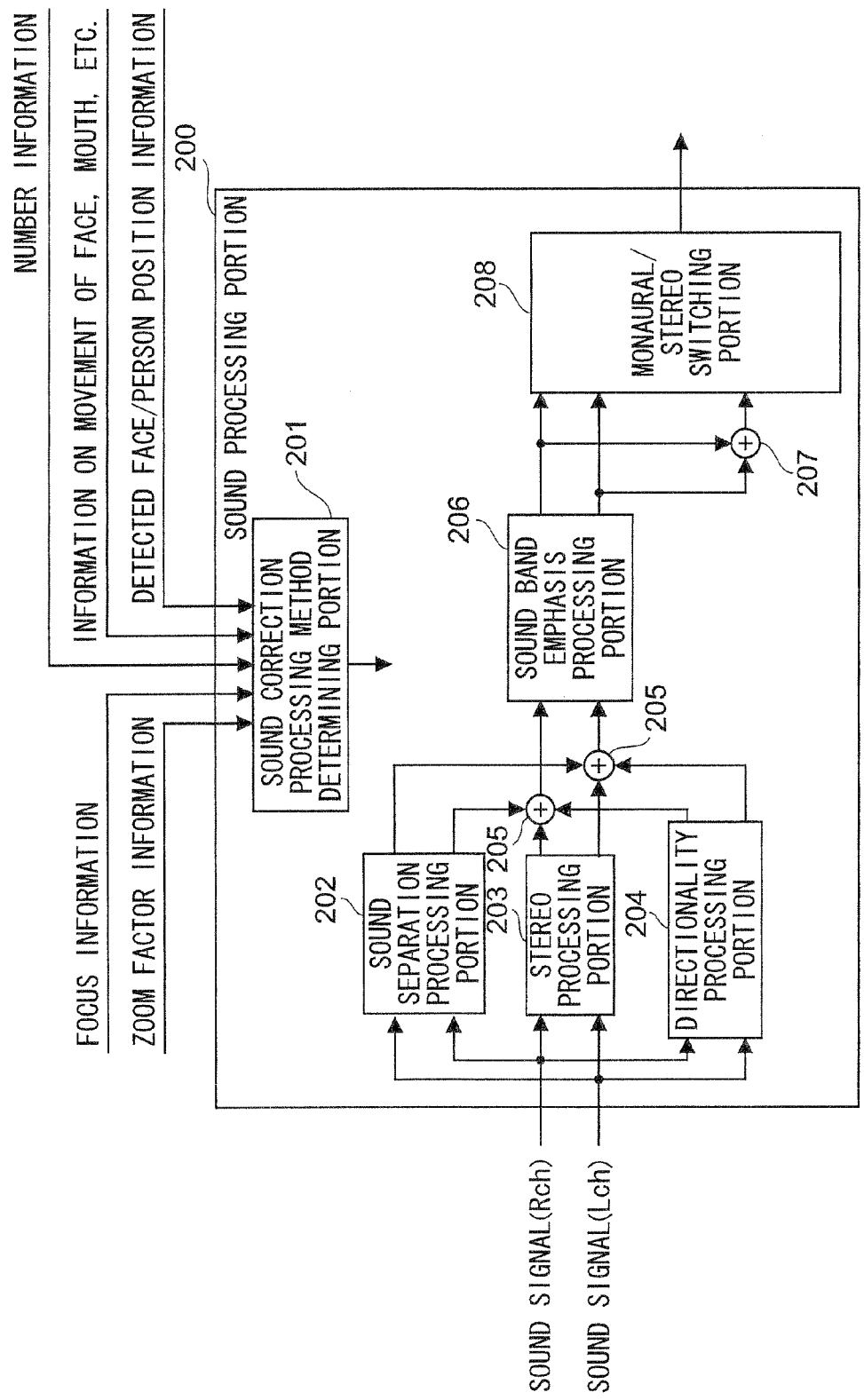
FIG. 17 is a block diagram showing the configuration of a principal portion of the sound processing portion of a second embodiment.

First, sound correction processing performed by a sound processing portion 200 in this embodiment will be described. FIG. 17 is a block diagram showing the configuration of a principal portion of the sound processing portion of the second embodiment. It is to be noted that the sound correction processing performed by the sound processing portion 200 includes not only processing the sound signal but also changing the stereo angle or directional angle.

As shown in FIG. 17, the sound processing portion 200 includes: a sound correction processing method determining portion 201 that determines a sound correction processing method based on the number information from the image processing portion 6, and, if necessary, based on the information on the movement of the face, mouth, etc. and the detected face/person position information, which are fed from the image processing portion 6, and the focus information and the zoom factor information from the CPU 19, and controls the different portions of the sound processing portion 200 according to the determination; a sound separation processing portion 202 that performs sound separation processing on two sound signals (Rch, Lch) obtained from the sound collecting portion 7 (for example, a stereo microphone); a stereo processing portion 203 that performs stereo processing on the two sound signals outputted from the sound separation processing portion 202; a directionality processing portion 204 that performs directionality processing on the two sound signals obtained from the sound collecting portion 7; two first adders 205, each of which performs, at a predetermined ratio, the addition of a corresponding one of the two sound signals subjected to the sound separation processing by the sound separation processing portion 202, a corresponding one of the two sound signals subjected to the stereo processing by the stereo processing portion 203, and a corresponding one of the two sound signals subjected to the directionality processing by the directionality processing portion 204; a sound band emphasis processing portion 206 that processes each of the sound signals outputted from the two first adders 205 so as to emphasize a particular band; a second adder 207 that performs the addition of the two sound signals (stereo signals) outputted from the sound band emphasis processing portion 206 at a predetermined ratio so as to convert them into monaural; and a monaural/stereo switching portion 208 that outputs either the monaural signal outputted from the second adder 207 or the stereo signal outputted from the sound band emphasis processing portion 206. The sound signal outputted from the monaural/stereo switching portion 208 is outputted to the compression processing portion 9.

The stereo processing portion 203 may have a configuration similar to, for example, the configuration (see FIG. 14) described in the above first embodiment. The same holds for the directionality processing portion 204; the directionality processing portion 204 may have a configuration similar to, for example, the configuration (see FIG. 16) described in the above first embodiment.

In this embodiment, the compression processing portion 9 can be construed as part of the sound processing portion 8. That is, sound correction processing can include signal compression processing.

When sound correction processing is started, the sound processing portion 200 first performs initialization such that the stereo angle is set to a maximum or minimum value in the directionality processing portion 204. This initialization is optional. It is assumed that the stereo angle θ1 and the directional angles (front directionality) θ2, θR, and θL in this embodiment are the same as those described in the above first embodiment (see FIG. 4). The stereo angle θ1 and the front directionality θ2 can be changed by the directionality processing portion 204 provided in the sound processing portion 200.

Then, an image is read, and it is checked whether or not a person's face is located within the imaging angle of view. This checking is performed by the face detector 50. The configuration and operation of the face detector can be made the same as those described in the first embodiment (see FIGS. 5 to 7). The sound processing portion 200 then performs sound correction processing on the sound signal based on the number information outputted from the face detector.

[In a Case where the Detected Number of People is One]

Figure 18:
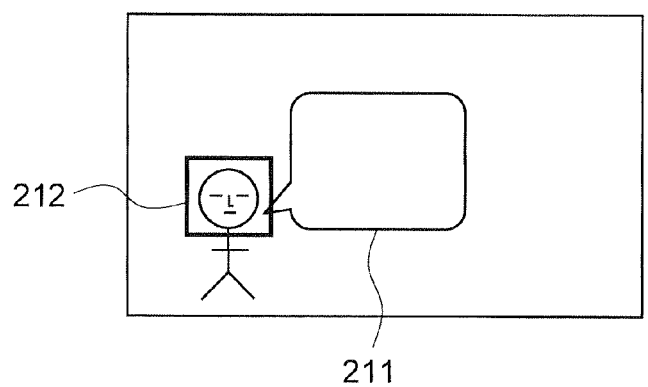
FIG. 18 shows an example of an image in which one person is located within the angle of view.

For example, in a case where the device operator is taking moving images of his/her child, the image thus taken is as shown in FIG. 18, and the number of people detected by the face detector 50 is one. For convenience' sake, though not shown in the actual taken image, a balloon 211 indicating that the subject is making a sound and a box 212 drawn around the position of a face are shown in FIG. 18.

If the number of people detected by the face detector 50 is one, it is considered that the device operator is taking moving images with a focus on a particular one person. Therefore, sound correction processing is performed such that the sound of the particular one person is emphasized. The following is a specific example of such processing.

The sound band emphasis processing portion 206 amplifies the gain in the band of several tens to several hundreds of hertz, which is the fundamental frequency of voice components, or amplifies a pitch signal of a voice by analyzing the pitch (harmonic) of the voice. Instead, it is also possible to make the sound band emphasis processing portion 206 attenuate the gain of a signal other than a voice.

Figure 19:
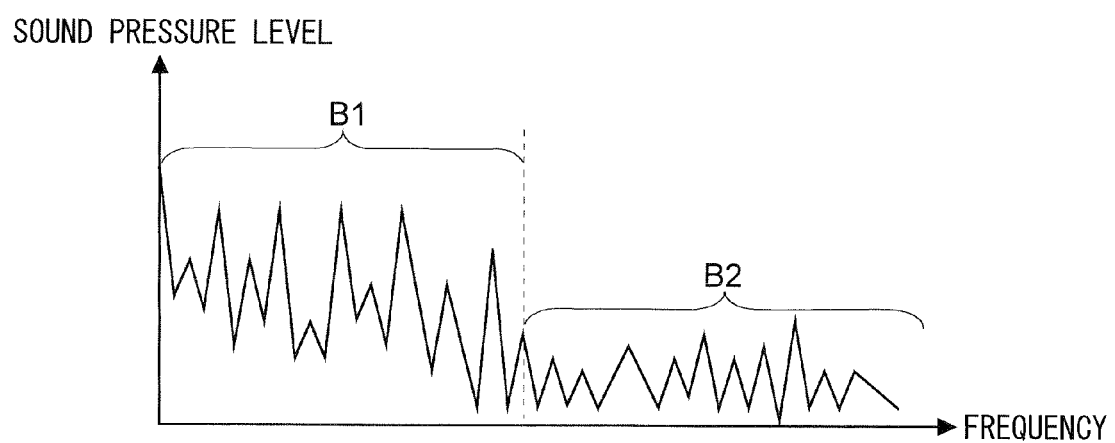
FIG. 19 is a diagram illustrating sign bit assignment (bit allocation)

As in this embodiment, in a case where a sound signal is compressed and recorded, it is preferable that the compression processing portion 9 perform sound coding not by assigning sign bits evenly over the entire band, but by assigning fewer sign bits to a band B2 (see FIG. 19) with not so many voice components and assigning more sign bits to a band B1 (see FIG. 19) of several tens to several hundreds of hertz, which is the fundamental frequency of voice components. By performing the above sound coding, it is possible to record, in the external memory 10, a compressed sound signal that suffers less from degradation that a sound the device operator desires to record may experience.

Moreover, since the number of subjects is one, the monaural/stereo switching portion 208 is made to output a 1-channel monaural signal. By performing monaural conversion in this manner, it is possible to assign the sign bits exclusively to one channel. This helps perform compression with reduced quantization noise.

Furthermore, it is also possible to use information other than number information, such as image information (information on the movement of the face, mouth, etc. or detected face/person position information) or camera control information (focus information or zoom factor information), for sound correction processing.

For example, by using the position of a face within the imaging angle of view, it is possible to control the directional characteristics in sound collecting. An example of such control is as follows. In FIG. 18, the box 212 is drawn around the position of a face. In a case where the box 212 is found to be located near the center of the taken image based on the position information (X and Y coordinates within the imaging angle of view) of the box 212, the directionality processing portion 204 makes the front directionality θ2 smaller than in other cases.

Moreover, for example, by using the camera control information (a zoom factor or a focal length), it is possible to calculate the distance from the subject (=the sound source of a sound the device operator desires to record) and perform sound control according to the distance thus calculated. An example of such control is as follows. In a case where the distance from the subject (=the sound source of a sound the device operator desires to record) is found to be large, the sound band emphasis processing portion 206 amplifies the gain in the band of several tens to several hundreds of hertz or attenuates the gain of a signal other than a voice at a higher rate than in other cases.

[In a Case where the Detected Number of People is Two]

Figure 20:
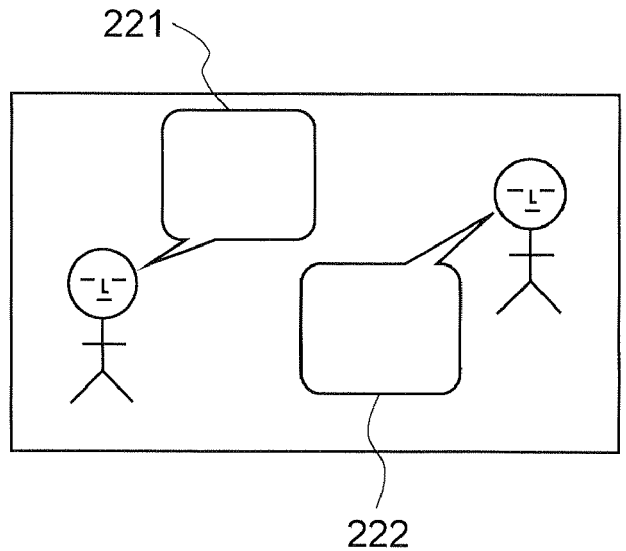
FIG. 20 shows an example of an image in which two people are located within the angle of view.

For example, in a case where the device operator is taking moving images of one child and his/her father, or in a case where the device operator is taking moving images of two children, the image thus taken is as shown in FIG. 20, and the number of people detected by the face detector 50 is two. For convenience' sake, though not shown in the actual taken image, balloons 221 and 222 indicating that the subjects are making a sound are shown in FIG. 20.

If the number of people detected by the face detector 50 I two, it is considered that the device operator is taking moving images with a focus on particular tow persons. Therefore, sound correction processing is performed such that the sounds of the particular two persons are emphasized. Specific processing is basically the same as that performed in a case where the number of people detected by the face detector 50 is one. In this case, however, due to the presence of two subjects, it is preferable to make the monaural/stereo switching portion 208 output a 2-channel stereo signal than to make it output a 1-channel monaural signal.

As in the case where the number of people detected by the face detector 50 is one, it is also possible to use information other than number information, such as image information (information on the movement of the face, mouth, etc. or detected face/person position information) or camera control information (focus information or zoom factor information), for sound correction processing.

Furthermore, in a case where the number of subjects is two, two sound sources are located within the angle of view as a source of a sound the device operator desires to record. Thus, it is preferable to collect sounds from separate sound sources, and divide the sounds into Lch and Rch for stereo recording. In this case, using the positions of the subjects within the imaging angle of view helps achieve more effective sound separation. For example, in a case where the image as shown in FIG. 20 is taken, it is possible to make the sound separation processing portion 202 separately collect a sound (=a sound corresponding to the balloon 221) of a person detected on the left side of the taken image as a left channel (Lch) and a sound (=a sound corresponding to the balloon 222) of a person detected on the right side of the taken image as a right channel (Rch).

[In a Case where the Detected Number of People is Small (Except One and Two)]

Figure 21:
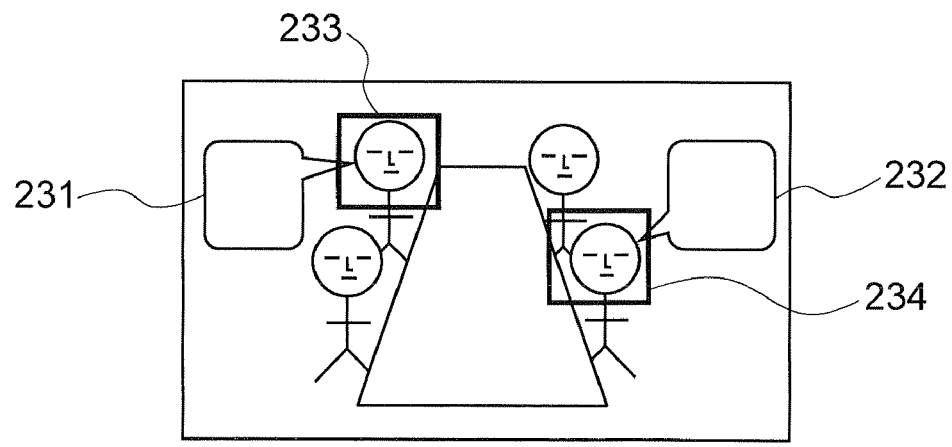
FIG. 21 shows an example of an image in which a small group of people are located within the angle of view.

For example, in a case where the device operator is taking moving images of the scene of a small-group meeting, or in a case where the device operator is taking moving images of a small group of playing children, the number of people detected by the face detector 50 is small. FIG. 21 shows an image taken by the device operator who is taking moving images of the scene of a small-number meeting. For convenience' sake, though not shown in the actual taken image, balloons 231 and 232 indicating that the subjects are making a sound and boxes 233 and 234 drawn around the positions of faces are shown in FIG. 21.

A "small" number of people here is not limited to any particular number unless it is one or two; for example, it can be set from three to six people. It is also possible to allow the device operator to change the "small" number setting by operating the operating portion 21.

In a case where the number of people detected by the face detector 50 is small, it is considered that the device operator is taking moving images with a focus on the people located within the imaging angle of view. Therefore, sound correction processing is performed such that the sound is emphasized. Specific processing is basically the same as that performed in a case where the number of people detected by the face detector 50 is one or two. In this case, however, due to the presences of multiple subjects, as in the case where the number of people detected by the face detector 50 is two, it is preferable to make the monaural/stereo switching portion 208 output a 2-channel stereo signal than to make it output a 1-channel monaural signal.

As in the case where the number of people detected by the face detector 50 is one or two, it is also possible to use information other than number information, such as image information (information on the movement of the face, mouth, etc. or detected face/person position information) or camera control information (focus information or zoom factor information), for sound correction processing. In particular, it is preferable to use the information on the movement of the mouth. For example, in a case where the image shown in FIG. 21 is taken, the persons moving their mouths (=the persons whose faces are enclosed in the boxes 233 and 234) are presumed to make a sound, and the sound is collected with directionality in the directions of these persons by using the directionality processing portion 204. Moreover, by using the positions of the persons within the imaging angle of view, it is possible to make the stereo processing portion 203 collect sounds (=a sound corresponding to the balloon 233 and a sound corresponding to the balloon 234) from two sound sources after dividing them into separate channels.

[In a Case where the Detected Number of People is Large]

Figure 22:
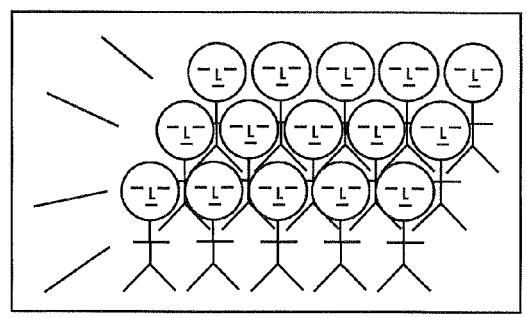
FIG. 22 shows an example of an image in which a large group of people are located within the angle of view.

For example, in a case where the device operator is taking an image of the scene of an event such as an athletic meet or a festival, the number of people detected by the face detector 50 is large. FIG. 22 shows an image taken by the device operator who is taking moving images of the scene of a chorus competition.

A "large" number of people here is not limited to any particular number unless it falls under the category of a "small" number of people described above. For example, if the "small" number setting is from three to six people, the "large" number setting may be seven or more people.

In a case where the number of people detected by the face detector 50 is large, it is considered that the device operator is taking moving images with importance placed on the atmosphere of a place rather than a specific person located within the imaging angle of view. Thus, unlike the case where the number of people detected by the face detector 50 is one, two, or small, sound correction processing is performed so as to make the scene alive with a wider band. Specific examples of processing include stereo impression emphasis processing such as channel separation, or surround-sound effect processing. As an example of such sound correction processing, the directionality processing portion 204 makes the stereo angle θ1 larger (for example, 90°), and the stereo processing portion 203 converts the sound signal into stereo. As another example of such sound correction processing, in a configuration in which a CMSS (Creative Multi Speaker Surround) processing portion that performs upmix is provided between the monaural/stereo switching portion 208 and the compression processing portion 9 such that the compression processing portion 9 can perform, in addition to compression of a 1-channel sound signal or a 2-channel sound signal, compression of a multichannel (for example, 5.1 channel) sound signal, the CMSS processing portion converts, for example, a 2-channel sound signal into a 5.1 channel sound signal.

Figure 23:
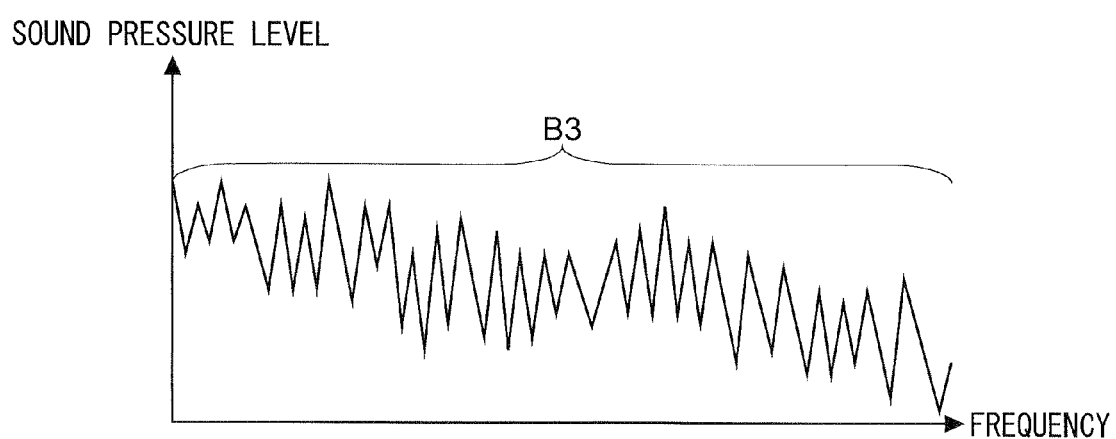
FIG. 23 is a diagram illustrating sign bit assignment.
Figure 24:
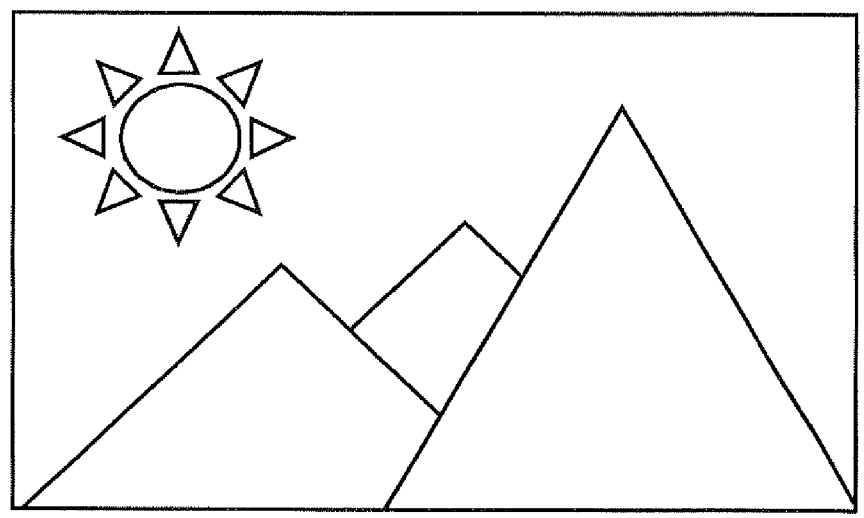
FIG. 24 shows an example of an image in which no one is located within the angle of view.

Moreover, as in this embodiment, in a case where the sound signal is compressed and recorded, in order to record more realistic sound, the compression processing portion 9 is made to assign sign bits to a wider band so as to broaden a frequency band B3 (see FIG. 23) of a compressed sound signal to be recorded in the external memory 10.

As in the case where the number of people detected by the face detector 50 is one, two, or small, it is also possible to use information other than number information, such as image information (information on the movement of the face, mouth, etc. or detected face/person position information) or camera control information (focus information or zoom factor information), for sound correction processing. In particular, it is preferable to use information on the orientation of a face. For example, in a case where the scene of a chorus competition is taken as moving images, a group of persons are often singing with their faces facing in the same direction. In such a case, the sound separation processing portion 202 performs sound separation for each group by using the information on the orientation of a face, and the stereo processing portion 203 performs channel separation processing, or the like. In a case where the image shown in FIG. 22 is taken, all of the people located within the imaging angle of view are facing to the left. Thus, it is necessary simply to perform sound correction processing such that the gain of a left channel (Lch) sound is made larger than the gain of a right channel (Rch) sound.

[In a Case where the Detected Number is Zero]

For example, in a case where the device operator is taking moving images of the scenery such as mountains or ocean, or in a case where the device operator is taking moving images at a sightseeing spot, the number of people detected by the face detector 50 may be zero. The number of people detected by the face detector 50 is zero not only in a case where no one is located within the imaging angle of view, but also in a case where all of the people located within the imaging angle of view are smaller than a predetermined size (which is determined by the size of the determination region 161 used in the face detection processing).

In a case where the number of people detected by the face detector 50 is zero, it is considered that the device operator is taking moving images with importance placed on the atmosphere of a place, such as the scenery of nature or the sightseeing spot itself. Thus, as in the case where the number of people detected by the face detector 50 is large, sound correction processing is performed so as to make the scene alive with a wider band. Specific processing is basically the same as that performed in a case where the number of people detected by the face detector 50 is large.

It is also possible to use camera control information (focus information or zoom factor information) for sound correction processing. Since the angle of view and distance after zooming can be estimated based on the camera control information, it is simply necessary to control the directional characteristics of a sound with the directionality processing portion 204 according to the estimation. For example, in a case where up-close moving images of a small insect are taken, the focal length is considered to be extremely short. By using this focal length information, if the focal length is extremely short, the front directionality θ2 is made smaller, and the gain of a sound to be collected is increased so as to make it possible to record the faintest sound.

[Control Performed in a Case where the Detected Number of People has Changed During the Taking of Images]

In a case where moving images are taken, it is rare that a person located within the imaging angle of view remains in a fixed position, and in fact, it is not uncommon to take the scene in which a person, a target to be imaged, is constantly moving. In addition, images may be zoomed in or out while taking moving images. Under such circumstances, images the device operator desires to take may change. The following are two examples of control methods used in such cases.

[An Example of Control Performed in a Case where the Detected Number of People Has Changed During the Taking of Images: a Case where the Detected Number of People Changes Between One and Zero]

Figure 25A:
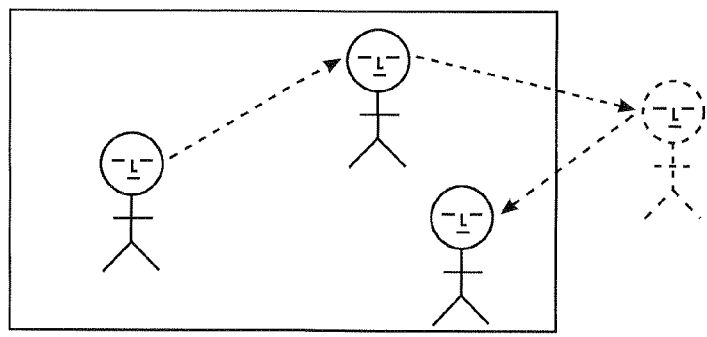
FIG. 25A is an example of how an image changes when a person who is a target to be imaged moves around.
Figure 25B:
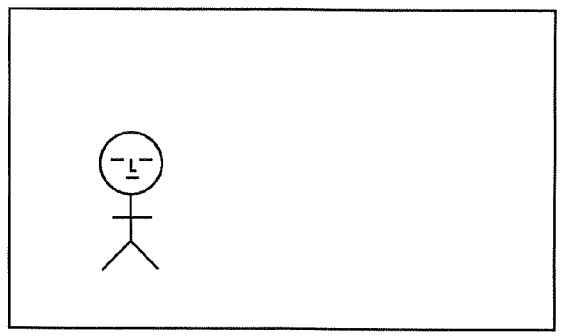
FIG. 25B is an example of how an image changes when the person who is a target to be imaged moves around.
Figure 25C:
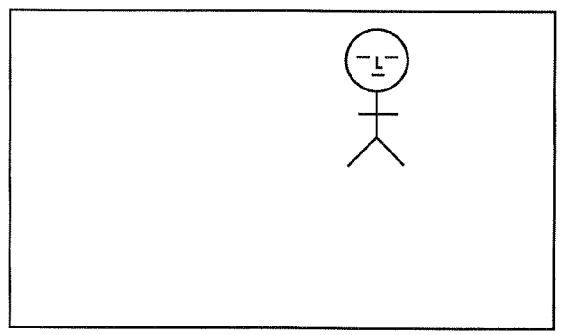
FIG. 25C is an example of how an image changes when the person who is a target to be imaged moves around.
Figure 25D:
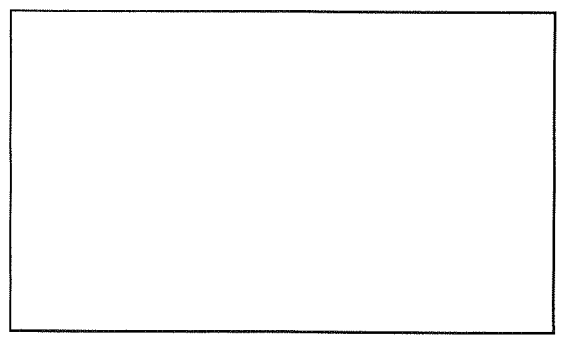
FIG. 25D is an example of how an image changes when the person who is a target to be imaged moves around.
Figure 25E:
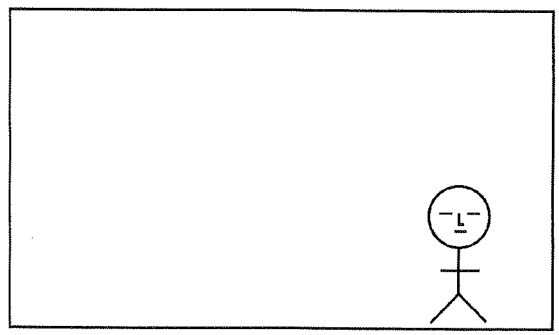
FIG. 25E is an example of how an image changes when the person who is a target to be imaged moves around.

For example, in a case where one is taking images of a child who keeps running around while chasing after him/her, as shown in FIG. 25A (in actuality, the taken images shown in FIG. 25B, FIG. 25C, FIG. 25D, and FIG. 25E are written into the frame memory of the image processing device 5 in this order), the child is expected to come out of the angle of view. In such a case (in a case where the taken image changes from FIG. 25C to FIG. 25D), the number of people detected within the imaging angle of view changes from one to zero. On the other hand, in a case where the child that has come out of the frame comes in the imaging angle of view again (in a case where the taken image changes from FIG. 25D to FIG. 25E), the number of people detected within the imaging angle of view changes from zero to one. As described above, in a case where a specific person frequently comes in and out of the angle of view, when the above-described sound correction processing is adopted as it is, the following problem arises. Sound-oriented sound control (the detected number of people: one) and atmosphere-oriented sound control (the detected number of people: zero) are performed alternately, making the recorded sound unnatural.

Thus, even in a case where the number of people detected by the face detector 50 has changed from one to zero as a result of the person having come out of the frame, it is preferable to introduce hysteresis in a change in the sound correction processing (a change from sound-oriented control to atmosphere-oriented control) according to a change in the detected number of people, such that the sound-oriented control is continuously performed for a given length of time. In this case, by using the position information of the person who has come out of the frame, even in a case where no one is detected within the imaging angle of view, it is possible to estimate the position of the person (=a sound source of a sound the device operator desires to record), the target to be imaged, and thereby control the directional characteristics in sound collecting. Instead, since the sound is not lost even when the person, the target to be imaged, comes out of the imaging angle of view, it is also possible to adopt a method in which the sound processing portion 200 checks whether or not the collected sound signal contains a voice component, and, if the collected sound signal is found to contain a voice component, the sound-oriented control is continuously performed.

[An Example of Control Performed in a Case where the Detected Number of People has Changed During the Taking of Images: a Case where the Detected Number of People Changes Between Large and Small]

Figure 26:
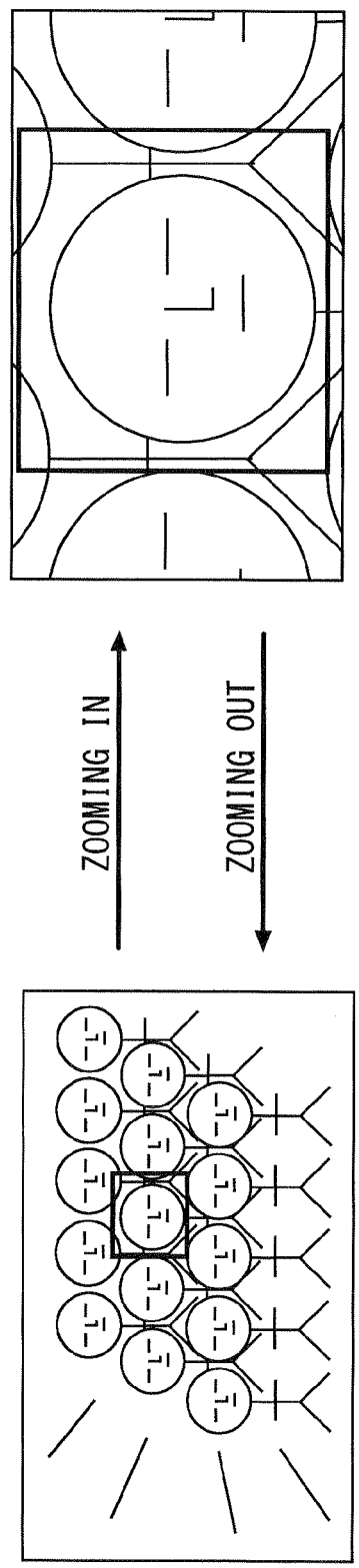
FIG. 26 is an example of how an image changes by zooming in or zooming out.

For example, as shown in FIG. 26, in a case where one zooms in on a specific person, such as his/her child, while taking the scene of a chorus competition, the number of people detected within the imaging angle of view changes from large to small (or two or one). In this case, sound control is performed such that, upon zooming in, atmosphere-oriented control is shifted to sound-oriented control. Specifically, a state in which the number of people detected within the imaging angle of view is large is changed in a stepwise manner until a sound only in a specific direction is collected and emphasized, or the sound collecting band is narrowed.

On the other hand, in a case where zooming out from a specific person is performed to take the whole scene, the number of people detected within the angle of view changes from small (or two or one) to large. In this case, sound control is performed such that, upon zooming out, sound-oriented control is shifted to atmosphere-oriented control. Specifically, a state in which the number of people detected within the imaging angle of view is small (or two or one) is changed in a stepwise manner until sound collection is switched to omnidirectional sound collection, or the sound collecting band is widened.

As described above, by making the sound processing portion 200 perform sound correction processing on the sound signal based on the number information from the face detector 50, it is possible to record, along with an image, a sound that fits the purpose of the image.

Third Embodiment

Next, with reference to the drawings, a third embodiment of the sound processing portion will be described.

Figure 27:
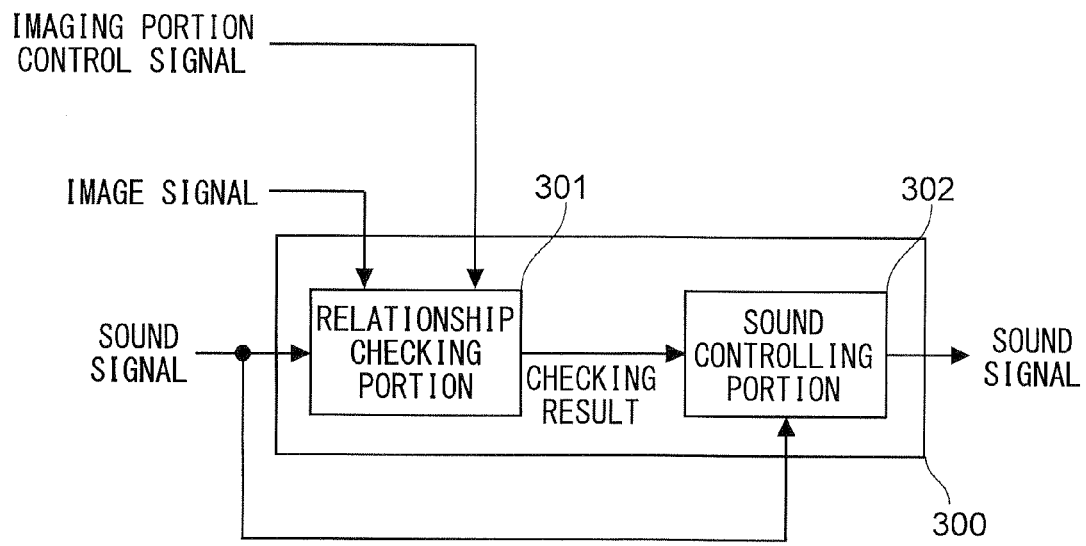
FIG. 27 is a block diagram showing the configuration of a principal portion of the sound processing portion of a third embodiment.
Figures 28A, 28B:
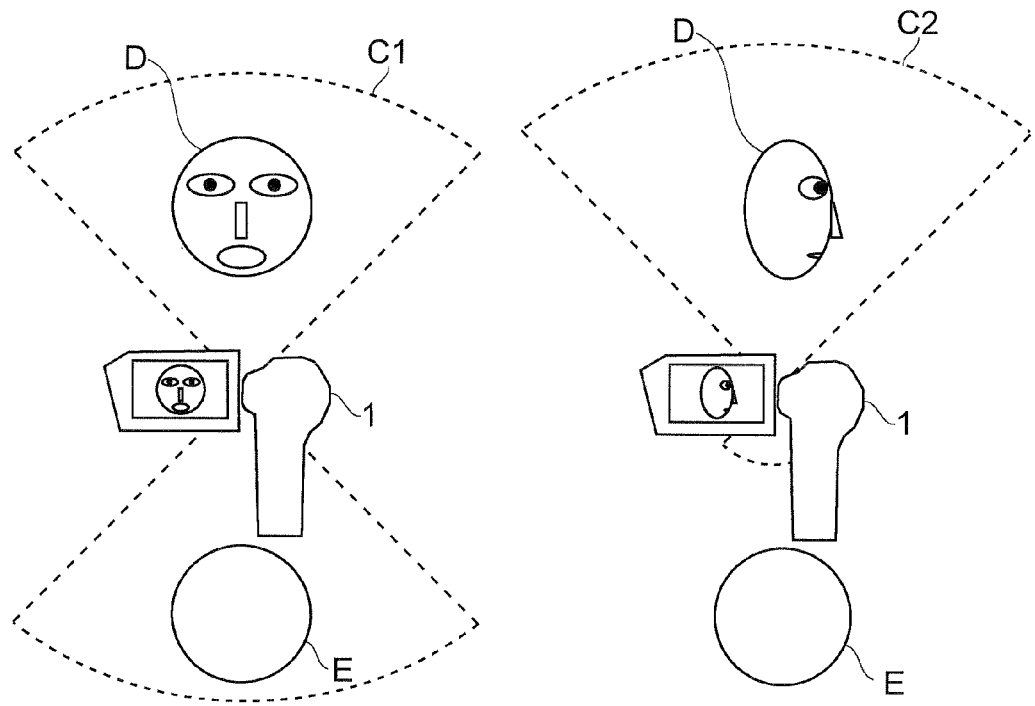
FIG. 28A is a schematic diagram showing an example of sound correction processing performed by the sound processing portion of the third embodiment.
FIG. 28B is a schematic diagram showing an example of sound correction processing performed by the sound processing portion of the third embodiment.

FIG. 27 is a block diagram showing the configuration of a principal portion of the sound processing portion of the third embodiment. FIGS. 28A and 28B are each a schematic diagram showing an example of sound correction processing performed by the sound processing portion of the third embodiment.

As shown in FIG. 27, a sound processing portion 300 includes a relationship checking portion 301 that checks the relationship between the subject and the device operator based on the inputted imaging portion control signal, image signal, and sound signal, and a sound controlling portion 302 that performs predetermined processing on the sound signal inputted thereto based on the determination result outputted from the relationship checking portion 301 and then outputs the resultant signal.

To the relationship checking portion 301, an imaging portion control signal including information on the operation of the imaging portion 2, an image signal inputted from the image processing portion 6, or the like, and a sound signal outputted from the sound collecting portion 7 are inputted. Based on these signals, the relationship checking portion 301 checks the relationship between the subject and the device operator. For example, the relationship checking portion 301 checks whether or not the subject and the device operator are in conversation with each other, and inputs the checking result to the sound controlling portion 302.

In the sound processing portion 300 of this embodiment, the relationship checking portion 301 may check a relationship of any kind between the subject and the device operator. However, as a specific example of implementation, a description will be given of a case where the relationship checking portion 301 checks whether or not the subject and the device operator are in conversation with each other. It should be understood that the term "conversation" here covers not only cases where the subject and the device operator have a conversation in a given language but also cases where one reacts to the sound made by the other in some form.

The sound controlling portion 302 controls the sound signal based on the inputted checking result. An example of the sound signal control method is shown in FIGS. 28A and 28B. Dashed lines marked with reference symbols C1 and C2 in FIGS. 28A and 28B, respectively, schematically represent the characteristics (hereinafter, "sound signal characteristics") of the sound signal outputted from the sound controlling portion 302. The sound signal characteristics are achieved by the sound controlling portion 302 performing predetermined processing on the inputted sound signal.

The above sound signal characteristics are represented by the direction or degree of the directional characteristics or the measure of the directional angle. For example, in a case where it is described that "the directional characteristics are more significant in a certain direction (on a certain side)", it means that, in the sound signal outputted from the sound controlling portion 302, the signal level of a sound coming from a certain direction (a certain side) is higher than the signal level of a sound that has the same loudness and comes from a different side. In addition, in a case where it is described that "the directional angle is large", it means that an area with more significant directional characteristics is wide (the angle formed around the imaging device 1 is large).

Now, the sound signal characteristics will be described more specifically, taking up as an example a case where a plurality of sound sources are located all around the imaging device 1 (in particular, the sound collecting portion 7), and sounds having the same loudness are coming from these sound sources. In this case, if the sound signal characteristics are such that the directional characteristics are more significant in a certain direction, a specific sound source is located in the certain direction, and the directional angle is large, in the sound signal outputted from the sound controlling portion 302, the signal level of a sound coming from a certain side (a sound of the specific sound source and a sound of a sound source near the specific sound source) is higher than the signal level of a sound coming from a side other than the certain side. On the other hand, if the sound signal characteristics are such that the directional characteristics are more significant in a certain direction, a specific sound source is located in the certain direction, and the directional angle is small, the signal level of a sound produced by a sound source near the specific sound source is smaller as compared with when the directional angle is large. That is, in the sound signal outputted from the sound controlling portion 302, the signal level of a sound of the specific sound source becomes remarkably high.

If the relationship checking portion 301 judges that a subject D and a device operator E are in conversation with each other, as shown in FIG. 28A, the sound controlling portion 302 controls the sound signal so that a sound coming from the subject D side and a sound coming from the device operator E side have a sufficiently high signal level in the sound signal, that is, so as to achieve sound signal characteristics C1 in which the directional characteristics are more significant on both the subject D side and the device operator E side.

On the other hand, if the relationship checking portion 301 judges that the subject D and the device operator E are not in conversation with each other, as shown in FIG. 28B, the sound controlling portion 302 controls the sound signal so that a sound coming from the device operator E side has a sufficiently low signal level in the sound signal, that is, so as to achieve sound signal characteristics C2 in which the directional characteristics are less significant on the device operator E side.

As described above, by checking the relationship between the subject D and the device operator E based on the various inputted signals, and controlling the sound signal based on the checking result thus obtained, it is possible to automatically switch to an optimum sound signal control method according to the situation.

In particular, in a case where the relationship checking portion 301 judges that the subject D and the device operator E are in conversation with each other, control is performed such that the directional characteristics are made more significant on both the subject D side and the device operator E side. This makes it possible to record the sound signal that has been processed to make clear the sound of conversation between the subject D and the device operator E.

On the other hand, in a case where it is judged that the subject D and the device operator E are not in conversation with each other, control is performed such that the directional characteristics are made less significant on the device operator E side. This makes it possible to lower (or eliminate) the signal level of a sound on the device operator E side, which is more likely to become an irrelevant sound. Thus, it is possible to record the sound signal that has been processed to make clear a target sound such as a sound of the subject D.

Furthermore, it is possible to save the device operator the trouble of performing switching of directional characteristics on their own. Moreover, it is possible to prevent a recorded sound signal or image signal from becoming unnatural due to operating errors made by the device operator E or his/her slowness in performing switching. This makes it possible to record the device operator's intended appropriate sound or image.

In a case where the relationship checking portion 301 judges that the subject D and the device operator E are in conversation with each other, the sound controlling portion 302 may control the sound signal such that the intensity (for example, the signal level) of a sound on the subject D side is made equal to the intensity of a sound on the device operator E side. This control makes uniform the loudness of the sound of conversation, making it possible to make the sound of conversation clear and natural.

The image signal or the sound signal used for checking may be a signal subjected to predetermined processing, such as denoising, by the image processing portion 6 or the sound processing portion 8, or may be a signal that has yet to be subjected to such processing. The above description deals with a case where the imaging portion control signal, the image signal, and the sound signal are inputted to the relationship checking portion 301, and checking is performed based on these signals. However, the present invention is not limited to this specific configuration, but may be so implemented that only part of these signals is inputted, and checking is performed based on it. It is also possible to adopt a configuration in which a signal other than the above signals is inputted, and checking is performed based on that signal.

In a case where the relationship checking portion 301 judges that the subject D and the device operator E are not in conversation with each other, as shown by the sound signal characteristics C2 in FIG. 28B, it is also possible to perform control such that the signal level of a sound on the subject D side is made higher by making the directional characteristics on the subject D side more significant than those obtained when they are judged to be in conversation with each other (FIG. 28A). In this case, it is also possible to increase the overall signal level of a sound coming from the subject D side by making the directional angle larger. Furthermore, in a case where the relationship checking portion 301 detects the presence of the subject D within the angle of view or the sound made by the subject D, it is also possible to make the directional characteristics on the subject D side more significant. In this case, it is also possible to detect the subject D within the angle of view or the sound by using methods described in different examples of the relationship checking portion 301, which will be described later.

Furthermore, in a case where the relationship checking portion 301 judges that the subject D and the device operator E are not in conversation with each other, as shown by the sound signal characteristics C2 in FIG. 28B, the directional characteristics are made less significant so as to minimize the recording of a sound on the device operator E side. However, it is also possible to make the directional characteristics less significant until the signal level of a sound on the device operator E side is low, but not extremely low. For example, control may be performed so as to make the directional characteristics on the device operator E side less significant, such that the signal level of a sound on the device operator E is made lower than the signal level of a sound on the subject D side by a predetermined magnitude (for example, 6 dB) or more.

Although FIGS. 28A and 28B illustrate cases where the directional angles of the sound signal characteristics C1 and C2 have a fixed angular extent centered at a center of the angle of view, it is also possible to make them larger until they cover the whole angle of view. On the other hand, it is also possible to make them smaller. Instead, it is also possible to make the directional angle larger or smaller based on the checking result of the relationship checking portion 301.

Furthermore, the center of the directional angles of the sound signal characteristics C1 and C2 may be located other than at the center of the angle of view. This holds true not only for the right-left direction but also for the up-down direction. In particular, it is also possible to detect the subject D in the manner as described above, and perform control such that the center of the directional angle faces the subject D. It is also possible to make the center of the directional angle face a particular part, such as a face, of the subject D, or make the signal level of a sound coming from the subject D remarkably high by making the directional angle smaller.

Moreover, it is also possible to adopt a configuration in which only checking of the relationship between the subject and the device operator is performed at the time of recording, and the sound signal is controlled based on the obtained checking result at the time of reproduction. For example, the sound controlling portion 302 may be provided in the previous stage of the sound output circuit portion 16. In this case, checking may be performed by the relationship checking portion 301 at the time of recording, and a conversation flag based on the checking result may be attached to the sound signal, such that the sound signal is controlled by the sound controlling portion 302 based on the conversation flag attached to the sound signal at the time of reproduction.

Hereinafter, examples of the relationship checking portion 301 that checks the presence or absence of conversation between the subject and the device operator, and examples of the sound controlling portion 302 that controls the sound signal based on the checking result of the relationship checking portion 301 will be described.

(Example 1 of the Relationship Checking Portion)

Figure 29:
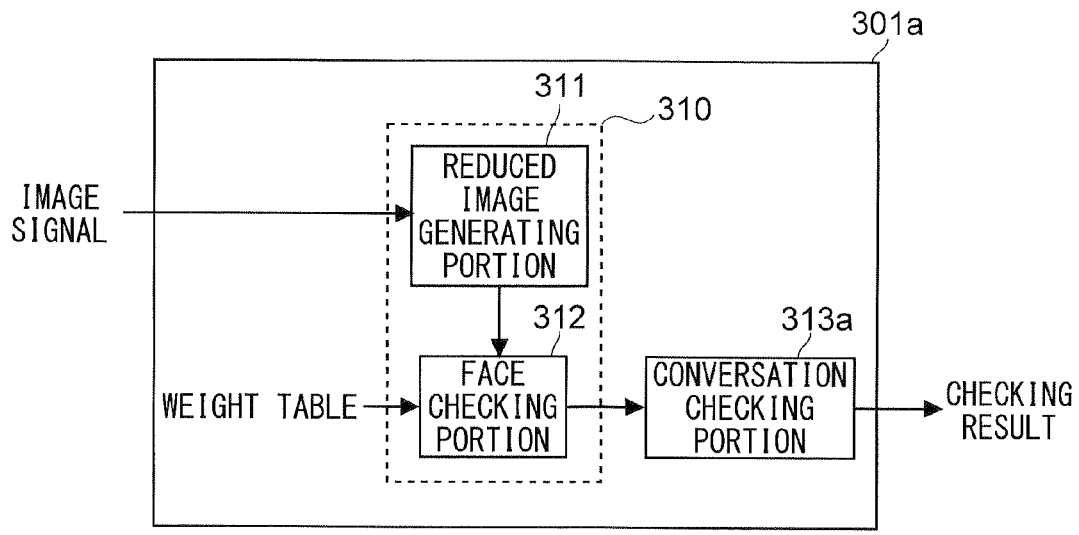
FIG. 29 is a block diagram showing Example 1 of a relationship checking portion.

First, with reference to the drawings, Example 1 of the relationship checking portion 301 will be described. FIG. 29 is a block diagram showing Example 1 of the relationship checking portion.

As shown in FIG. 29, a relationship checking portion 301a of this example includes: a face detecting portion 310 that detects a human face in the image; and a conversation checking portion 313a that checks the presence or absence of conversation between the subject and the device operator based on the detection result of the face detecting portion 310, and outputs the checking result. The face detecting portion 310 includes a reduced image generating portion 311 that generates one or a plurality of reduced mages based on the input image, and a face checking portion 312 that detects a face in the image by using different-stage images consisting of the input image and the reduced images and a weight table. The configuration and operation of the face detecting portion 310 can be made equal to those of the face detector described in the first embodiment (see FIGS. 5 to 7). It is also possible to adopt a configuration in which the face detecting portion 310 is provided in the image processing portion 6, and the relationship checking portion 301a can obtain the detection result.

In addition to detecting a face as described above, the face checking portion 312 detects a particular part (for example, eyes, a nose, and a mouth) that is required for checking by the conversation checking portion 313a provided in the following stage. The conversation checking portion 313a checks the presence or absence of conversation between the subject and the device operator based on the detection result of the face checking portion 312. For example, checking is performed based on the presence or absence of features that can be observed when a person is speaking, such as the orientation of a face, the direction of eyes of the subject, or the movement of a mouth, in the detection result outputted from the face checking portion 312. An example of this checking method will be described by using FIGS. 28A and 28B.

In a case where the orientation of a face is used, checking is performed as follows. If a face of the subject D is judged to face the imaging device 1, that is, if a full face facing the imaging device 1 as shown in FIG. 28A is detected, it is judged that there is a high possibility that the subject D and the device operator E are in conversation with each other. Moreover, for example, by using the weight table including a sample of profile, checking is performed based on whether the face is a full face or a profile. If the face is judged to be a profile as shown in FIG. 28B, it is judged that there is a high possibility that the subject D and the device operator E are not in conversation with each other. It is also possible to check the orientation of a face based on, for example, the location of part (such as eyes, a nose, or a mouth) of a face.

In a case where the direction of eyes of the subject D is used, checking is performed as follows. If eyes of the subject D are turned to the imaging device 1 as shown in FIG. 28A, it is judged that there is a high possibility that the subject D and the device operator E are in conversation with each other. On the other hand, as shown in FIG. 28B, if eyes of the subject D are not turned to the imaging device 1, it is judged that there is a high possibility that the subject D and the device operator E are not in conversation with each other. In this case, for example, it is also possible to check whether or not eyes of the subject D are turned to the imaging device 1 based on the position of the pupil of the subject D.

In a case where a mouth of the subject D is used, checking is performed as follows. If the mouth of the subject D is moving as shown in FIG. 28A, it is judged that there is a high possibility that the subject D and the device operator E are in conversation with each other. On the other hand, as shown in FIG. 28B, if the mouth of the subject D is not moving, it is judged that there is a high possibility that the subject D and the device operator E are not in conversation with each other.

Based on the results of one or more methods of the above-described checking methods, the relationship checking portion 301a checks the presence or absence of conversation between the subject D and the device operator E, and outputs the checking result.

As described above, a face of the subject D is detected, and, based on the detected face of the subject D, the presence or absence of conversation between the subject D and the device operator E is checked. Thus, checking is performed based on the face in which features associated with conversation are explicitly observed. This makes it possible to perform checking with ease and accuracy.

The example described above deals with a case where checking is performed based on the orientation or movement of a face of the subject D. However, in addition to (or instead of) checking based on the orientation or movement of the face, checking may be performed based on, for example, the orientation or movement of other parts, such as the orientation of a body, of the subject D. For example, if the body of the subject D is turned away from the imaging device 1, the subject D may be judged not to engage in conversation; if the body of the subject D is turned to the imaging device 1, the subject D may be judged to engage in conversation. In a case where the orientation of the body is detected, it is possible to additionally detect, for example, a region extending downward (in the direction in which a region of a glabella and a mouth are located in this order) from the detected face, and check the orientation of the body of the subject D based on the size or shape of the body detected in that region.

Moreover, in a case where the detection results based on the different parts of the subject D are combined for checking, final checking may be performed after assigning priorities to the detection results and then assigning weights to the detection results. For example, in a case where the face of the subject D is turned to the imaging device 1, the eyes are not turned to the imaging device 1, and the mouth is moving, the subject D may be judged to engage in conversation. As described above, by combining a plurality of checking results, it is possible to perform checking more accurately.

(Example 2 of the Relationship Checking Portion)

Figure 30:
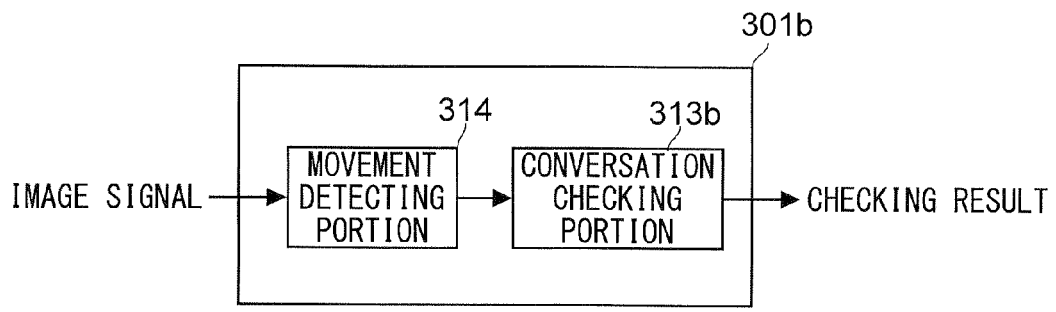
FIG. 30 is a block diagram showing Example 2 of the relationship checking portion.

Next, with reference to the drawings, Example 2 of the relationship checking portion 301 will be explained. FIG. 30 is a block diagram showing Example 2 of the relationship checking portion, and is the equivalent of FIG. 29 showing Example 1 of the relationship checking portion. It is to be noted that such portions as are found also in FIG. 29 are identified with common reference numerals and their detailed descriptions will be omitted.

As shown in FIG. 30, a relationship checking portion 301b of this example includes a movement detecting portion 314 that detects the movement of the subject based on the inputted image, and a conversation checking portion 313b that checks the presence or absence of conversation between the subject and the device operator based on the detection result of the movement detecting portion 314, and outputs the checking result.

Figure 31:
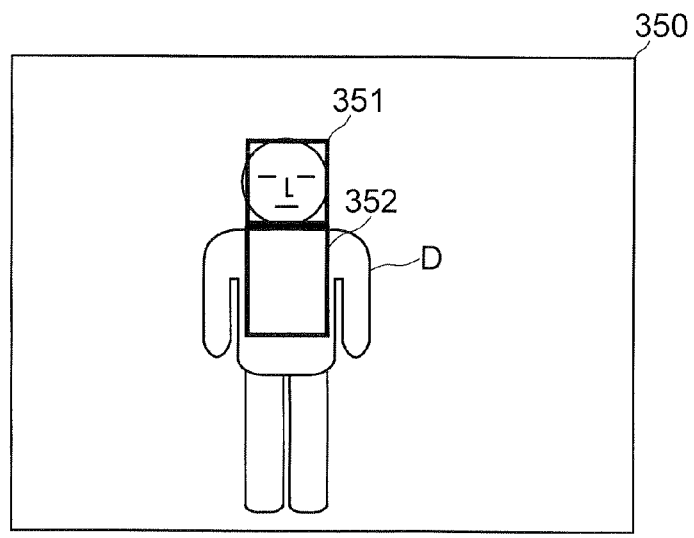
FIG. 31 is a schematic diagram of an image illustrating an example of a movement detecting method.

The movement detecting portion 314 includes, for example, the face detecting portion 310 shown in FIG. 29, and detects the movement of the subject by using the result of the face detection. This detecting method will be explained by using FIG. 31. FIG. 31 is a schematic diagram of an image illustrating an example of the movement detecting method. As shown in FIG. 31, in the movement detecting method of the movement detecting portion 314 of this example, the face detecting portion 310 first detects, from an image 350, a face region 351 including a face of the subject D. Then, a body region 352 including a body of the subject D is set in a region extending downward (in the direction in which a region of a glabella and a mouth are located in this order) from the face region 351, the region being adjacent to the face region 351.

Then, the subject D is tracked by sequentially detecting the body region 352 in the images that are inputted one after another. Here, tracking is performed based on, for example, the color information (information based on a color signal for each pixel, such as a color-difference signal or an RGB signal) of the body region 352. Specifically, a color of the body region 352 is recognized at the initial setting of the body region 352, and tracking is performed by detecting a region having a color similar to the recognized color from the inputted images.

The movement detecting portion 314 detects the movement of the subject D by the above tracking, and inputs the movement thus detected to the conversation checking portion 313b. If the movement of the subject D is found to be smaller than a predetermined movement, the conversation checking portion 313b judges that there is a high possibility that the subject D and the device operator are in conversation with each other. On the other hand, if the movement of the subject D is found to be larger than a predetermined movement, the conversation checking portion 313b judges that there is a high possibility that the subject D and the device operator are not in conversation with each other.

As described above, by checking the presence or absence of conversation between the subject D and the device operator based on the movement of the subject D, it is possible to perform checking with ease. This makes it possible to perform checking while reducing a burden on the overall operation of the imaging device.

It is to be understood that the method is not limited to the above-described method using the face detection and color information, but may be otherwise as long as the movement of the subject D can be detected. In a case where the movement is detected by performing tracking using the color information, it is also possible to use the methods described in, for example, JP-A-H05-284411, JP-A-2000-48211, and JP-A-2001-169169.

Moreover, it is also possible to combine the above method with the checking method of Example 1. In the case of combined use of these methods, a higher priority may be placed on the checking result obtained by one of the checking methods of Examples 1 and 2 than that obtained by the other. For example, a higher priority may be placed on the result obtained by the checking method of Example 1 such that, if no face is detected when no movement is detected in the subject D (for example, if the subject D is standing still with his/her back to the imaging device), it is judged that there is a high possibility that the subject D and the device operator are not in conversation with each other.

(Example 3 of the Relationship Checking Portion)

Next, with reference to the drawings, Example 3 of the relationship checking portion 301 will be explained. FIG. 32 is a block diagram showing Example 3 of the relationship checking portion, and is the equivalent of FIGS. 29 and 30 showing Examples 1 and 2, respectively, of the relationship checking portion. It is to be noted that such portions as are found also in FIGS. 29 and 30 are identified with common reference numerals and their detailed descriptions will be omitted.

As shown in FIG. 32, a relationship checking portion 301c of this example includes: the face detecting portion 310; and a conversation checking portion 313c that checks the presence or absence of conversation between the subject and the device operator based on the detection result of the face detecting portion 310 and the imaging portion control signal.

Usable as the imaging portion control signal used by the conversation checking portion 313c for checking is, for example, data such as the zoom factor in the imaging portion 2 of FIG. 1. The checking method of the conversation checking portion 313c will be described by using FIG. 33. FIGS. 33A and 33B are each a schematic diagram of an image illustrating an example of the checking method performed by the conversation checking portion provided in the relationship checking portion of Example 3.

The conversation checking portion 313c of this example performs checking based on the proportion of a face of the subject D in an image 360. For example, in a case where the face of the subject D is detected by the method shown in FIG. 6, the proportion can be obtained by determining in which of the images 150 to 155, each being a different-stage image, the face of the subject D is detected. Then, the presence or absence of conversation between the subject D and the device operator is checked based on the proportion thus obtained.

For example, as shown in FIG. 33A, in a case where the proportion of the face of the subject D in the image 360 is high, it is considered that images primarily of the subject D are being taken. Therefore, it is judged that there is a high possibility that the subject D and the device operator are in conversation with each other. On the other hand, as shown in FIG. 33B, in a case where the proportion of the face of the subject D in the image 360 is low, it is considered that images primarily of the scenery or the like, not the subject D, are being taken. Therefore, it is judged that there is a high possibility that the subject D and the device operator are not in conversation with each other.

In addition, the conversation checking portion 313c of this example also performs checking based on the zoom factor. For example, in a case as shown in FIG. 33A, where the zoom factor is small, the subject D is located near the imaging device. Therefore, it is judged that there is a high possibility that the subject D and the device operator are in conversation with each other. On the other hand, in a case as shown in FIG. 33A, where the zoom factor is large, the subject D is located away from the imaging device. Therefore, it is judged that there is a high possibility that the subject D and the device operator are not in conversation with each other.

As described above, by performing checking based on the proportion of the subject D in the image 360 and the imaging portion control signal, it is possible to check the presence or absence of conversation based on the actual positional relationship between the subject D and the device operator. This makes it possible to prevent the possibility of erroneously judging that conversation is going on when the subject D is in a position where conversation with the device operator is physically impossible.

Although the example described above deals with a case where checking is performed based on the proportion of the subject D in the image 360 and the imaging portion control signal (the zoom factor), it is also possible to perform checking based on any one of them. Moreover, although the descriptions heretofore deal with a case where the imaging portion control signal is the zoom factor of the imaging portion 2, the imaging portion control signal may be a focus distance determined by auto focus when it has achieved focus, or may be both the zoom factor and the focus distance. Furthermore, checking may be performed in combination with the relationship checking portions 301a and 301b of Examples 1 and 2, respectively, or may be performed by placing a higher priority on the checking result obtained by one of the checking methods described above.

(Example 4 of the Relationship Checking Portion)

Figure 34:
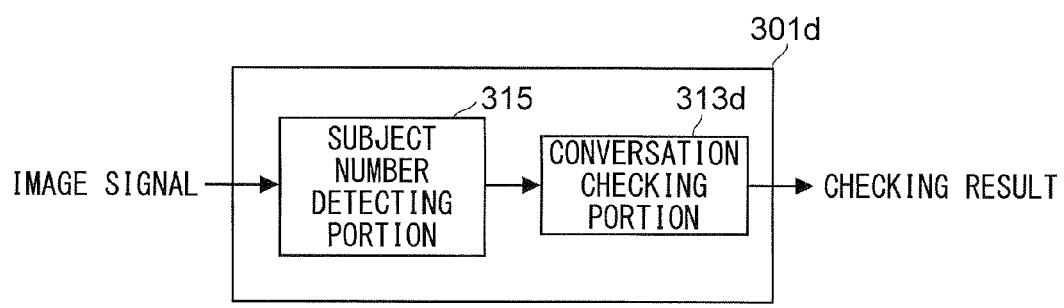
FIG. 34 is a block diagram showing Example 4 of the relationship checking portion.

Next, with reference to the drawings, Example 4 of the relationship checking portion 301 will be explained. FIG. 34 is a block diagram showing Example 4 of the relationship checking portion, and is the equivalent of FIGS. 29, 30 and 32 showing Examples 1, 2, and 3, respectively, of the relationship checking portion. It is to be noted that such portions as are found also in FIGS. 29, 30, and 32 are identified with common reference numerals and their detailed descriptions will be omitted.

As shown in FIG. 34, a relationship checking portion 301d of this example includes: a subject number detecting portion 315 that detects the number of subjects in the image; and a conversation checking portion 313d that checks the presence or absence of conversation between the subject and the device operator based on the detection result of the subject number detecting portion 315, and outputs the checking result.

The subject number detecting portion 315 includes, for example, the face detecting portion 310 shown in FIG. 29, and detects the number of subjects by using the result of the face detection. That is, the subject number detecting portion 315 performs the above-described face detection on the inputted image, and outputs the detected number of subjects.

Figure 35A:
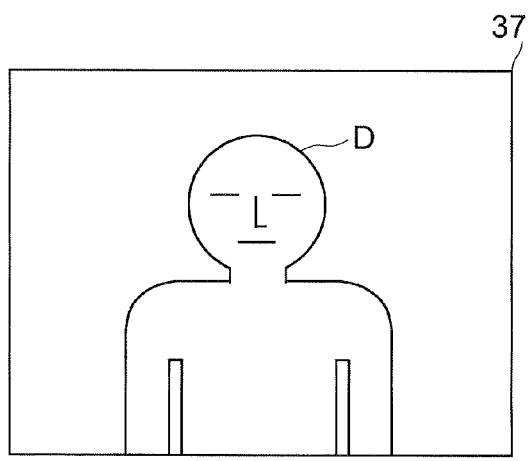
FIG. 35A is a schematic diagram of an image illustrating an example of a checking method performed by the conversation checking portion provided in the relationship checking portion of Example 4.
Figure 35B:
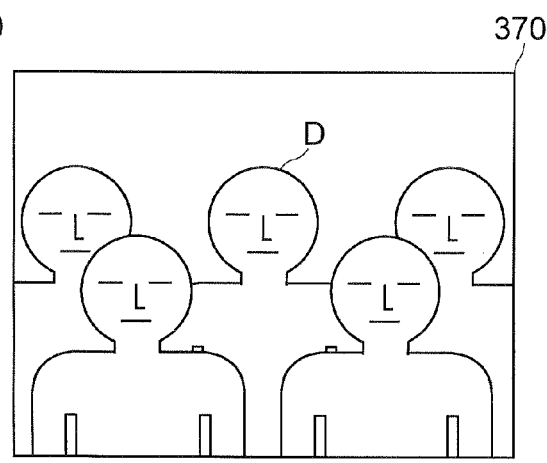
FIG. 35B is a schematic diagram of an image illustrating an example of a checking method performed by the conversation checking portion provided in the relationship checking portion of Example 4.

Based on the detected number of subjects, the conversation checking portion 313d checks the presence or absence of conversation. The checking method of the conversation checking portion 313d will be described by using FIGS. 35A and 35B. FIGS. 35A and 35B are each a schematic diagram of an image illustrating an example of the checking method performed by the conversation checking portion provided in the relationship checking portion of Example 4.

As shown in FIG. 35A, in a case where a small number of (for example, one or two) subjects D are detected in an image 370, it is judged that there is a high possibility that the subject D and the device operator are in conversation with each other. On the other hand, as shown in FIG. 35B, in a case where a large number of (for example, three or more) subjects D are detected in the image 370, it is inconceivable that the device operator is in conversation with one of them. Therefore, it is judged that there is a high possibility that the subject D and the device operator are not in conversation with each other.

As described above, by checking the presence or absence of conversation between the subject D and the device operator based on the number of subjects D in the image 370, it is possible to prevent the possibility of erroneously judging that conversation is going on when a large number of subjects D are all paying attention to the imaging device.

It is to be understood that the method is not limited to the above-described method using the face detection, but may be otherwise as long as the number of subjects D in the image 370 can be detected.

Furthermore, checking may be performed in combination with Examples 1 to 3, or may be performed by placing a higher priority on the checking result obtained by one of the checking methods described above. For example, checking may be performed in combination with the checking method described in Example 3, or may be performed by placing a higher priority on the checking method of Example 3. With this configuration, it is possible to prevent the possibility of erroneously judging that the subject D and the device operator are in conversation with each other when, for example, the number of subjects D becomes small as a result of the zoom factor being increased.

(Example 5 of the Relationship Checking Portion)

Figure 36:
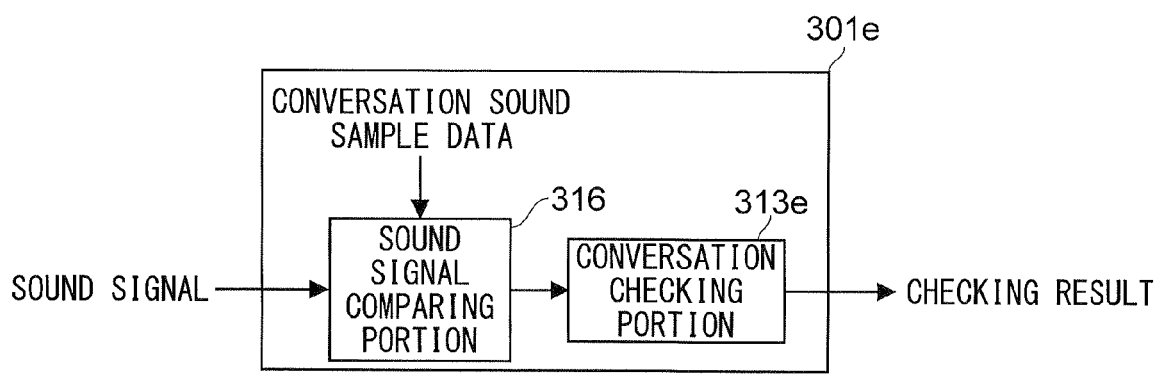
FIG. 36 is a block diagram showing Example 5 of the relationship checking portion.

Next, with reference to the drawings, Example 5 of the relationship checking portion 301 will be explained. FIG. 36 is a block diagram showing Example 5 of the relationship checking portion, and is the equivalent of FIGS. 29, 30, 32 and 34 showing Examples 1, 2, 3 and 4, respectively, of the relationship checking portion. It is to be noted that such portions as are found also in FIGS. 29, 30, 32 and 34 are identified with common reference numerals and their detailed descriptions will be omitted.

As shown in FIG. 36, a relationship checking portion 301e of this example includes: a sound signal comparing portion 316 that compares the inputted sound signal with conversation sound sample data; and a conversation checking portion 313e that checks the presence or absence of conversation between the subject and the device operator based on the comparison result of the sound signal comparing portion 316, and outputs the checking result.

Figure 37A:
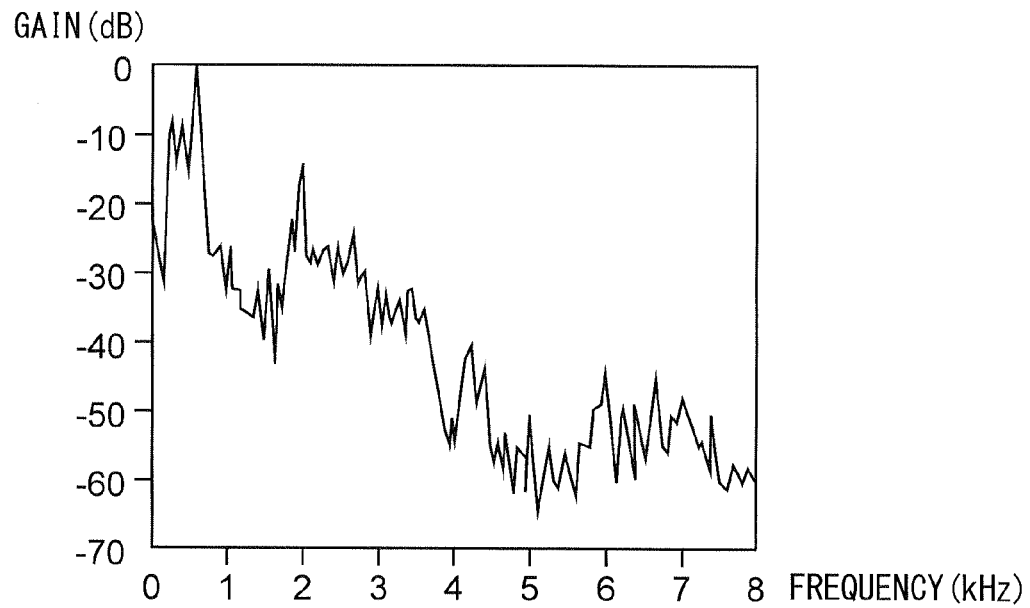
FIG. 37A is a graph showing the frequency characteristics of a sound signal, the graph illustrating an example of a sound signal comparing method.
Figure 37B:
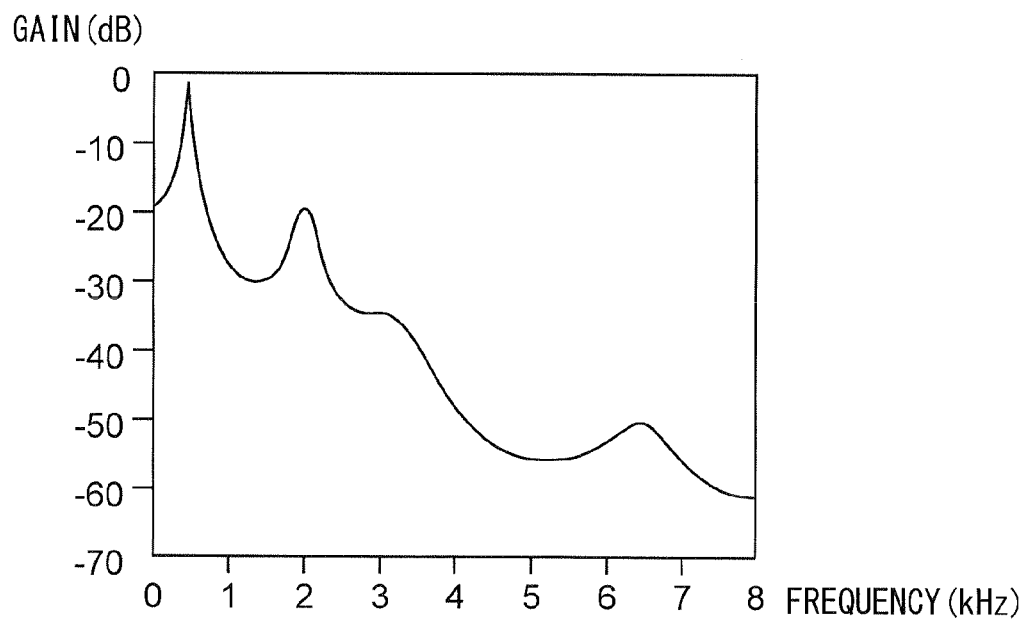
FIG. 37B is a graph showing the frequency characteristics of a sound signal, the graph illustrating an example of a sound signal comparing method.

The sound signal comparing portion 316 of this example compares the inputted sound signal with the conversation sound sample data, and outputs the comparison result. The sound signal comparing method will be described by using FIGS. 37A and 37B. FIGS. 37A and 37B are each a graph showing the frequency characteristics of a sound signal, the graph illustrating an example of the sound signal comparing method.

FIG. 37A shows the frequency characteristics of a conversation sound, and FIG. 37B shows an envelope of the frequency characteristics of FIG. 37A. As shown in FIGS. 37A and 37B, the conversation sound contains the fundamental and harmonics (harmonic components of the fundamental), and has distinctive frequency characteristics. The sound signal comparing portion 316 performs comparison by performing, for example, pattern matching on the inputted sound signal and these frequency characteristics (conversation sound sample data), and outputs the comparison result thus obtained.

Then, based on the comparison result outputted from the sound signal comparing portion 316, the conversation checking portion 313e checks the presence or absence of conversation between the subject and the device operator. In particular, in a case where the comparison result indicating that the degree of similarity between the inputted sound signal and the conversation sound sample data is equal to or higher than a predetermined level is outputted, it is judged that there is a high possibility that the subject and the device operator are in conversation with each other. On the other hand, in a case where the comparison result indicating that the degree of similarity between the inputted sound signal and the conversation sound sample data is not equal to or higher than a predetermined level is outputted, it is judged that there is a high possibility that the subject and the device operator are not in conversation with each other.

With this configuration, it is possible to distinguish the human voice from a sound other than the human voice, such as noise or irrelevant sound. This makes it possible to judge that the subject and the device operator are in conversation with each other when the human voice is actually collected.

In this example, it is preferable to adopt a configuration in which a sound on the device operator side is inputted to the sound signal comparing portion 316 separately from a sound on the subject side. In the sound signal comparing portion 316, comparison is performed on at least the sound on the device operator side.

In this case, if the comparison result indicating that the degree of similarity between the sound signal on the device operator side and the conversation sound sample data is higher than a predetermined level is outputted, the conversation checking portion 313e judges that there is a high possibility that the subject and the device operator are in conversation with each other, because the device operator makes a sound. On the other hand, if the comparison result indicating that the degree of similarity between the sound signal on the device operator side and the conversation sound sample data is lower than a predetermined level is outputted, the conversation checking portion 313e judges that there is a high possibility that the subject and the device operator are not in conversation with each other, because the device operator makes no sound.

With this configuration, it is possible to prevent the possibility of erroneously judging that conversation is going on when, for example, only the subject is making a sound. On the other hand, it is possible to judge that conversation is going on when the device operator says something to the subject, and record the sound of the device operator.

One of the methods for separating the sound on the subject side from the sound on the device operator side is a method in which a plurality of directional microphones (a microphone that collects only a sound coming from a predetermined direction) are provided, so as to produce a sound signal having different components corresponding to different directions from which the sounds are coming. On the other hand, in a case where omnidirectional microphones (a microphone that collects sounds coming from all directions at substantially a uniform signal level) are used, it is possible to use a method such as sound separation or beamforming, which is a method for producing a sound signal having different components as the sounds coming from different directions by performing processing based on the phase difference (or time lag) observed when the sounds coming from all directions are collected by the plurality of microphones that are placed in different locations. Incidentally, as an example of implementation, examples of the sound controlling portion, which will be described later, illustrate how to separate the sound on the device operator side from the sound on the subject side by using the above-described methods, and control the signal level of each sound.

On the other hand, it may be judged that there is a high possibility that the subject and the device operator are in conversation with each other if the degree of similarity between the sound signal on the subject side and the conversation sound sample data is equal to or higher than a predetermined level, and the degree of similarity between the sound signal on the device operator side and the conversation sound sample data is equal to or higher than a predetermined level. With this configuration, it is possible to judge that there is a high possibility that conversation is going on only when both the subject and the device operator are making a sound.

Moreover, the conversation sound sample data may be stored in the memory 20 shown in FIG. 1, or a number of patterns may be stored therein. Here, the frequency characteristics obtained by collecting the actual conversation sound may be used as the conversation sound sample data, or the frequency characteristics thus obtained may be averaged for use as the conversation sound sample data. Furthermore, an extracted feature, such as an envelope, of the frequency characteristics (or simplified frequency characteristics) may be used. The conversation sound sample data is not limited to the frequency characteristics, but may be any other data as long as the data represents the feature of the conversation sound. In addition, checking may be performed in combination with Examples 1 to 4, or may be performed by placing a higher priority on the checking result obtained by one of the checking methods described above.

Although the descriptions heretofore deal with, as an example, a method for checking the similarity between the conversation sound sample data and the sound signal by comparing the conversation sound sample data with the sound signal by performing pattern matching on them, it is also possible to check the similarity by any other method. The presence or absence of conversation may be checked based on the inputted sound signal by using any other method than is specifically described above.

Incidentally, hysteresis may be introduced in the checking operations of the relationship checking portions 301a to 301e of Examples 1 to 5. That is, it is possible to adopt a configuration in which the sensitivity of the checking result to the situation is controlled so as to prevent the checking result from changing abruptly. With this configuration, it is possible to prevent an unnatural sound signal from being outputted as a result of the control method of the sound controlling portion 302 provided in the following stage being changed abruptly due to an abrupt change in the checking result. For example, in the above example, even when the subject alternately speaks and listens, it is possible to continuously output the checking result indicating that conversation is going on. Instead, it is also possible to introduce hysteresis in the control operation of the sound controlling portion 302.

(Example 1 of the Sound Controlling Portion)

Figure 38:
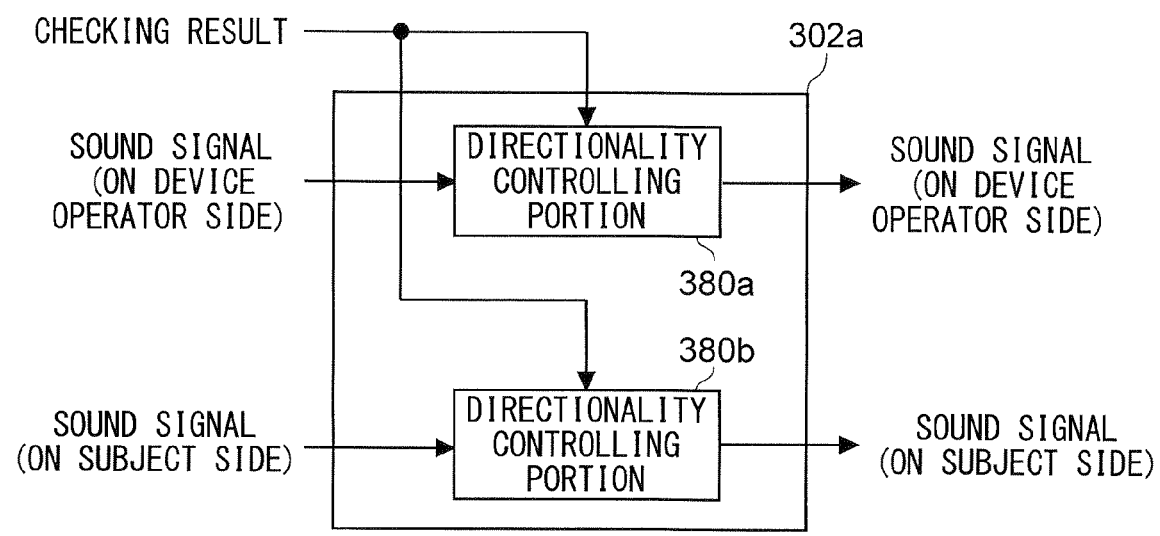
FIG. 38 is a block diagram showing Example 1 of a sound controlling portion.

Next, with reference to the drawings, Example 1 of the sound controlling portion 302 will be explained. FIG. 38 is a block diagram showing Example 1 of the sound controlling portion. In this example, it is assumed that the sound collecting portion 7 shown in FIG. 1 is built as a microphone array provided with a plurality of directional microphones, including at least a device operator's-side microphone (unillustrated) exhibiting high directionality on the device operator side and a subject's-side microphone (unillustrated) exhibiting high directionality on the subject side.

As shown in FIG. 38, a sound controlling portion 302a of this example includes: a directionality controlling portion 380a that controls the directional characteristics of a sound in the sound signal produced from the sounds collected by the device operator's-side microphone; and a directionality controlling portion 380b that controls the directional characteristics of a sound in the sound signal produced from the sounds collected by the subject's-side microphone.

Specifically, the directionality controlling portions 380a and 380b each control the intensity of a sound in the inputted sound signal based on the checking result outputted from the relationship checking portion 301. In particular, in a case where the relationship checking portion 301 outputs the checking result indicating that the device operator and the subject are not in conversation with each other, the directionality controlling portion 380a lowers the signal level of a sound in the sound signal to a satisfactory extent, and outputs the resultant signal. On the other hand, in a case where the relationship checking portion 301 outputs the checking result indicating that the device operator and the subject are in conversation with each other, the directionality controlling portion 380a outputs the sound signal as it is without lowering the signal level of a sound in the sound signal to a satisfactory extent.

As a result, it is possible to control the signal levels of sounds on the subject side and the device operator side (that is, the directional characteristics on these sides) with a simple method. In addition, by automatically performing the above control by the relationship checking portion 301 described above, it is possible to save the device operator the trouble of performing switching on their own, and to prevent a recorded sound signal or image signal from becoming unnatural due to, for example, operating errors or slowness in performing switching.

In a case where the relationship checking portion 301 outputs the checking result indicating that the device operator and the subject are in conversation with each other, the sound signal on the device operator side and the sound signal on the subject side may be outputted after being controlled by the directionality controlling portions 380a and 380b so as to be at the same signal level. With this configuration, it is possible to prevent the conversation sound from becoming unnatural due to the signal level of one of the sounds of the device operator and the subject being higher than that of the other.

Moreover, it is also possible to decide which of the plurality of directional microphones is a subject's-side microphone based on the direction in which the subject is located by determining that direction by using the above method such as the face detection. Furthermore, it is also possible to make higher or lower the signal levels of the sounds of the subject and the device operator by controlling the intensity of a sound in the sound signal produced not only by the subject's-side microphone and the device operator's-side microphone but also by the other directional microphones.

The subject's-side sound signal and the device operator's-side sound signal outputted from the sound controlling portion 302a may be recorded as sound signals on different (for example, left and right) channels, or may be recorded after being combined with different sound signals on different channels. It is also possible to decide on which channel the sound signal is recorded based on the position of the subject in the image. For example, in a case where the sound signals are recorded as right- and left-channel sound signals, and the subject is detected to be on the left in the image, the subject's-side sound signal is recorded on the left channel and the device operator's-side sound signal is recorded on the right channel.

This makes it possible to reproduce the sound of the subject and the sound of the device operator as different channels at the time of reproduction of the recorded sound signal, and thus makes conversation more true-to-life. In particular, such control may be performed in a case where the relationship checking portion 301 outputs the checking result indicating that the device operator and the subject are in conversation with each other.

Although this example deals with a configuration in which a plurality of directional microphones are provided, it is not limited to this specific configuration. For example, in a case where separation of the sounds of the subject and the device operator is performed in the previous stage of the sound controlling portion 302a (for example, the relationship checking portion 301; in particular, the relationship checking portion 301e of Example 5), control may be performed on each of the sounds thus separated.

(Example 2 of the Sound Controlling Portion)

Figure 39:
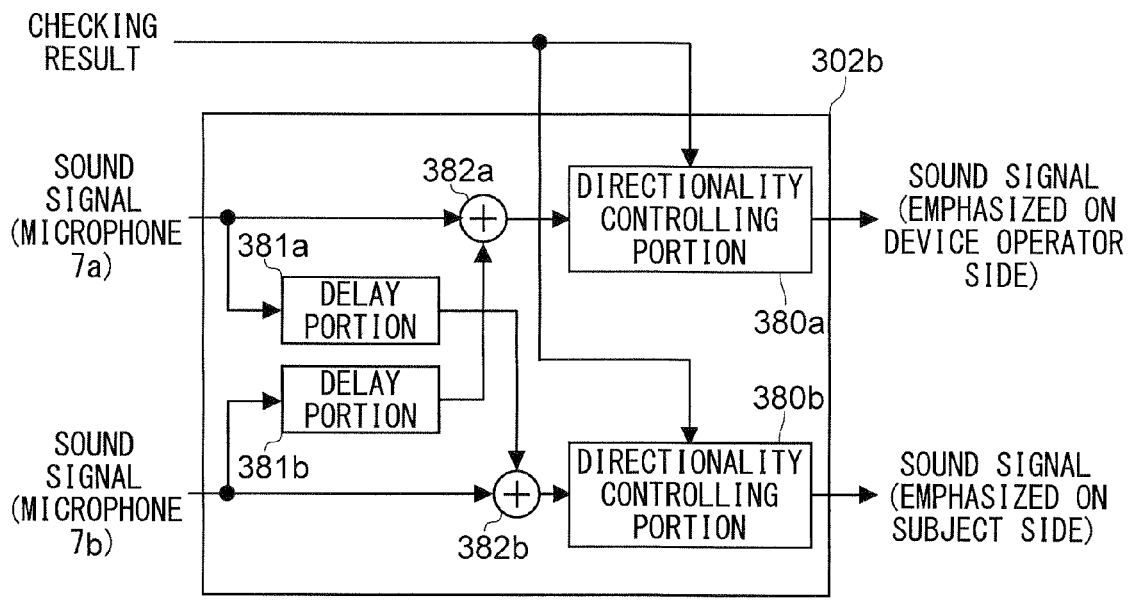
FIG. 39 is a block diagram showing Example 2 of the sound controlling portion.

Next, with reference to the drawings, Example 2 of the sound controlling portion 302 will be explained. FIG. 39 is a block diagram showing Example 2 of the sound controlling portion, and is the equivalent of FIG. 38 showing Example 1 of the sound controlling portion. It is to be noted that such portions as are found also in FIG. 38 are identified with common reference numerals and their detailed descriptions will be omitted.

Figure 40:
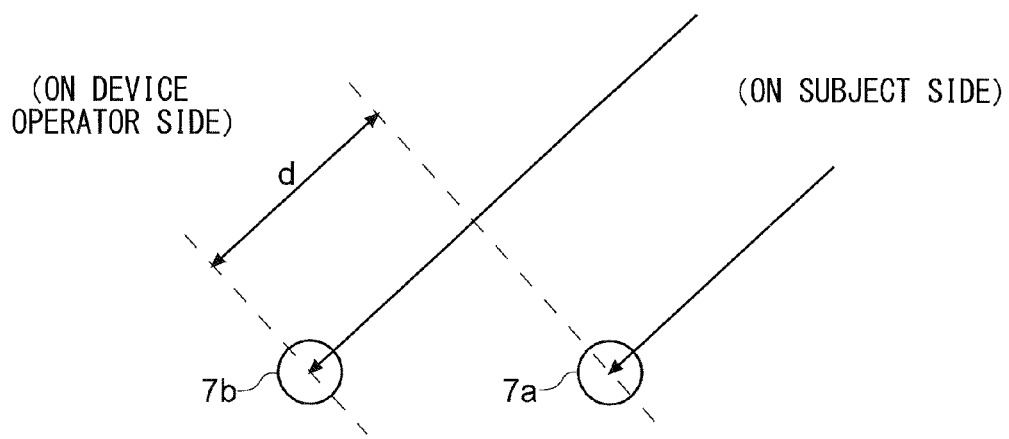
FIG. 40 is a schematic diagram showing an example of the configuration of a microphone array.

In this example, it is assumed that the sound collecting portion 7 shown in FIG. 1 is built as a microphone array provided with a plurality of omnidirectional microphones. An example of the configuration of such a microphone array is shown in FIG. 40, which is a schematic diagram of a microphone array. As an example of implementation, a description will be given below of a case where a microphone array provided with microphones 7a and 7b, such as the one shown in FIG. 40, is used.

As shown in FIG. 39, the sound controlling portion 302b of this example includes: a delay portion 381a that introduces a predetermined time delay into a sound signal produced from the sounds collected by the microphone 7a, and outputs the resultant signal; a delay portion 381b that introduces a predetermined time delay into a sound signal produced from the sounds collected by the microphone 7b, and outputs the resultant signal; a combining portion 382a that combines the sound signal produced by the microphone 7a and the sound signal outputted from the delay portion 381b; a combining portion 382b that combines the sound signal produced by the microphone 7b and the sound signal outputted from the delay portion 381a; a directionality controlling portion 380a that controls the directional characteristics of a sound in the sound signal outputted from the combining portion 382a; and a directionality controlling portion 380b that controls the directional characteristics of a sound in the sound signal outputted from the combining portion 382b.

As an example of implementation, a description will be given of a case where the microphone 7a is provided on the subject side, and the microphone 7b is provided on the device operator side. When inputted to the microphone 7a and the microphone 7b, the sound of the subject reaches them with a time delay corresponding to a path difference d shown in FIG. 40. Thus, the sound collected by the microphone 7b lags behind the sound collected by the microphone 7a by a predetermined time.

In this case, the delay portion 381a introduces a predetermined time delay into the sound signal inputted from the microphone 7a, and the combining portion 382b combines it with the sound signal inputted from the microphone 7b (for example, combines them by addition). With this configuration, the sounds on the subject side are synchronized with each other, and are then combined. This makes it possible to obtain a sound signal in which the sound on the subject side is emphasized (in which, as a result of combining the sounds on the subject side, the signal level of these sounds is made higher than that of the sounds on the non-subject side). On the other hand, this holds true for the sound on the device operator side. That is, by introducing a predetermined delay into the sound signal inputted from the microphone 7b with the delay portion 381b, and combining it with the sound signal inputted from the microphone 7a with the combining portion 382a, it is possible to obtain a sound signal in which the sound on the device operator side is emphasized.

Then, based on the checking result outputted from the relationship checking portion 301, the directionality controlling portions 380a and 380b control the directional characteristics of the sound in the sound signal. Specifically, in a case where the relationship checking portion 301 outputs the checking result indicating that the device operator and the subject are not in conversation with each other, the directionality controlling portion 380a lowers, to a satisfactory extent, the signal level of a sound in the sound signal in which the sound of the device operator is emphasized, and outputs the resultant signal. On the other hand, in a case where the relationship checking portion 301 outputs the checking result indicating that the device operator and the subject are in conversation with each other, the directionality controlling portion 380a outputs the sound signal as it is without lowering, to a satisfactory extent, the signal level of a sound in the sound signal in which the sound of the device operator is emphasized.

As a result, it is possible to control the signal levels of sounds on the subject side and the device operator side (that is, the directional characteristics on these sides) simply by providing at least two microphones. In addition, by automatically performing the above control by the relationship checking portion 301 described above, it is possible to save the device operator the trouble of performing switching on their own, and to prevent a recorded sound signal or image signal from becoming unnatural due to, for example, operating errors or slowness in performing switching.

In a case where the relationship checking portion 301 outputs the checking result indicating that the device operator and the subject are in conversation with each other, the sound signal on the device operator side and the sound signal on the subject side may be outputted after being controlled by the directionality controlling portions 380a and 380b so as to be at the same signal level. With this configuration, it is possible to prevent the conversation sound from becoming unnatural due to the signal level of one of the sounds of the device operator and the subject being higher than that of the other.

Moreover, it is also possible to set a delay to be introduced into the sound of the subject based on the result of the face detection described above. Doing so helps estimate the positional relationship (in particular, the direction in which the subject is located relative to the microphones 7a and 7b) between the subject and the microphones 7a and 7b, and thus makes it possible to set an appropriate amount of delay. For the sound of the device operator, it is also possible to set the amount of delay based on the position of the device operator operating the imaging device in a normal manner. Instead, it is also possible to set the amount of delay by using the correlation between the sound signals inputted from the microphones 7a and 7b.

A sound signal in which the sound on the subject side is emphasized and a sound signal in which the sound on the device operator side is emphasized, the sound signals being outputted from the sound controlling portion 302b, may be recorded as sound signals on different channels, or may be recorded after being combined with different sound signals on different channels. It is also possible to decide on which channel the sound signal is recorded based on the position of the subject in the image.

This makes it possible to reproduce the sound of the subject and the sound of the device operator as different channels at the time of reproduction of the recorded sound signal, and thus makes conversation more true-to-life. In particular, such control may be performed in a case where the relationship checking portion 301 outputs the checking result indicating that the device operator and the subject are in conversation with each other.

Although the example described above deals with a case where the combining portions 382a and 382b combine a plurality of signals by performing addition on them, it is also possible to combine them by performing subtraction on them. In a case where subtraction is performed for combining the signals, it is possible to obtain a sound signal in which the sound in a predetermined direction is reduced (in which, as a result of combining the signals, the signal level of the sound on the subject side is made lower than that of the sounds on the non-subject side). For example, as described above, the sounds on the device operator side are synchronized with each other, and are then inputted to the combining portion 382a. If subtraction is performed when combining these sounds, the synchronized sounds on the device operator side are greatly reduced. Thus, it is possible to reduce only the sounds on the device operator. Incidentally, the combining portions 382a and 382b may be allowed to switch between addition and subtraction based on the checking result of the relationship checking portion 301. With this configuration, it is possible to control the intensities of the sounds on the subject side and the device operator side (the directional characteristics on these sides) by combining the sounds.

(Example 3 of the Sound Controlling Portion)

Figure 41:
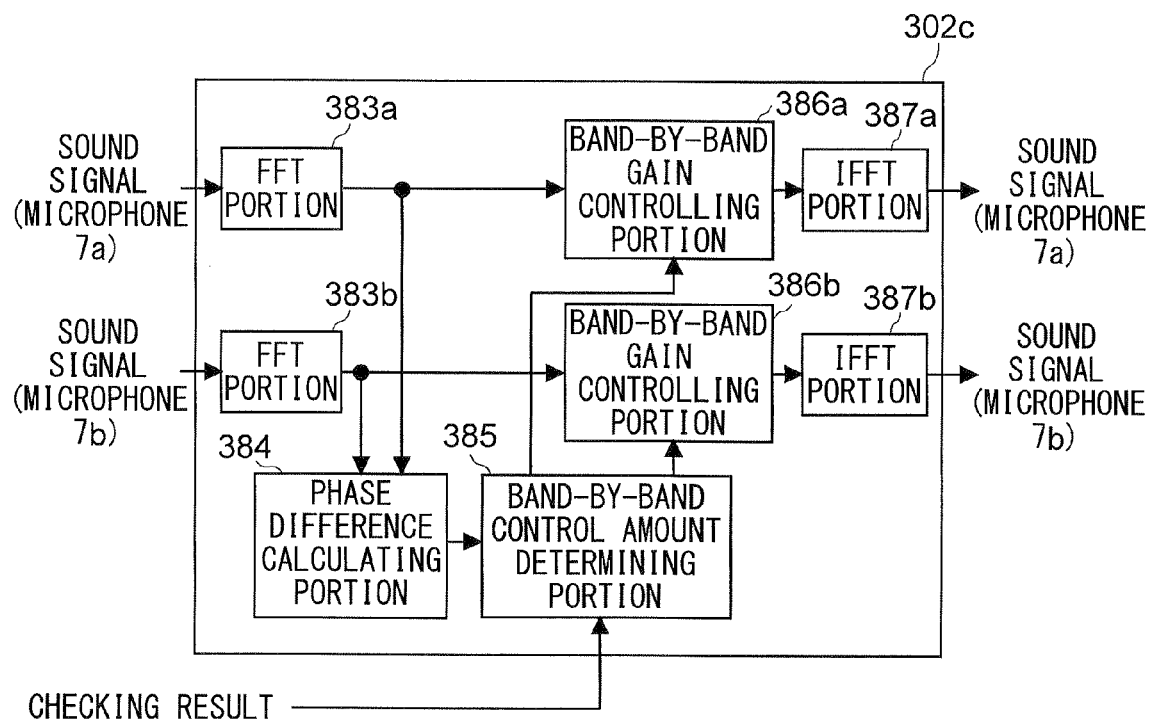
FIG. 41 is a block diagram showing Example 3 of the sound controlling portion.

Next, with reference to the drawings, Example 3 of the sound controlling portion 302 will be described. FIG. 41 is a block diagram showing Example 3 of the sound controlling portion 302, and is the equivalent of FIG. 38 and FIG. 39 showing Examples 1 and 2, respectively, of the sound controlling portion 302. It is to be noted that such portions as are found also in FIGS. 38 and 39 are identified with common reference numerals and their detailed descriptions will be omitted. Also in this example, the microphones 7a and 7b shown in FIG. 40 are used.

As shown in FIG. 41, the sound controlling portion 302c of this example includes: an FFT portion 383a that performs the fast Fourier transform (FFT) on the sound signal inputted from the microphone 7a; an FFT portion 383b that performs the FFT on the sound signal inputted from the microphone 7b; a phase difference calculating portion 384 that detects the phase difference between the sound signals subjected to the FFT by the FFT portions 383a and 383b; a band-by-band control amount determining portion 385 that determines the amount of control of the directional characteristics on a band-by-band basis based on the phase difference data detected by the phase difference calculating portion 384 and the checking result of the relationship checking portion 301; a band-by-band gain controlling portion 386a that controls the intensity of the sound in the sound signal subjected to the FFT by the FFT portion 383a based on the amount of control determined by the band-by-band control amount determining portion 385; a band-by-band gain controlling portion 386b that controls the intensity of the sound in the sound signal subjected to the FFT by the FFT portion 383b based on the amount of control determined by the band-by-band control amount determining portion 385; an IFFT portion 387a that performs the inverse Fourier transform (IFFT) on the sound signal subjected to the intensity control by the band-by-band gain controlling portion 386a; and an IFFT portion 387b that performs the IFFT on the sound signal subjected to the intensity control by the band-by-band gain controlling portion 386b.

The FFT portions 383a and 383b perform the FFT on the sound signals inputted from the microphones 7a and 7b, and output them as signals on the frequency axis. Then, the phase difference calculating portion 384 calculates the phase difference between each frequency component in the sound signal on the frequency axis inputted from the FFT portion 383a and the corresponding frequency component in the sound signal on the frequency axis inputted from the FFT portion 383b. At this time, based on the phase difference between each frequency component in one inputted sound signal and the corresponding frequency component in the other inputted sound signal and the frequency of that frequency component, the phase difference calculating portion 384 calculates the direction from which that frequency component has come. Then, based on the direction calculated by the phase difference calculating portion 384, the direction from which each frequency component of the sound signal has come, and the checking result outputted from the relationship checking portion 301, the band-by-band control amount determining portion 385 determines whether or not to increase the intensity (signal level) of that frequency component.

If the band-by-band control amount determining portion 385 finds that the signal level of a frequency component should be increased, the spectrum coefficient of that frequency component is increased by the band-by-band gain controlling portions 386a and 386b; on the other hand, if the band-by-band control amount determining portion 385 finds that the signal level of a frequency component should not be increased, the spectrum coefficient of that frequency component is reduced. Then, the resultant spectrum coefficient is subjected to the IFFT by the IFFT portions 387a and 387b, is re-converted into the time signal, and is then outputted.

In this method, by setting a frequency at which the spacing between the two microphones 7a and 7b is one-half wavelength long as an upper limit frequency for directionality control, it is possible to calculate an accurate direction from which the sound component has come, that is, a sound source direction, based on the phase difference. This makes it possible to finely adjust the directional angle.

In this example, in a case where the relationship checking portion 301 outputs the checking result indicating that the device operator and the subject are not in conversation with each other, the band-by-band gain controlling portions 386a and 386b control the signal level of the sound in the sound signal so that the level of the sound on the device operator side is reduced to a satisfactory extent. On the other hand, in a case where the relationship checking portion 301 outputs the checking result indicating that the device operator and the subject are in conversation with each other, the band-by-band gain controlling portions 386a and 386b control the signal level of the sound in the sound signal so that the level of the sound on the device operator side is not reduced excessively.

This makes it possible to accurately control the directional characteristics of the sound coming from the subject side and the sound coming from the device operator side. In addition, by automatically performing the above control by the relationship checking portion 301 described above, it is possible to save the device operator the trouble of performing switching on their own, and to prevent a recorded sound signal or image signal from becoming unnatural due to, for example, operating errors or slowness in performing switching.

Incidentally, it is also possible to provide two sound controlling portions 302c shown in FIG. 41, of which one is provided for extracting the sound of the subject and controlling the intensity thereof, and the other is provided for extracting the sound of the device operator and controlling the intensity thereof. With this configuration, it is possible to achieve separation between the sound on the subject side and the sound on the device operator side. In this case, processing may be performed individually on the sound signal on the subject side and the sound signal on the device operator side. In particular, the intensity control using the directionality controlling portions 380a and 380b as shown in Example 1 may be performed individually on the separated sound signals.

Also, in this case, the sound signal on the subject side and the sound signal on the device operator side may be recorded as sound signals on different channels, or may be recorded after being combined with different sound signals on different channels. It is also possible to decide on which channel the sound signal is recorded based on the position of the subject in the image.

This makes it possible to reproduce the sound of the subject and the sound of the device operator as different channels at the time of reproduction of the recorded sound signal, and thus makes conversation more true-to-life. In particular, such control may be performed in a case where the relationship checking portion 301 outputs the checking result indicating that the device operator and the subject are in conversation with each other.

In a case where the relationship checking portion 301 outputs the checking result indicating that the device operator and the subject are in conversation with each other, the sound on the device operator side and the sound on the subject side may be outputted after being controlled by the band-by-band gain controlling portions 386a and 386b so as to be at the same signal level. With this configuration, it is possible to prevent the conversation sound from becoming unnatural due to the signal level of one of the sounds of the device operator and the subject being higher than that of the other. Instead, after separation of the sounds of the subject and the device operator, the intensity control may be performed so that the sound signals of the subject and the device operator are at the same signal level.

Moreover, when checking the direction in which the subject is located, the band-by-band control amount determining portion 85 may perform checking based on, for example, the result of the face detection described above. Doing so helps estimate the positional relationship (in particular, the direction in which the subject is located relative to the microphones 7a and 7b) between the subject and the microphones 7a and 7b, and thus makes it possible to accurately emphasize the sound that has come from the direction in which the subject is located. In addition, it is also possible to estimate the direction in which the device operator is located based on the position of the device operator operating the imaging device in a normal manner.

Incidentally, the sound controlling portions 302a to 302c of Examples 1 to 3 described above may be used in combination of two or more of them. For example, the sound signal obtained in Example 1 or 3 may be combined with the sound signal obtained by the sound controlling portion 302b of Example 2. Such a combination helps obtain the sound signal including not only the conversation sound but also some ambient sound, and thus makes it possible to record a natural sound signal. Examples 1 to 3 described above deal solely with cases where two microphones are provided; however, three or more microphones may be provided.

The examples described above deal with cases where the relationship checking portion 301 checks the presence or absence of conversation between the subject and the device operator; however, a relationship other than conversation may be checked. For example, the relationship between a moving subject and a device operator following it may be checked based on the general blurring of the image, wind noise, a change in focus, or the like, caused by the movement. In this case, it is also possible to perform such control as to reduce the signal level of a sound caused by the movement of the device operator or the subject. Furthermore, the relationship between the scenery, which serves as the subject, and the device operator watching it calmly may be checked based on the length of time for which the image is unchanged, how faint the sound of the subject and the device operator is, a change in focus, or the like. In this case, it is also possible to perform such control as to achieve more realistic sound signals by making larger the directional angle or the band of sound to be recorded. As described above, the imaging device of this embodiment may be of any other type as long as it checks the relationship between the subject and the device operator based on the image signal, the sound signal, the imaging portion control signal, or the like, and controls the sound signal according to the checking result thus obtained.

<<Sound Reproducing Device>>

Figure 42:
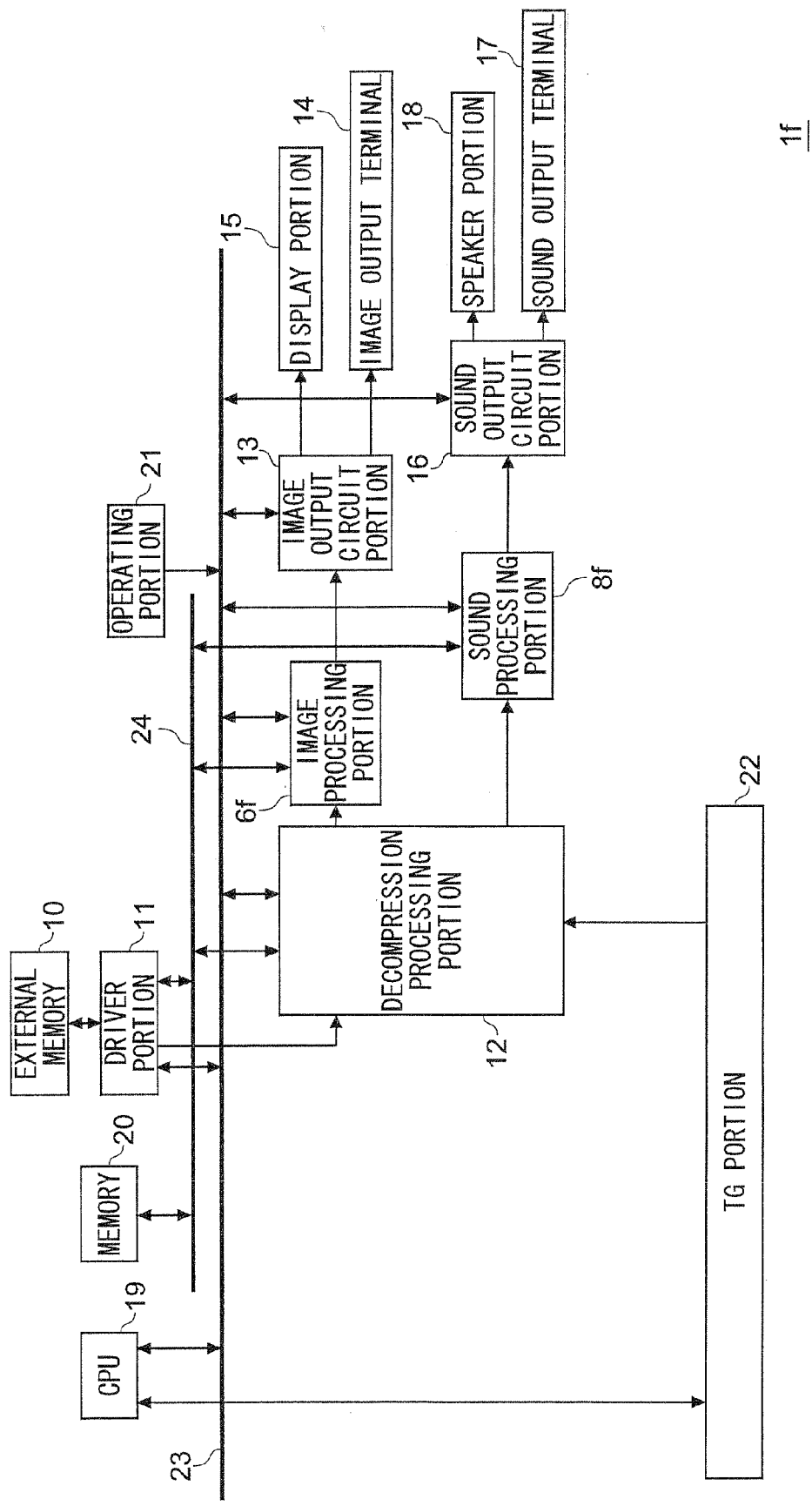
FIG. 42 is a block diagram showing an example of a sound reproducing device.

The descriptions heretofore deal with the imaging device 1 having a configuration shown in FIG. 1 as an example of the sound recording device. However, the sound corrector (sound processing portion) of the present invention can be applied not only to the sound recording devices but to sound reproducing devices that can output sound and images, such as DVD players or video cassette recorders connected, for example, to liquid crystal displays or plasma televisions. FIG. 42 shows, as an example, a sound reproducing device provided with a sound processing portion having a configuration similar to that of the sound processing portion of Example 2 of the first embodiment. In FIG. 42, such blocks as are configured and operate in substantially the same manner as in FIG. 1 are identified with the same reference numerals. It is to be noted that a sound reproducing device having a configuration similar to those of the sound processing portions of other embodiments can be similarly obtained.

As is the case with the imaging device (sound recording device) 1 shown in FIG. 1, a sound reproducing device 1f shown in FIG. 42 includes the driver portion 11, the decompression processing portion 12, the image output circuit portion 13, the image output terminal 14, the display portion 15, the sound output circuit portion 16, the sound output terminal 17, the speaker portion 18, the TG portion 22, the CPU 19, the memory 20, the operating portion 21, and the external memory 10. Unlike the imaging device 1 shown in FIG. 1, the sound reproducing device 1f includes, in place of the image processing portion 6, an image processing portion 6f that processes the image signal obtained by the decompression processing portion 12, and, in place of the sound processing portion 8, a sound processing portion 8f that processes the sound signal obtained by the decompression processing portion 12. For example, the image processing portion 6f includes the face detector 50 shown in FIG. 5, and the sound processing portion 8f has a configuration similar to that of the sound processing portion 8b shown in FIG. 10. The external memory 10 stores an image signal recorded thereto and a sound signal subjected to sound correction processing and recorded thereto, and a sound signal that does not undergo sound correction processing and in its original form and, as an index, zoom factor information obtained at the time of acquisition of the original sound signal, the original sound signal and the zoom factor information being recorded along with the image signal and the sound signal subjected to sound correction processing. Based on the face detection signal outputted from the face detector 50 of the image processing portion 6f and the sound signal that does not undergo sound correction processing and the zoom factor information, the sound signal and the zoom factor information being outputted from the external memory 10, the sound processing portion 8f can perform sound processing similar to that performed by the sound processing portion according to Example 2 of the first embodiment.

If the signal stored in the external memory 10 does not include zoom factor information or the like, it is simply necessary to perform sound correction processing in the sound processing portion 8f based on the size of a target subject in the image.

Figure 43:
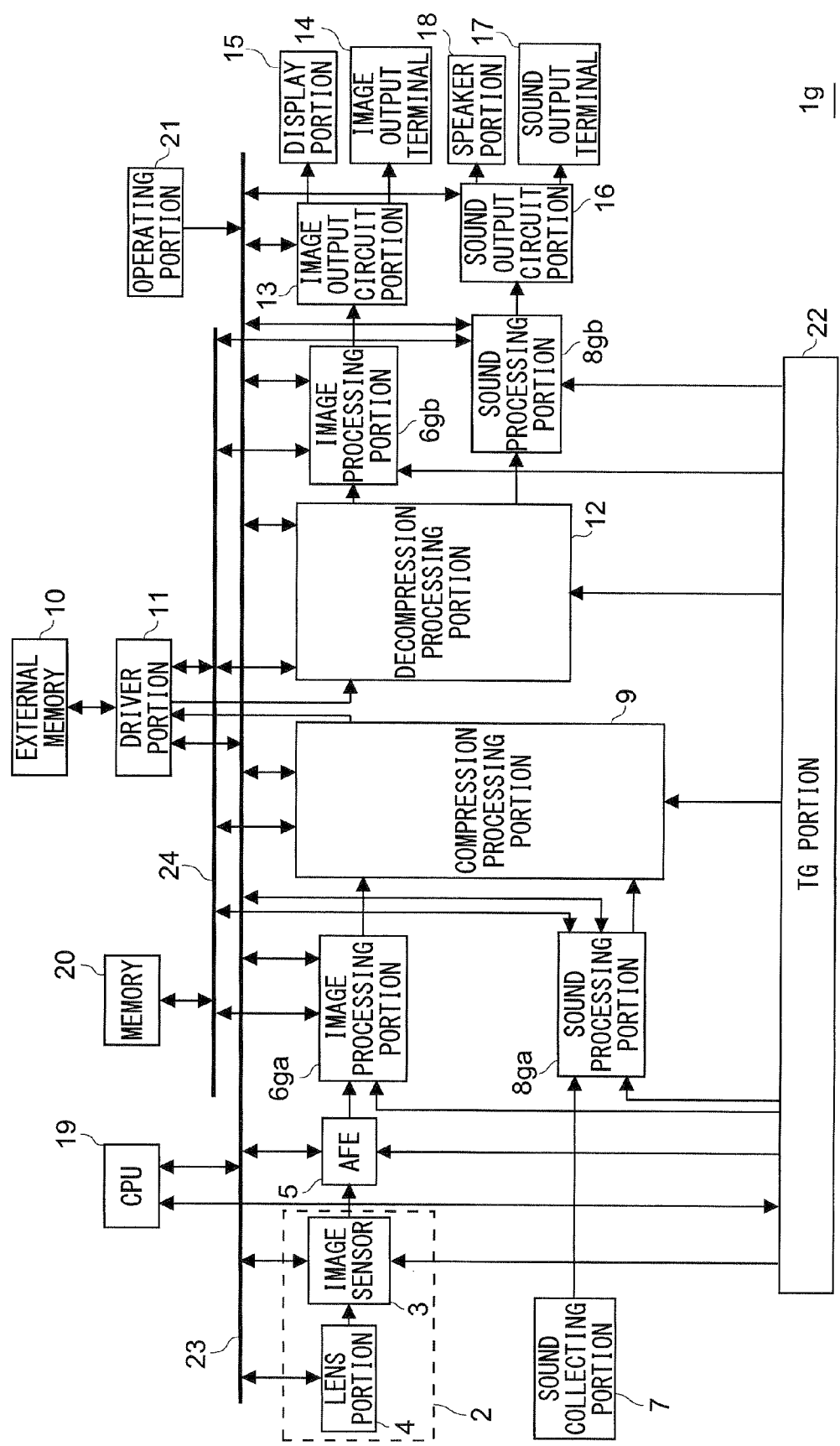
FIG. 43 is a block diagram showing another example of the sound reproducing device.

Another example of the sound reproducing device to which the sound corrector of the present invention is applied is shown in FIG. 43. In FIG. 43, such blocks as are configured and operate in substantially the same manner as in FIG. 1 are identified with the same reference numerals. Hereinafter, an imaging device having an imaging function in addition to a reproducing function will be described as an example of the sound reproducing device.

An imaging device 1g shown in FIG. 43 differs from the imaging device 1 shown in FIG. 1. in that an image processing portion 6ga and a second processing portion 8ga are provided in place of the image processing portion 6 and the sound processing portion 8, respectively, an image processing portion 6gb is additionally provided between the decompression processing portion 12 and the image output circuit portion 13, and a second processing portion 8gb is additionally provided between the decompression processing portion 12 and the sound output circuit portion 13.

Unlike the image processing portion 6, the image processing portion 6ga does not include, for example, the face detector 50 shown in FIG. 5. In addition, although the sound processing portion 8ga performs processing such as A/D conversion on a sound signal in the form of an analog signal from the sound collecting portion 7, it does not perform other sound correction processing, unlike the sound processing portion 8.

The sound processing portion 8ga may receive camera control information (focus information or zoom factor information) from the CPU 19, and produce a compressed/encoded signal by adding the camera control information as an index. In this case, the index is recorded in the external memory 10 once a frame, which is a unit of processing, at the time of compression and recording of the sound signal, For example, in a case where the sound signal is recorded as a 48-kHz sampling signal by using MPEG-AAC, one frame, a unit of processing consists of 1024 samples, which corresponds to approximately 21.3 $(1024 \div (48 \times 10^3) \approx 2.13 \times 10^{-2})$ msec. Thus, it is necessary simply to record the zoom factor information of an image once ever 21.3 msec in synchronism with the start of recording. In the case of Dolby Digital, one frame consists of 1526 samples, and, in a case where he sound signal is recording as 48-kHz sampling signal, it is necessary simply to record the index once ever 32 $(1536 \div (48 \times 10^3) = 3.2 \times 10^{-2})$ msec in the external memory 10.

In addition, the image processing portion 6gb may include the face detector 50 shown in FIG. 5. Furthermore, in a case where the sound processing portion 8gb is configured so as to have a configuration similar to that of the sound processing portion 200 according to the second embodiment, it has a configuration similar to the sound processing portion 8 except that it does not include an A/D converting portion and obtains camera control information as needed from the index added to the sound signal instead of receiving it from outside. The sound processing portion 8bg receives number information from the image processing portion 6gb, and receives information on the movement of the face, mouth, etc. and detected face/person position information as needed from the image processing portion 6gb. In this case, sound correction processing performed by the sound processing portion 8gb is basically the same as that performed by the sound processing portion applied to the sound recording device.

Now, a description will be given of a case where the sound processing portion 8gb is configured so as to have a configuration similar to that of the sound processing portion 300 according to the third embodiment. It is to be noted that the checking method of the relationship checking portion 301 and the control method of the sound controlling portion 302 are the same as those of the examples of the third embodiment and their detailed descriptions will be omitted.

However, in a case where the relationship checking portion 301 outputs the checking result by using the imaging portion control data, like the relationship checking portion 301c of Example 3, the necessary imaging portion control data may be recorded separately from the sound signal and the image signal at the time of recording of these signals; instead, it may be recorded as data added to any data such as the sound signal or image signal. Note that it can also be construed that the image processing portion 6gb is part of the sound processing portion 8gb.

With the configuration described above, it is possible to control the sound signal by checking the relationship between the subject and the device operator even at the time of reproduction. This makes it possible to perform checking and control on a sound signal to which checking or control has not been performed at the time of recording.

Figure 44A:
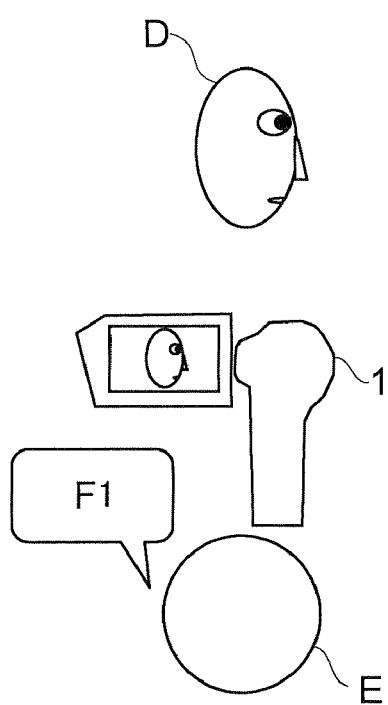
FIG. 44A is a schematic diagram showing an example of control performed when the sound processing portion according to the third embodiment is applied to the sound reproducing device.
Figure 44B:
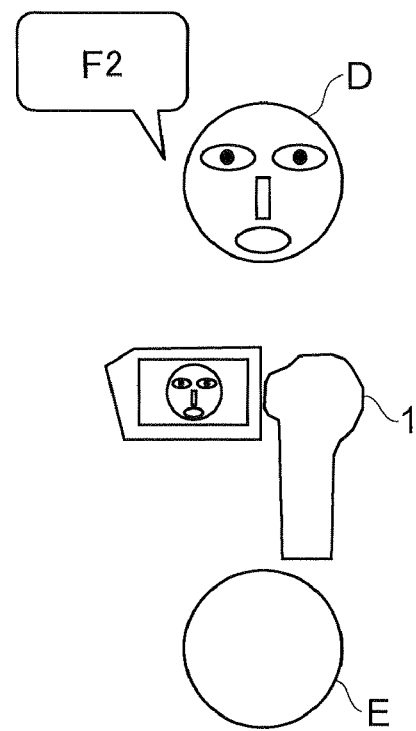
FIG. 44B is a schematic diagram showing an example of control performed when the sound processing portion according to the third embodiment is applied to the sound reproducing device.

With reference to FIGS. 44A and 44B, a description will be given of an example of control performed when the sound processing portion 300 according to the third embodiment is applied to the sound reproducing device. FIGS. 44A and 44B are each a schematic diagram showing an example of control performed when the sound processing portion according to the third embodiment is applied to the sound reproducing device. It is assumed that a scene shown in FIG. 44A and a scene shown in FIG. 44B are continuous in terms of time. FIGS. 44A and 44B show a scene in which the device operator E says something to the subject D with a sound F1 (FIG. 44A), and the subject D replies to it with a sound F2 (FIG. 44B).

Here, in a case where the relationship checking portion 301 adopts the checking method based on the image signal, for example, the checking method of the relationship checking portion 301a of Example 1 described above, there is a possibility that FIG. 44B is inconveniently judged to be a scene showing the start of conversation between the subject D and the device operator E. To avoid this, in this example, the following control is performed so that the sound F1 in FIG. 44A is judged to be part of the conversation.

In this example, at the time of actual reproduction, an analysis of the image signal is performed prior to reproduction. Suppose that the checking result indicating that conversation is going on at that point in time as illustrated in FIG. 44B is outputted as a result of checking being performed by using the above-described relationship checking portion 301a, for example. However, for the scene of this example, it is preferable to control the directional characteristics from a scene preceding, by a predetermined time, the scene (FIG. 44B) for which checking is performed based on the image signal.

Thus, the directional characteristics are controlled by the sound controlling portion 302, assuming that FIG. 44A also illustrates the scene of conversation. This control helps prevent the signal level of the sound F1 of the device operator from being reduced at the start of the conversation, making it possible to reproduce a clearly audible conversation sound.

Furthermore, it is also possible to accurately specify a point in time at which the sound F1 is produced by performing checking based on the sound signal from the preceding scene. In performing checking based on the sound signal, the checking method of the relationship checking portion 301e of Example 5 described above may be used. With this configuration, it is possible to prevent control of the directional characteristics from being performed on a non-conversation scene before the sound F1.

By reproducing the image signal and the sound signal by controlling the directional characteristics in the manner as described above, it is possible, in particular, to prevent the signal level of the sound of the device operator from being reduced at the start of the conversation. In addition, this helps detect an accurate conversation start time, making it possible to reproduce a clearly audible conversation sound.

It is to be noted that the above control example performed at the time of reproduction may be applied at the time of recording. For example, the sound processing portion 8 shown in FIG. 1 may be so configured as to temporarily retain the inputted sound signal, and perform control on the retained sound signal according to the checking result.

Moreover, it is also possible to adopt a configuration in which the sound processing portion 8 and the sound processing portion 8gb are provided, such that checking of the relationship between the subject and the device operator and control of the sound signal can be performed at any point in time at the time of recording and reproduction.

Furthermore, what has been described above may be applied not only to the time of reproduction or recording but also to the time of editing. For example, it is also possible to input the sound signal and the image signal controlled by the sound processing portion 8gb shown in FIG. 43 to the compression processing portion 9, and record compressed/encoded data in the external memory 10. In addition, when recording the data in the external memory 10, the existing data may be overwritten, or the data may be recorded as different data. Furthermore, the sound corrector of the present invention may be applied to an editing device having such an editing function.

<<Modifications and Variations>>

In the imaging devices 1 and 1g and the sound reproducing device 1f of the embodiments of the present invention, operations of the sound processing portions 8, 8f, and 8gb and the image processing portions 6, 6f, and 6gb may be performed by a control device such as a microcomputer. Furthermore, all or part of the function realized by such a control device may be written as a program, such that all or part of the function is realized by executing the program on a program executing device (for example, a computer).

The imaging devices 1 and 1g and the sound reproducing device 1f shown in FIGS. 1, 42, and 43, and the sound processing portions 8a, 8b, 200, and 300 shown in FIGS. 3, 10, 17, and 27 are not limited to the examples specifically described above, but may be achieved with hardware or a combination of hardware and software. In a case where the imaging devices 1 and 1g, the sound reproducing device 1f, and the sound processing portions 8a, 8b, 200, and are configured by using software, the block diagrams of portions achieved with the software serve as the functional block diagrams thereof.

It is to be understood that the present invention may be practiced in any other manner than specifically described above as embodiments, and various modifications are possible within the scope of the invention.

The present invention relates to sound correctors that correct a sound paired with an image, to sound recording devices and sound reproducing devices provided with such sound correctors, and to a sound correcting method. The present invention is particularly suitable for use in imaging devices that can record and reproduce moving images.

What is claimed is:

1. A sound recording device comprising:
an imaging portion obtaining an image including a subject via a lens portion;
a sound collecting portion obtaining a sound; and
a particular part detecting portion detecting a particular part of the subject from the image,
wherein, based on a size of the particular part in the image, the particular part being detected by the particular part detecting portion, sound processing is performed for the sound obtained by the sound collecting portion.

2. The sound recording device of claim 1,
wherein a zoom factor of the lens portion is able to be changed,
wherein, based on the size of the particular part in the image and the zoom factor, the sound processing is performed for the sound obtained by the sound collecting portion.

3. The sound recording device of claim 1,
wherein a focus distance of the lens portion is able to be changed,
wherein, based on the size of the particular part in the image and the focus distance, the sound processing is performed for the sound obtained by the sound collecting portion.

4. The sound recording device of claim 1,
wherein the sound processing is at least one of adjustment of directional characteristics of the sound collecting portion, adjustment of a signal level of the sound, and adjustment of a level of a particular band of the sound.

5. The sound recording device of claim 1,
wherein the subject having the particular part is an object that makes a sound.

6. The sound recording device of claim 1,
wherein the particular part is a face of a person.

7. A sound recording device comprising:
an imaging portion taking an image;
a sound collecting portion obtaining a sound paired with the image taken by the imaging portion;
a relationship checking portion checking a relationship between a subject included in the image and a device operator using the recording device, and outputting a obtained checking result, wherein the relationship checking portion further checks a presence or absence of conversation between the subject and the device operator, and outputs the obtained checking results; and
a sound controlling portion controlling the sound obtained by the sound collecting portion based on the obtained checking result outputted from the relationship checking portion,
wherein the sound is recorded, and
wherein, if the obtained checking result indicating a presence of conversation between the subject and the device operator is outputted from the relationship checking portion,
the sound controlling portion controls the sound such that, in that sound, a sound on a device operator side and a sound on a subject side are made equal in intensity.

8. A sound recording device comprising:
an imaging portion taking an image;
a sound collecting portion obtaining a sound paired with the image taken by the imaging portion;
a relationship checking portion checking a relationship between a subject included in the image and a device operator using the recording device, and outputting a obtained checking result, wherein the relationship checking portion further checks a presence or absence of conversation between the subject and the device operator, and outputs the obtained checking results; and
a sound controlling portion controlling the sound obtained by the sound collecting portion based on the obtained checking result outputted from the relationship checking portion,
wherein the sound is recorded, and
wherein the relationship checking portion checks the relationship between the subject and the device operator based on a face of the subject in the image.

* * * * *